(12) United States Patent
Iwasaki et al.

(10) Patent No.: US 6,567,187 B1
(45) Date of Patent: May 20, 2003

(54) PRINTING APPARATUS AND FEEDING CONTROL METHOD

(75) Inventors: Takeshi Iwasaki, Yokohama (JP); Koh Hasegawa, Yokohama (JP); Shinya Asano, Tokyo (JP); Hiroyuki Inoue, Yokohama (JP); Takashi Nojima, Tokyo (JP); Akira Kida, Kawasaki (JP); Noriko Kawasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/290,410

(22) Filed: Apr. 13, 1999

(30) Foreign Application Priority Data

Apr. 15, 1998 (JP) .......................................... 10-121831

(51) Int. Cl.⁷ ................................................. H04N 1/21
(52) U.S. Cl. .................... 358/296; 358/1.15; 358/1.12; 358/497; 347/65; 347/101; 347/104; 271/153; 271/3.15; 271/3.17; 271/9.09
(58) Field of Search ....................... 358/296, 1.9, 1.15, 358/1.12, 1.18, 1.5, 497; 347/65, 32, 73, 104; 271/3.15, 3.17

(56) References Cited

U.S. PATENT DOCUMENTS

| | | | | |
|---|---|---|---|---|
| 4,394,008 A | * | 7/1983 | Sugiyama et al. | |
| 4,679,953 A | * | 7/1987 | Sone et al. | |
| 4,896,871 A | * | 1/1990 | Idenawa | |
| 5,027,288 A | * | 6/1991 | Suzuki et al. | |
| 5,156,385 A | * | 10/1992 | Muto et al. | |
| 5,258,779 A | * | 11/1993 | Serizawa et al. | |
| 5,308,054 A | * | 5/1994 | Sugito | |
| 5,323,219 A | * | 6/1994 | Hamanaka et al. | 399/371 |
| 5,339,134 A | * | 8/1994 | Nakamura et al. | |
| 5,348,407 A | * | 9/1994 | Hock et al. | 400/711 |
| 5,459,580 A | * | 10/1995 | Suzuki | |
| 5,464,204 A | * | 11/1995 | Suzuki | 271/110 |
| 5,480,247 A | * | 1/1996 | Saikawa et al. | |
| 5,531,431 A | * | 7/1996 | Saito et al. | 271/4.01 |
| 5,775,823 A | * | 7/1998 | Bekki et al. | 400/629 |
| 5,828,818 A | * | 10/1998 | Anzai | |
| 5,829,893 A | * | 11/1998 | Kinoshita et al. | 400/88 |
| 5,946,456 A | * | 8/1999 | Nakamura | |
| 6,053,491 A | * | 4/2000 | Cheong | |
| 6,092,941 A | * | 7/2000 | Imai | |
| 6,104,496 A | * | 8/2000 | Minowa | |
| 6,200,043 B1 | * | 3/2001 | Inoue et al. | 400/88 |
| 6,213,464 B1 | * | 4/2001 | Inoue et al. | 271/248 |
| 6,259,468 B1 | * | 7/2001 | Higuchi | |
| 6,304,342 B1 | * | 10/2001 | Komada | |
| 6,332,170 B1 | * | 12/2001 | Ban | |

FOREIGN PATENT DOCUMENTS

| | | | |
|---|---|---|---|
| JP | 4-303336 | * | 10/1992 |
| WO | WO 82/03823 | * | 11/1982 |

* cited by examiner

*Primary Examiner*—Edward Coles
*Assistant Examiner*—Tia Carter
(74) *Attorney, Agent, or Firm*—Fitzpatrick, Cella, Harper & Scinto

(57) ABSTRACT

A printing apparatus has high reliability both in manual feeding and in automatic feeding of a printing medium, and a feeding control method controls the printing apparatus. In the case of manual feeding of a sheet as the printing medium, the sheet is transported by an LF roller for an amount sufficient for feeding the tip end of the sheet to a discharge paper sensor located on the downstream side of a paper path with respect to a printing head. Judgment whether paper feeding is successful or not is made depending on whether the sheet is detected by the discharged paper sensor. On the other hand, in the case of automatic feeding using an automatic feeding apparatus, the operation of transporting the sheet to the discharged paper sensor is not performed. By this, in the case of automatic feeding, it becomes unnecessary to backwardly feed the sheet before initiation of printing so that the rotation amount of the LF roller is minimized.

20 Claims, 37 Drawing Sheets

DRIVE TABLE T

| T | PAPER KIND | DRIVE SPEED FOR REGISTRATION | PULSE NUMBER P5 FOR REGISTRATION |
|---|---|---|---|
| T1 | PLAIN PAPER | MEDIUM SPEED | SMALL |
| T2 | POSTCARD | MEDIUM SPEED | LARGE (P5=Pmax-Pc) |
| T3 | ENVELOPE | LOW SPEED | MEDIUM |
| T4 | GLOSSY PAPER | LOW SPEED | SMALL |
| T5 | NONE SPECIFIED | MEDIUM SPEED | LARGE (P5=Pmax-Pc) |

*FIG.38*

PRINTING APPARATUS AND FEEDING CONTROL METHOD

This application is based on patent application No. 10-121831 filed Apr. 15, 1998 in Japan, the content of which is incorporated hereinto by reference.

BACKGROUND OF THE INVENTION

1. Field of the Invention

The present invention relates to a printing apparatus for printing information, such as a document and an image processed by an information processing system, on a printing medium, such as a paper, and a feeding control method of the printing medium.

2. Description of the Related Art

Demand in the market for down-sizing and weight saving for a printer as a printing apparatus has been growing similarly to other various devices. For satisfying such demand, down-sizing and weight saving in the printer has been progressed significantly. Seeking for down-sizing of the printer, there has been proposed a printer, in which a main body portion of the printer performing image printing and an automatic sheet feeder (hereinafter referred to as "ASF") portion for feeding a plurality of stacked sheets as printing medium to an image forming portion one by one are separated, and the ASF portion is thus made independent of the main body of the printer for external attachment, as disclosed in Japanese Patent Application Laid-open No. 4-303336 (1992). On the other hand, not only in the small size printer, but also in a printer having a plurality of paper feeding opening or a printer permitting only manual paper feeding, there has been conventionally known to ASFs' which can be externally installed. It should be noted that various media in addition to paper is included as the printing medium.

In such printers, on which an external ASF is installed, most of the printers permits manual feeding of the printing media while the external ASF is not installed. However, in such manual feeding, since the sheet cannot be supplied stably as in the ASF, the sheet may be obliquely pressed onto a nip portion formed by a transporting roller and a pinch roller to cause skewing of the sheet, or depression force for the sheet pressed to the nip portion may lack or excessively small to possibly cause lack of margin (lead) amount of the tip end of the sheet.

In order to take a measure for the problems set forth above, there is a printer which is provided with a discharged paper sensor at a position on a downstream side in a sheet transporting direction of a printing head, for example. In case of such printer, upon performing printing operation, at first, a tip end of the sheet has to be drawn to a position on the downstream side in the sheet transporting direction across a print start position by the printing head. Then, when the discharged paper sensor detects the sheet, judgment is made that paper feeding is successful, and the tip end of the sheet is backed to the print start position. On the other hand, when the discharged paper sensor does not detect the sheet, judgment is made that paper feeding is failed, and the sheet is discharged. Thus, upon manual paper feeding, skewing of the sheet or lacking of the tip end margin can be successfully avoided.

However, the conventional printer set forth above encounters the following problem.

Namely, in the printer having the discharged paper sensor, as set forth above, even upon automatic paper feeding while the external ASF is installed, the following problem is encountered if a control depending upon whether the sheet is detected by the discharged paper sensor or not is performed. When operation to return the tip end of the sheet back to the print start position is performed upon detection of the sheet by the discharged paper sensor, extra period is required for returning the tip end of the sheet back to the print start position, and throughput is lowered. Furthermore, upon returning the sheet in backward direction in the transporting direction, a rear end of the sheet abuts onto a mechanical part within the ASF to cause holding of the sheet or mis-feeding.

SUMMARY OF THE INVENTION

It is therefore an object of the present invention to provide a printing apparatus and a feeding control method which realizes highly reliable feeding upon feeding of a printing medium, such as paper or the like by manual feeding, prevents lowering of throughput in automatic paper feeding of an automatic paper feeding apparatus, and realizes highly reliable feeding by preventing holding of the printing medium or mis-feeding.

In the first aspect of the present invention, there is provided a printing apparatus for printing an image using a printing head on a printing medium fed automatically and a printing medium fed manually, comprising:

a transporting roller for transporting the printing medium, the printing head and a sensor for detecting the printing medium arranged sequentially in a direction from an upstream side to a downstream side in a transporting direction of the printing medium, and control means for transporting the printing medium by a transporting roller in amount sufficient for reaching a tip end of the printing medium to a detecting position of the sensor when the printing medium is fed manually, to execute feeding confirmation process for judgment whether the sensor detects the printing medium or not and whereby whether feeding is successful or not, and not executing the feeding confirmation process when the printing medium is fed automatically.

In the second aspect of the present invention, there is provided a printing apparatus installable to an automatic feeding apparatus feeding a printing medium, printing an image using a printing head on a printing medium fed from the automatic feeding apparatus when the printing apparatus is installed to the automatic feeding apparatus, and printing an image using the printing head on a printing medium fed manually when the printing apparatus is not installed to the automatic feeding apparatus, comprising a transporting roller for transporting the printing medium, the printing head and a sensor for detecting the printing medium arranged sequentially in a direction from an upstream side to a downstream side in a transporting direction of the printing medium, and control means for transporting the printing medium by a transporting roller in amount sufficient for reaching a tip end of the printing medium to a detecting position of the sensor when the printing medium is fed manually, to execute feeding confirmation process for judgment whether the sensor detects the printing medium or not and whereby whether feeding is successful or not, and not executing the feeding confirmation process when the printing medium is fed by the automatic feeding apparatus.

In the third aspect of the present invention, there is provided a feeding control method of a printing apparatus in which a transporting roller for transporting a printing medium, a printing head and a sensor for detecting the printing medium are sequentially arranged from upstream side to downstream side in a transporting direction of the printing medium and printing an image on the fed printing, comprising:

step of feeding the printing medium by automatic feeding and manual feeding; and step of transporting the printing medium by a transporting roller in amount sufficient for reaching a tip end of the printing medium to a detecting position of the sensor when the printing medium is fed manually, to execute feeding confirmation process for judgment whether the sensor detects the printing medium or not and whereby whether feeding is successful or not, and not executing the feeding confirmation process when the printing medium is fed automatically.

According to the present invention, in case of automatic feeding of a printing medium, an operation for once feeding the printing medium up to a position of a sensor on downstream side in the printing medium transporting direction of a printing head, is not required. Therefore, in case of automatic feeding employing an automatic feeding apparatus, it becomes unnecessary to return the printing medium from the position opposing to the sensor to a print start position. Accordingly, a rear end of the printing medium will never abut to an internal component of the automatic feeding apparatus. Thus, unwanted holding of the printing medium or mis-feeding of the printing medium can be successfully prevented. On the other hand, since it is not required to return the printing medium in backward direction in the transporting direction, it contributes in improvement of throughput. Of course, if automatic feeding is performed employing the automatic feeding apparatus, since much stable sheet feeding operation can be performed in comparison with manual feeding, skewing of the printing medium or lacking of tip end margin on the printing medium can be successfully prevented even without checking by once feeding the printing medium up to the position of the sensor.

Furthermore, in manual feeding, by making judgment whether feeding is successful or not utilizing the sensor in the similar manner as that in the prior art, skewing of the printing medium, lacking of tip end margin and so on can be eliminated.

As a result set forth above, it becomes possible to provide highly reliable printing apparatus and feeding control method.

The above and other objects, effects, features and advantages of the present invention will become more apparent from the following description of the embodiments thereof taken in conjunction with the accompanying drawings.

BRIEF DESCRIPTION OF THE DRAWINGS

FIG. 38 is an explanatory illustration of a drive table of the automatic feeding apparatus in the second embodiment of the present invention.

DETAILED DESCRIPTION OF THE PREFERRED EMBODIMENT

The preferred embodiment of the present invention will be described hereinafter in detail with reference to the accompanying drawings.

Figure 1:
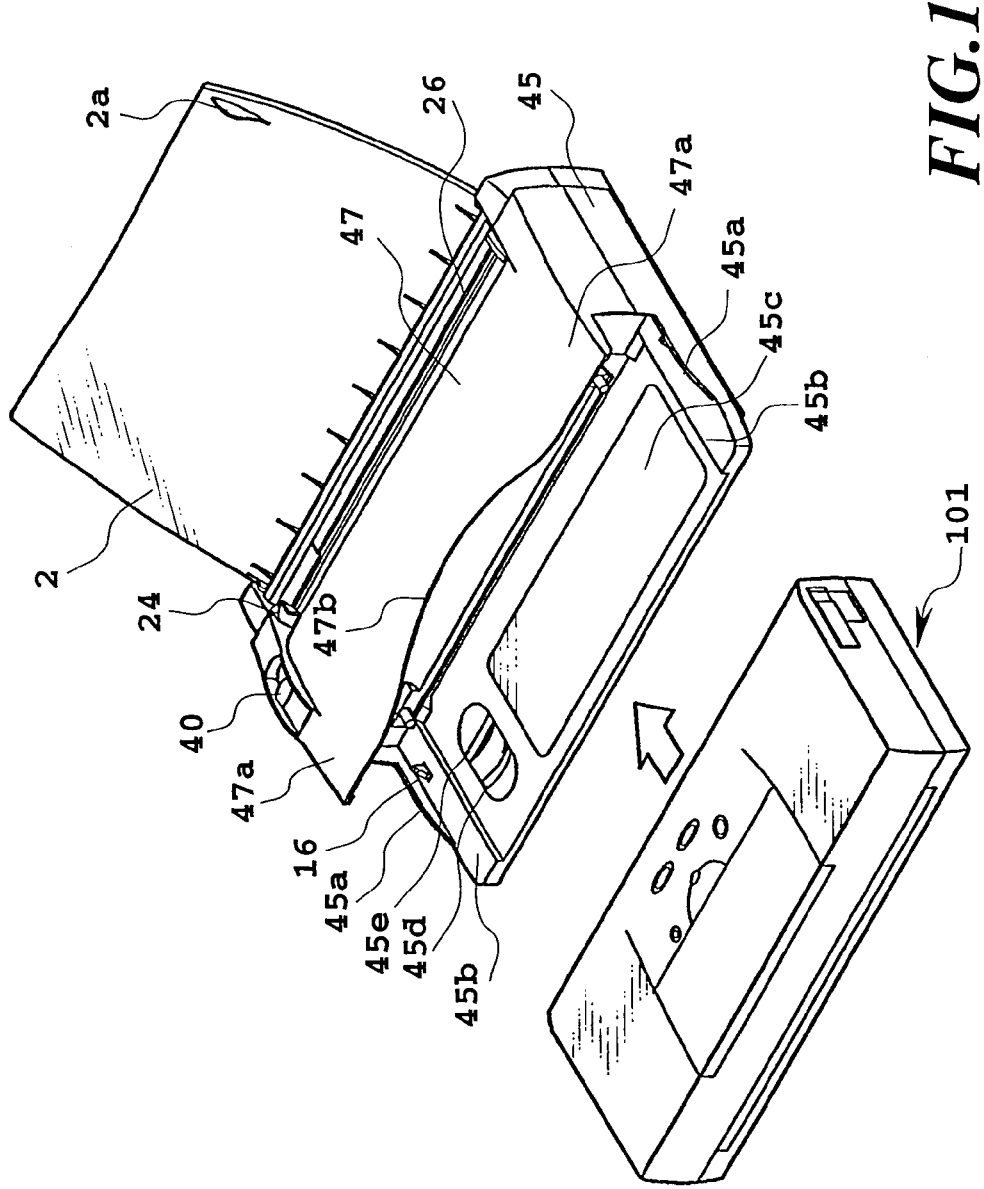
FIG. 1 is a perspective view of the first embodiment of a printing apparatus and an automatic feeding apparatus according to the present invention, illustrated in a separated condition.
Figure 2:
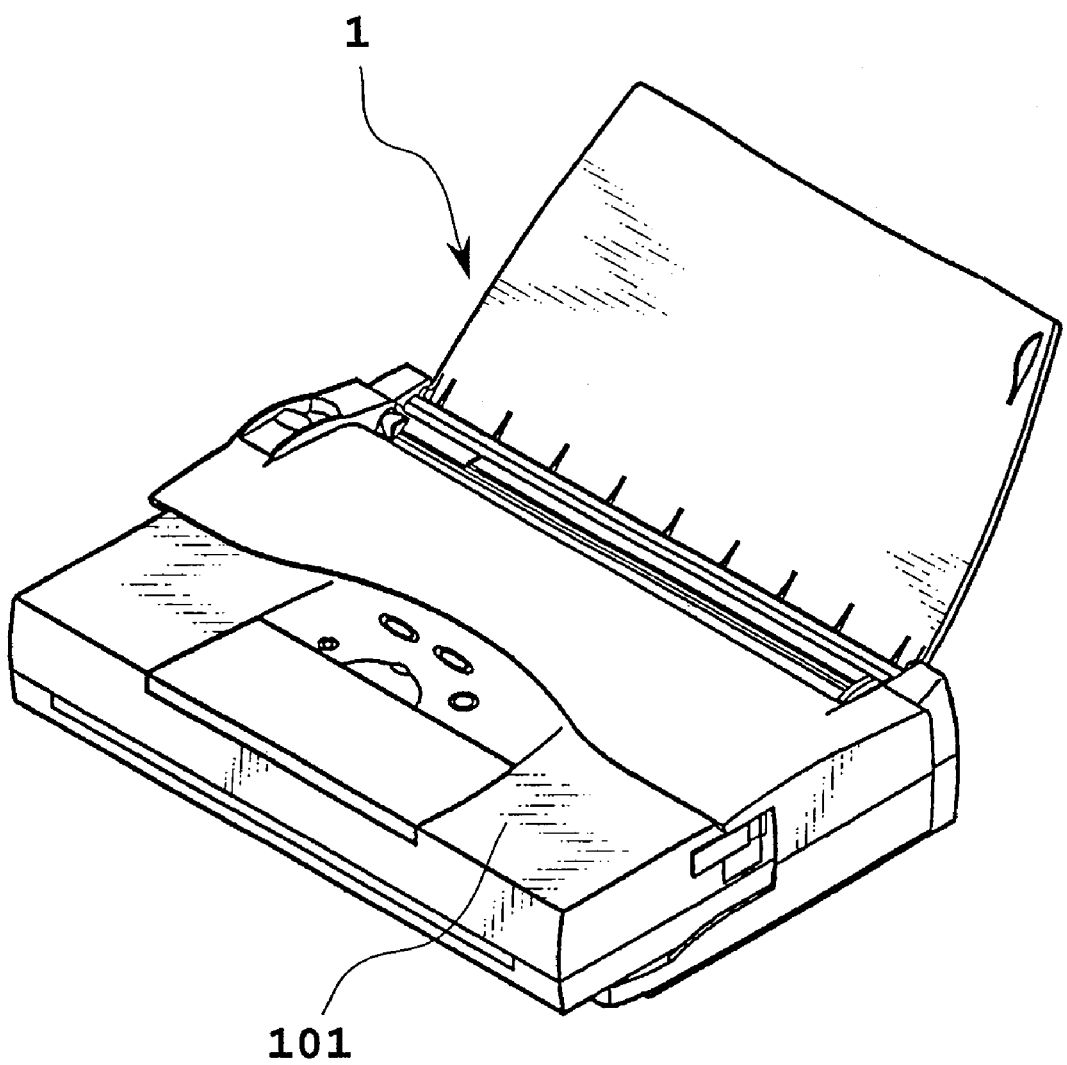
FIG. 2 is a perspective view of the first embodiment of a printing apparatus and an automatic feeding apparatus according to the present invention, illustrated in an assembled condition.
Figure 3:
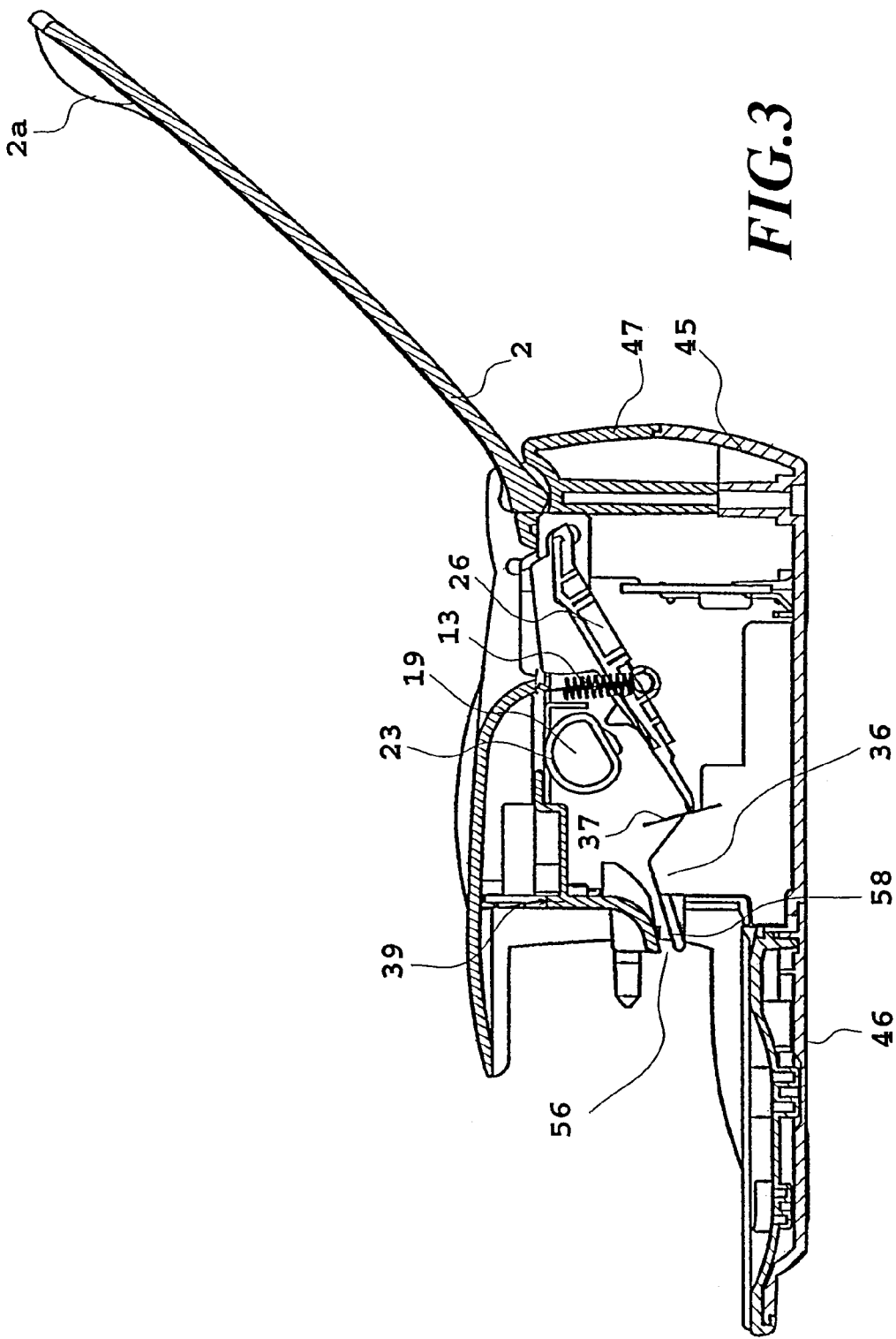
FIG. 3 is a section in the first embodiment of the automatic feeding apparatus according to the present invention.
Figure 4:
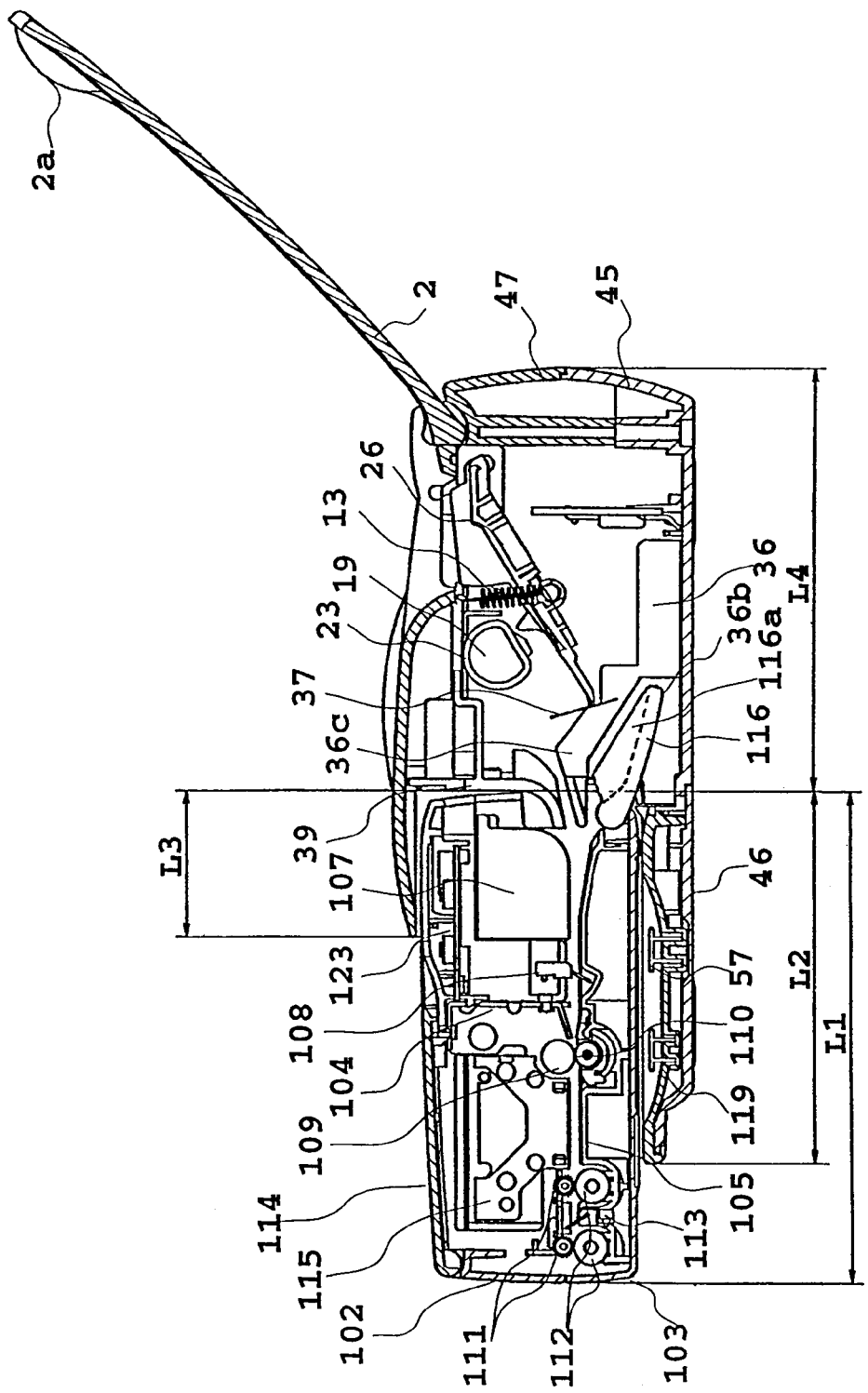
FIG. 4 is a section of the first embodiment of the printing apparatus and the automatic feeding apparatus according to the present invention, illustrated in the assembled condition.

FIGS. 1 and 2 are perspective views showing first embodiment of an automatic sheet feeder (hereinafter referred to as "ASF") as an automatic feeding apparatus, and a printing apparatus performing printing on a printing paper as a printing medium automatically fed by the ASF. FIG. 3 is a section of the printing apparatus, and FIG. 4 is a section of a printing apparatus and the ASF.

(Concerning Construction of ASF)

At first, the ASF as the automatic feeding apparatus will be briefly explained with reference to FIGS. 1 to 4. The reference numeral 1 denotes an ASF and 101 denotes a printer as a printing apparatus. In the shown embodiment, the ASF 1 and the printer 101 are constructed independently. The printer 101 is constructed to be releasably installed to and from the ASF 1. The printer 101 has a battery and is so-called mobile printer which is compact and portable. In the shown embodiment, the printer 101 is not built in the ASF. As a sole unit of the printer 101, the printer is constructed to perform paper feeding only by manual paper feeding. By the construction set forth above, downsizing, simplification and cost down of the sole unit of the printer 101 can be realized to have an optimal form as a mobile printer. Needless to say, the present invention is applicable even in the case where a compact ASF is built in the printer 101. As a situation where such compact and portable printer 101 is used, outdoor, within a vehicle, a customer's office when a salesman visits the customer's office, and so forth can be considered. In such situation, since number of necessary pages to be printed is relatively small, no inconvenience will be caused even with only manual feeding or simply ASF having small capacity. When such printer is used in own office, there is a needs to perform printing with relatively large amount of printing paper as wide variety of printing media. For such needs, ASF 1 separated from the printer 101 is quite preferable. Namely, ASF 1 is in a form of so-called desktop type to be constantly placed on a desk in the office. By installing the printer 101 to such ASF 1, the printer 101 may has a performance as a desktop printer. With the construction explained later, the ASF 1 can automatically feed various printing media (hereinafter also referred to as "printing medium"), such as postcard, envelope, plastic film, cloth or so on as well as a plain paper.

The shown embodiment can provide a printer of having quite high added value, in which the ultra compact mobile printer 101 as a sole unit of the printer is used as a high performance desktop printer by installing the ASF 1. In this case, the ASF 1 also serves as a storage plate for the printer 101 while the printer 101 is not used as the sole and independent unit. Accordingly, when the printer 101 is received within the ASF 1, automatic paper feeding function is added to the printer 101. Thus, the ASF 1 serves as docking station. Here, the ASF serves as stable standalone unit when the printer is not installed, and can be separated from the printer in a condition where sheets as the printing medium are stacked. By simply installing the printer to the self-supported ASF, user may place the printer in operation stand-by state as the desktop printer. For the user, the ASF can serve as docking station which is quite useful.

When the foregoing printer is properly used as mobile printer and the desktop printer, it is quite important to quite simply and easily perform installing and separating operation between the ASF 1 and the printer 101. The reason is that, for the user who separates the printer 101 from the ASF 1 and carries out of the office almost every day and assembles the printer 101 to the ASF 1 as carried back to the office, it is quite troublesome if installation and separating operation is complicate and takes long period.

In the shown embodiment, as shown in FIG. 3, a large opening portion is provided in a front side (left side in FIG. 3) of the ASF 1. This front opening portion serves as receptacle portion of the printer 1. In the printer 101, a passage of the sheet as the printing medium is so-called horizontal path extending in substantially horizontal direction. A sheet supply side at a rear side of the printer 101 is shifted in substantially horizontal direction toward the ASF 1 as shown in FIG. 1. Then, the sheet supply side is pushed into the front opening portion of the ASF 1 as shown in FIG. 2 to form the paper path which will be explained later. Namely, the shown embodiment is constructed to install the printer 101 having the horizontal path by pushing the same into the ASF 1 in substantially horizontal direction. When the printer 101 is pushed into the ASF 1 in substantially horizontal direction, the printer 101 is automatically fixed within the ASF 1. A method for fixing the printer 101 within the ASF 1 when the printer is assembled within the ASF 1 will be explained later.

On the other hand, upon separating the printer 101 from the ASF 1, fixing of the printer 101 within the ASF 1 can be released, and the ASF 1 is pushed frontwardly simply by pushing a push lever 40 which is provided in an upper face of the ASF 1.

With the construction set forth above, the user may quite easily and simply install and separate the printer 101 and the ASF 1. Thus, the printer may properly used as the mobile printer and the desktop printer.

In the shown embodiment, in order to simplify and facilitate operation for installing and separating the ASF 1 and the printer 101, a table portion 45c is provided on the front side of the ASF 1. Upon installing the printer 101 into the ASF 1, the printer 101 is at first, placed on the table portion 45c. At this time, the user is merely required to grip the upper and lower faces in the vicinity of center portion on the proximal side (paper discharge side: left side of FIG. 4) of the printer 101 by one hand, and to place the distal side (paper feeding side: right side in FIG. 4) of the printer 101 on the table portion 45c (right and left side portion of the printer 101 may be griped by both hands). With placing the printer 101 on the table portion 45c, the user may push the printer 101 toward the distal side. By this, the printer 101 is guided by a printer side guide portions 45a provided on both side (right and left side) end portions of the table portion 45c to be lead to a positioning boss which will be explained later, and positioned by engaging with a positioning bore which will be explained later. In this case, it is merely required to push the printer 101 with placing the printer 101 at substantially center portion of the table portion 45c. Thus, troublesome positioning becomes unnecessary.

The table portion 45c has printer slide portions 45b on both sides. These printer slide portions 45b are portions to slidingly contact with back surface of the printer 101 when the printer 101 is pushed into the ASF 1. A portion between the printer slide portions 45b on both sides is a stepped down portion. In the stepped down portion, the printer 101 and the ASF 1 are not in contact. On the back surface of the printer 101, a plurality of rubber legs are provided. The rubber legs are used for frictionally restricts movement of the printer 101 by external force while the sole unit of the printer 101 is used by mounting on the desk or the like. When the printer 101 is installed within the ASF 1, if the rubber legs are assumed to be placed in contact with the table portion 45c, a force required for the user to push the printer 101 into the ASF 1 becomes large to cause difficulty in operation. Therefore, in order to prevent the rubber legs from contacting with the table portion 45c, the stepped down portion between the slide portions 45b is provided greater depth than the height of the rubber legs.

On the other hand, the reference numeral 47a denotes an overhang portion 47a formed in an upper case 47 of the ASF 1. The overhang portion 47a is formed in substantially parallel to the table portion 45c and forms a pocket portion to receive the printer 101 therein. The pocket portion thus formed physically indicate to the user that a direction to push the printer 101 into the ASF 1 is substantially horizontal direction, and thus prevent the user from pushing the printer 101 into the ASF 1 in other direction. The pushing direction matches with a contact direction of both connectors which establish electrical connection between the printer 101 and the ASF 1. During operation for setting by pushing the printer 101 into the ASF 1, electrical connection is established by the connectors. By thus constructed, it becomes unnecessary to perform other operation for establishing electrical connection through the connectors for achieving high operability and avoids pushing of the printer 101 in the direction different from contact direction of the connectors for successfully preventing the connectors from being damaged due to abnormal interference between the connectors. Furthermore, the construction of such pocket portion may prevent drawback that can be caused when a force upwardly deflect the front side (paper discharge side) of the installed printer 101, damaging of the installing portion, unwanted release of the installed printer 101. It should be noted the overhang portion 47a in the shown embodiment has the greatest overhang amount at both side portions. On the other hand, a center portion of the overhand portion 47a is a recessed overhang portion 47b. Accordingly, when an operating portion, such as a power switch and so on is provided on the upper face of the printer 101 as in the shown embodiment, the overhang portion 47a is formed into a shape so as not to cover the operating portion. By setting a clearance between the overhang portion 47a and the upper face of the printer 101 is an extent about 0.5 mm to 2 mm, the lifting of the ASF 1 can be prevented successfully. If the clearance is excessively large, the desired effect cannot be obtained.

Here, as shown in FIG. 4, it is assumed that the length of the printer 101 in the back and forth direction is L1 (mm) and a length of the table portion 45c in the back and forth direction is L2 (mm), and the length of the overhang portion 47a is L3 (mm). Then, the following relationship is established.

$$L1/2 \leq L2 \leq (L1-15) \text{ mm}$$

At first, the length L2 in the back and forth direction of the table portion 45c is set to be greater than half (L1/2) of the length L1 of the printer 101 in the back and forth direction. Thus, the stable condition when the printer 101 is installed in the ASF 1 can be certainly maintained. Assuming that a relationship of L1/2>L2 is established, the printer 101 in the installed condition can be significantly projected from the ASF 1, in which the printer 101 is installed, quite unstable for causing lifting of the rear side of the overall ASF 1. It should be noted that it is required that the relationship (L1/2≦L2) is established in a part of the table portion 45c and is not required to be established in the overall table portion 45c.

On the other hand, by setting L2 in the back and forth direction of the table portion 45c to be smaller in the extent less than or equal to 15 mm in comparison with L1 of the printer 101 in the back and forth direction, on the proximal side of the lower portion of the printer 101, a space to insert the user's finger can be certainly provided. By this, upon installation and separation of the printer 101, the user can perform operation with gripping the upper and lower faces of the printer 101 in one hand (of course, it is possible to grip the printer 101 by both hand). Such condition of L2≦(L1−15) mm is not required to be satisfied in the overall range in the width direction of the table portion 45c. For example, it is sufficient that a recessed portion satisfying the foregoing condition may be formed partially in the center portion or both side portions of the table portion 45c. On the other hand, since a space is formed in the lower portion of the proximal side of the printer 101, a design, by which a size in the height direction is visually not perceptible, can be obtained. On the other hand, a thickness (height) of the table portion 45c is desired to be greater than or equal to about 10 mm so as to facilitate insertion of the finger into the lower side of the printer 101.

Furthermore, in the shown embodiment, the following relationship is also established.

$$L1/4 \leq L3 \leq L1/2$$

By setting the projecting length L3 of the overhang portion 47a to be greater than or equal to one fourth of L1 of the printer 101 in the back and forth direction, upward displacement of the printer 101 can be successfully prevented. Furthermore, it has been appreciated that the foregoing setting is also effective for limiting the inserting direction of the printer 101. Assuming that the projecting length L3 of the overhang portion 47a is greater than or equal to one half of L1 of the printer 101 in the back and forth direction, the pushing amount in installation of the printer 101 relative to the length thereon in the back and forth direction becomes relatively excessive to degrade operation feeling. On the other hand, excessively large projection amount of the overhang portion 47a should cause visual feeling that the overall apparatus is large to cause drawback for giving oppression feeling for the user. Furthermore, excessively large projection of the overhang portion 47a should cause interference with operation in the upper face of the printer 101. In this connection, it has been found that the projecting length of the overhang portion 47a is most desirable to be less than or equal to one half of the length of the printer 101 in the back and forth direction. In the projecting amount in such extent, sufficient strength of the projecting overhang portion 47a can be certainly maintained to achieve sufficient strength of the apparatus.

By forming the table portion 45c and the overhang portion 47a satisfying the conditions set forth above, a form which can achieve quite high operability, limiting effect in pushing the printer 101 into the ASF 1 and prevention of upward displacement of the printer 101, can be successfully obtained.

On the other hand, in a side face portion between the table portion 45c and the overhang portion 47a, a large opening portion is formed. A height of the printer side guide portion 45a is only required to be greater than or equal to a clearance between the overhang portion 47a and the upper face of the printer 101. The large opening portion formed in the side face portion will avoid interference in the case where a power cable, an interface connector or light emitting and receiving portion for infrared ray communication are provided on the side surface of the printer 101. Namely, the printer 101 may be installed in the ASF 1 in a condition where the power cable and/or interface connector is mounted on the printer 101. Also, the printer 101 may be separated from the ASF 1 with maintaining the power cable and/or interface connector as being mounted on the printer 101.

(Concerning Connector Cover)

Next, a connector cover of the connector portion which establishes electrical connection between the printer 101 and the ASF 1 set forth above, will be described.

When the printer 101 is used for a long period in a condition separated from the ASF 1, the connectors for establishing electrical connection between the printer 101 and the ASF 1 are held independent of each other and in not connected condition. In such case, dust and dart may penetrate into the connector portion. Also, it is possible that excessively large electrostatic charge may propagate into the internal electric circuit through the connector to damage the electric circuit. In order to prevent this problem, the shown embodiment employs a connector cover for protecting each connector. The connector cover presents as independent part and can be removed when the printer 101 is installed in the ASF 1. In case of super compact printer, such as the mobile printer, a space is quite strictly limited. As the connector cover which is quite cheap and minimum space, the removable type connector cover set forth above is optimum.

Figure 6:
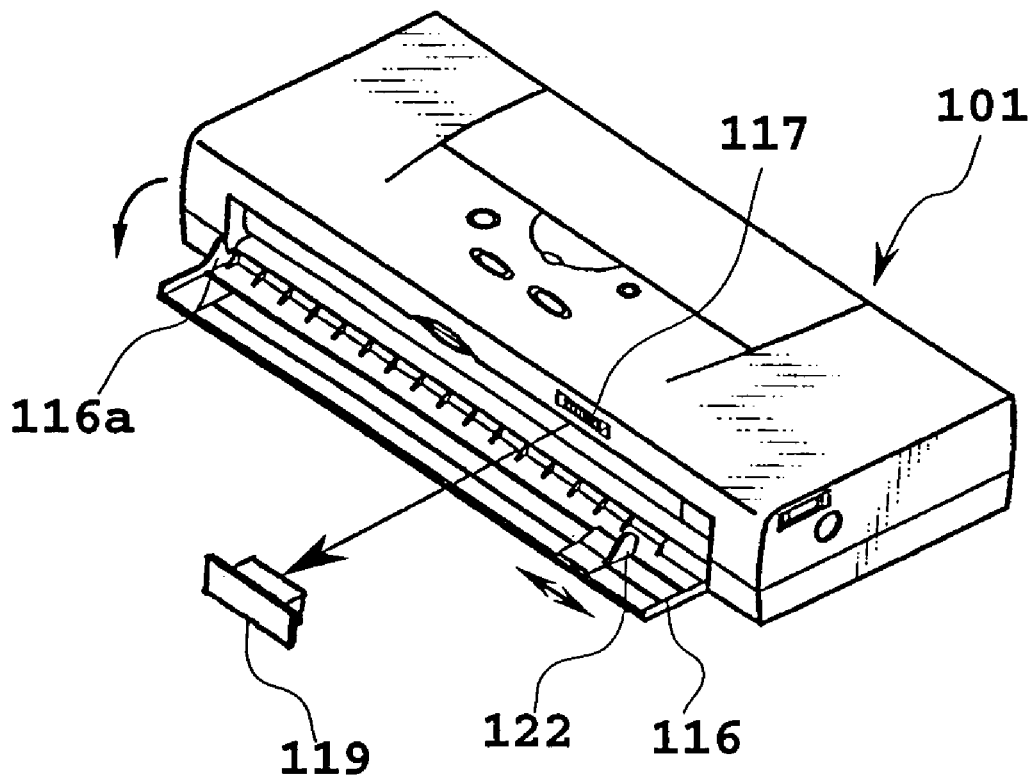
FIG. 6 is a perspective view of the first embodiment of the printing apparatus according to the present invention, upon opening of a paper feeding tray.

For example, the printer 101 has a printer connector 117 in an upper portion of a rear face mating with the ASF 1 as installed thereto. When the printer 101 is installed in the ASF 1, a paper feeder tray 116 is held in open condition as shown in FIG. 6 and a printer connector cover 119 is removed from the printer connector 117. Similarly, an ASF connector cover 57 engaged with an ASF connector 44 (see FIG. 11) on the side of ASF 1 is removed. Upon connecting these connectors, the removed connector covers 119 and 57 may be stored in connector cover receptacle portions 45d and 45e of the table portion 45c. These connector cover receptacle portions 45d and 45e are constructed to have projecting portions of dimensions equal to the connectors utilizing thickness of the table portion 45c. By storing the connector covers 119 and 57 in the connector cover receptacle portions 45d and 45e while the printer 101 is installed in the ASF 1, the connector covers 119 and 57 are prevented from loosing. For simply storing the connector covers 119 and 57 within the connector cover receptacle portions 45d and 45e, such connector cover receptacle portions 45d and 45e may be arranged at any position in the ASF 1 and the printer 101. However, by providing the connector cover receptacle portions 45d and 45e on the table portion 45c, the connector covers 119 and 57 are stored between the ASF 1 and the printer 101, dropping off of the connector covers 119 and 57 can be successfully prevented. Furthermore, it is preferable for capability of hiding the connector covers 119 and 57 from external view. On the other hand, when the printer 101 is separated, the connector covers 119 and 57 are exposed again to encourage setting of these connector covers 119 and 57 to the connectors 117 and 44 to prevent forgetting of setting of the connector covers to the connectors.

In the shown embodiment, for respective of a plurality of connector covers, the connector cover receptacle portions can be provided. Concerning the connector covers, similar is true in the relationship between the printer and the ASF like the notebook computer and station, for example.

(Brief Summary of Paper Feeding and Printing Operation)

Next, operation in paper feeding and printing in the condition where the printer 101 is installed in the ASF 1 will be explained (detail will be explained later).

Figure 25:
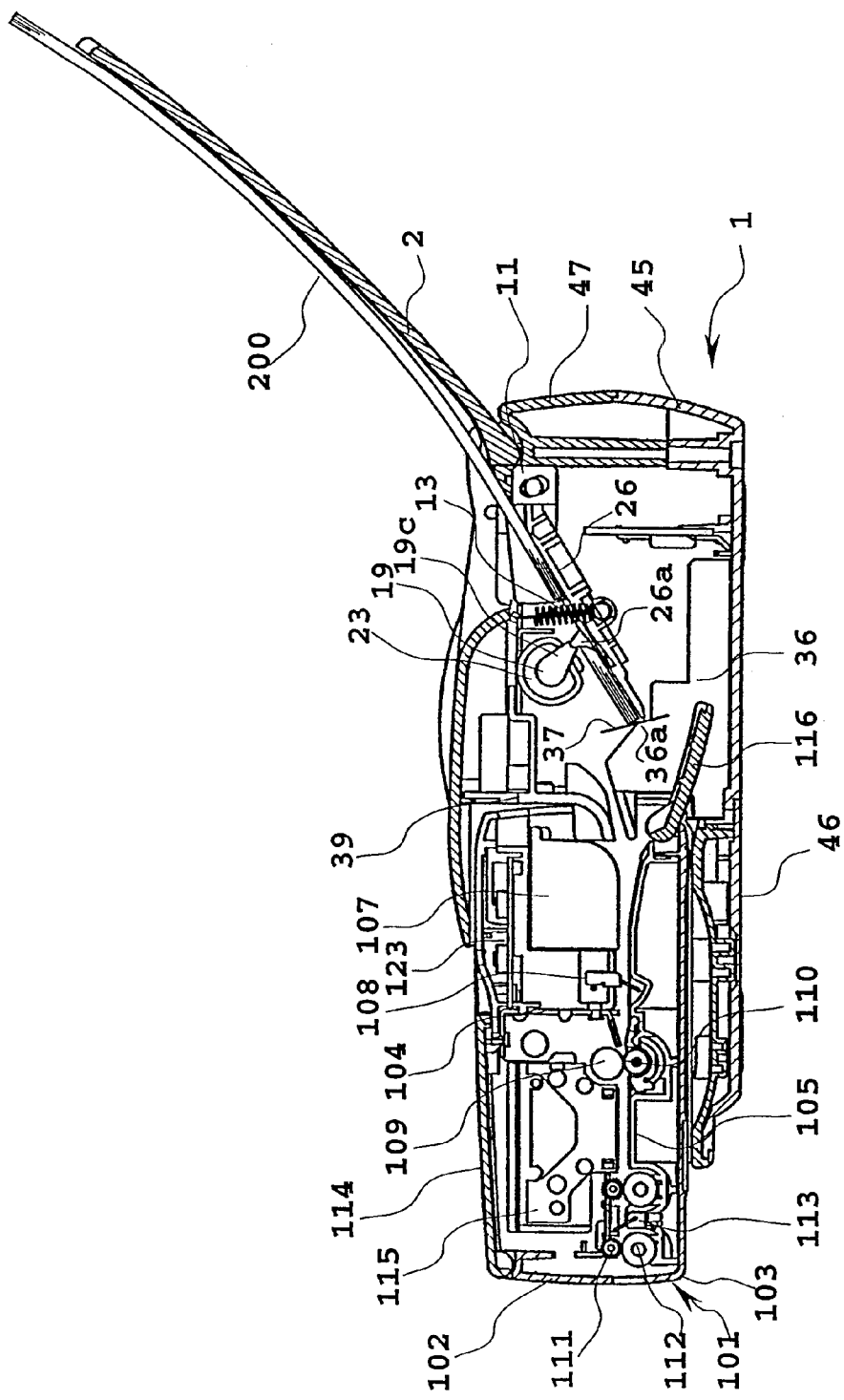
FIG. 25 is a section of the first embodiment of the printing apparatus and the automatic feeding apparatus according to the present invention, illustrated in the assembled condition.

FIG. 4 is a section of the condition where the printer 101 is installed in the ASF 1. On a pressure plate 26, a predetermined number of sheets 200 as the printing medium are set, as shown in FIG. 25. The pressure plate 26 is pivotably supported on an ASF chassis 11 at one end portion of an upper side. By means of a pressure plate spring 13, the pressure plate 26 is biased in clockwise direction toward a pick-up rubber 23 which is wrapped around a pick-up roller 19 as a feeding roller. Upon setting of the sheets 200, the pressure plate 26 is held in a position displaced away from the pick-up rubber 23 on the pick-up roller 19 as the feeding roller by a not shown cam. At this time, between the pick-up rubber 23 and the pressure plate 26, a predetermined clearance is formed. Within the clearance, the sheets 200 are inserted and set. Abutting the tip ends of the sheets 200 onto a plastic film form ridge sheet 37 provided on a ridge, the tip ends of the sheets 200 are positioned. Most of rear portion of the sheet 200 is supported by an ASF sheet feeding tray 2. The ASF sheet feeding tray 2 is pivotably supported on an ASF upper case 47 at one end portion of the lower side. Upon supporting the sheet 200, the ASF sheet feeding tray 2 is held with a predetermined angle, as shown in FIG. 4.

When the ASF 1 receives a sheet feeding instruction from the printer 101, the pick-up roller 19 initiates rotation in the clockwise direction. At the same time, holding of the pressure plate 26 is released by the not shown cam, the pressure plate 26 causes pressure contact between the sheet 200 and the pick-up rubber 23. Then, the sheet 200 is started movement by surface friction of the pick-up rubber 23. Only one sheet 200 is separated from the rest of the sheets by the ridge sheet 37 to be transported into an ASF sheet path 58 (see FIG. 3) formed by the ridge 36 and a positioning base 39. Subsequently, the sheet 200 is transferred from an ASF sheet discharge portion 56 (see FIG. 3) to a sheet path of the printer 101. The sheet 200 is then transferred into the sheet path formed between a platen 105 and a lower surface of a battery 107 within the printer 101. The sheet path is so-called manual feeding opening while used as sole unit of the printer 101. Subsequently, by detecting the sheet by a paper end sensor 108, the printer 101 may recognize that the sheet 200 is fed thereinto from the ASF 1. Then, the tip end of the sheet 200 abuts onto a pressure contact portion between a transporting roller (hereinafter referred to as "LF roller") 109 and a pinch roller 110. The ASF 1 receives a detection information of the paper end sensor 108 from the printer 101 and transmits a response signal indicative of completion of sheet feeding to the printer 101 at a predetermined timing. At this time, the sheet 200 is depressed between the LF roller 109 and the pinch roller 110 with a predetermined pressure depending upon stiffness of the sheet 200 for so-called registration of the tip end of the sheet. In this condition, the printer 101 receiving the response signal indicative of completion of sheet feeding from the ASF 1 drives the LF roller 109 to rotate at the predetermined timing to feed the sheet 200 to a printing portion. Associating with a predetermined feeding operation for the sheet 200, a printing head 115 performs printing onto a printing surface of the sheet 200. Furthermore, the sheet 200 is transported between a paper discharge roller 112 and a spur 111 and discharged.

In the shown embodiment, when the printer 101 is in a condition installed to the ASF 1, the paper path set forth above is constructed. Extending direction of the paper path in the printer 101 and connecting direction of the connectors 44 and 117 are substantially parallel to each other. If blocking of the sheet 200 is caused at any position while the sheet 200 is present over both of the ASF 1 and the printer 101 for transferring the sheet 200 from the ASF 1 to the printer 101, it becomes necessary to separate the printer 101 from ASF 1. Orienting the paper path in substantially parallel to the connecting direction permits separation of the printer 101 and the ASF 1 in the case set forth above. Assuming that the paper path and the connecting direction of the connectors intersect perpendicularly relative to each other, since it becomes necessary to separate the printer 101 in the connecting direction of the connectors, it is necessary to move the sheet 200 in the thickness direction or so forth to possibly cause rapture of the sheet. In more worse case, the ruptured debris of the sheet 200 may reside within the apparatus. Furthermore, in case of a thick sheet which is strong to the rupture, it becomes impossible to separate the printer 101. In the shown embodiment, since the paper path and the connecting direction of the connectors are set substantially parallel to each other, the printer 101 may move in a direction permitting withdrawal of the sheet 200 at the occurrence of blocking of the sheet. Treatment at the occurrence of blocking of the sheet becomes quite simple, rupture of the sheet 200 and residing of the sheet 200 within the apparatus will never be caused.

(Concerning Reference in Width Direction of Sheet)

Next, explanation will be given with respect to a reference position in the width direction of the sheet in the paper path as set forth above.

At first, explanation will be given for a reference in the width direction of the sheet in the printer 101.

Figure 5:
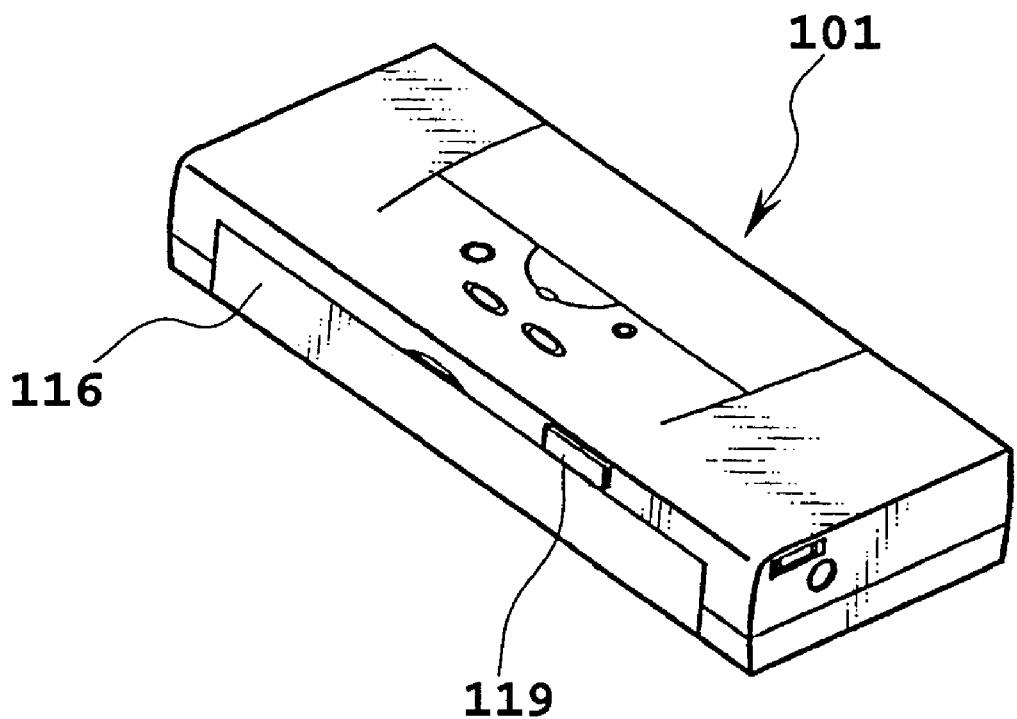
FIG. 5 is a perspective view of the first embodiment of the printing apparatus according to the present invention.

As shown in FIGS. 5 and 6, one end of the paper feeder tray 116 pivotably supported on a predetermined position of the printer 101. Upon using the printer 101 as sole unit, the paper feeder tray 116 stabilizes feeding operation of the sheet in hand. When the paper feeder tray 116 is placed in open condition as shown in FIG. 6, a reference guide 116a provided vertically at one end of the paper feeder tray 116, appears. The sheet 200 is inserted along the reference guide 116a. In the shown embodiment, a reference in the width direction of the sheet 200 is defined by the reference guide 116a. By inserting the sheet 200 with placing the side edge portion of the sheet 200 along the reference guide 116a, positioning of the sheet 200 in the width direction can be performed. In the shown embodiment, within the printer 101, similar reference guide is provided at the same position as the reference guide 116a in the width direction of the sheet 200. The later-mentioned reference guide serves for positioning of the sheet 200 in the width direction together with the reference guide 116a. It should be preferable to provide a length of the reference guides for positioning the sheet 200 in the width direction, as long as possible in the transporting direction of the sheet 200 in view of stabilization of the sheet 200. Positioning of the sheet 200 in the width direction can be stabilized by using the reference guide 116a provided in the paper feeder tray 116, and thus skewing of the sheet 200 can be prevented. It is also possible to guide the sheet 200 only by the reference guide 116a providing in the movable paper feeder tray 116 with neglecting the reference guide within the printer 101.

Particularly in ultra compact mobile printer, it is quite difficult to separately provide a paper feeding opening for manual paper feeding and paper feeding opening for automatic paper feeding by the ASF, and respectively independent sheet guide, in view of limited space. Therefore, it becomes necessary to use a common paper feeding opening in place of these paper feeding openings.

Therefore, when the printer 101 is installed in the ASF 1, the reference guide 116a as the reference for the sheet upon manual paper feeding has to be used even upon automatic paper feeding by the ASF 1. However, it is difficult to feed the sheet with placing the side edge portion of the sheet automatically fed from the ASF 1 along the reference guide 116a. The reason is that, for making the ASF 1 to perform operation the same as the operation that the user places the side edge of the sheet along the reference guide 116a with adjusting by hand, it becomes necessary to completely match the sheet references of the printer 101 and the ASF 1. The sheet reference of the ASF 1 is an ASF sheet reference 26a (see FIG. 25) provided on the pressure plate 26. By placing the side edge of the sheet along the ASF sheet reference 26a, the sheet is fed in a condition where the sheet is positioned at the predetermined position. However, the position of the ASF sheet reference 26a and the position of the reference guide 116a accumulate various tolerance in the construction to cause substantial difficulty in matching these. For realizing this, quite high cost and complicate mechanism are required. If these sheet references do not match, interference between the side edge portion of the sheet and the reference guide 116a is caused to result in skewing of the sheet, to damage the side edge portion of the sheet, or to cause blocking of the sheet by colliding the tip end of the sheet to the sheet reference 116a.

Therefore, when the reference guide 116a is provided only at relatively upstream side in the paper feeding direction of the manual feeding portion in the printer 101, namely, when the reference in the width direction of the sheet is determined only by the reference guide 116a which appears when the paper feeder tray 116 is opened and no member for restricting the position in the width direction of the sheet at the position on the downstream side in the paper feeding direction as shown in FIG. 6, the paper path is set so that the sheet will pass the upper side of the reference guide 116a when the printer 101 is installed within the ASF 1. By this, only positioning of the sheet effected by the sheet reference 26a of the ASF 1 becomes effective, and thus interference with the sheet reference of the printer 101 can be avoided.

In the sole unit of the printer 101, in a condition where the paper feeder tray 116 is opened as shown in FIG. 6, namely in a condition of manual paper feeding, the surface of the paper feeder tray 116 guiding the sheet becomes substantially horizontal. On the other hand, in the condition where the printer is installed in the ASF 1, the movable paper feeder tray 116 is pivoted downwardly from the position of FIG. 6 in the sole unit of the printer, as shown in FIG. 4. By this, the paper path becomes close to that upon manual paper feeding. In the ASF 1, as a space for receiving the paper feeder tray 116 pivoted downwardly, a reference guide receptacle portion 36b is formed. When the printer 101 is pushed into the ASF 1, the reference guide 116a is pivoted downwardly as guided by a reference guide guiding portion 36c forming the reference guide receptacle portion 36b and thus received within the reference guide receptacle portion 36b. As a result, necessary shift amount for avoiding interference between the reference guide 116a and the paper path, namely shifting amount of the paper path of the ASF 1 relative to the paper path upon manual feeding can be made small to prevent problems, such as back tension on the sheet or the like, due to non-smooth paper path.

Furthermore, in the paper feeder tray 116 on the printer 101 side, a right end guide 122 guiding the side edge portion of the sheet on the opposite side of reference side, is provided, as shown in FIG. 6. The right end guide 122 is slidably provided in the width direction of the sheet for guiding the side edge portion on the side opposite to the reference side of the sheet. A shape of the right end guide 122 as viewed from a thickness direction of the sheet in the paper path is substantially the same shape as the reference guide 116a. Upon installing the printer 101 into the ASF 1, the right end guide 122, the paper feeder tray 116 and the reference guide 116a are received within the reference guide receptacle portion 36b. The right end guide 122 is movable to an arbitrary position within a predetermined range in the paper feeder tray 116. Therefore, the paper feeder tray 116 at any position within the predetermined range may be received within the reference guide receptacle portion 36b.

Thus, upon installing the printer within the ASF, by setting the paper path at a position avoiding the reference guide on the ASF side, the sheet reference on the side of the main body of the printer is made null and make only sheet reference on the ASF side effective. Accordingly, complication of the apparatus for matching both of the sheet references of the printer and the ASF and cost-up can be successfully avoided. Then, a problem to be caused when interference is caused between the sheet fed from the ASF and the sheet reference on the side of the main body of the printer, namely skewing of the sheet, damaging of the side edge of the sheet, blocking of the sheet by colliding onto the sheet reference, can be successfully avoided.

Figure 7:
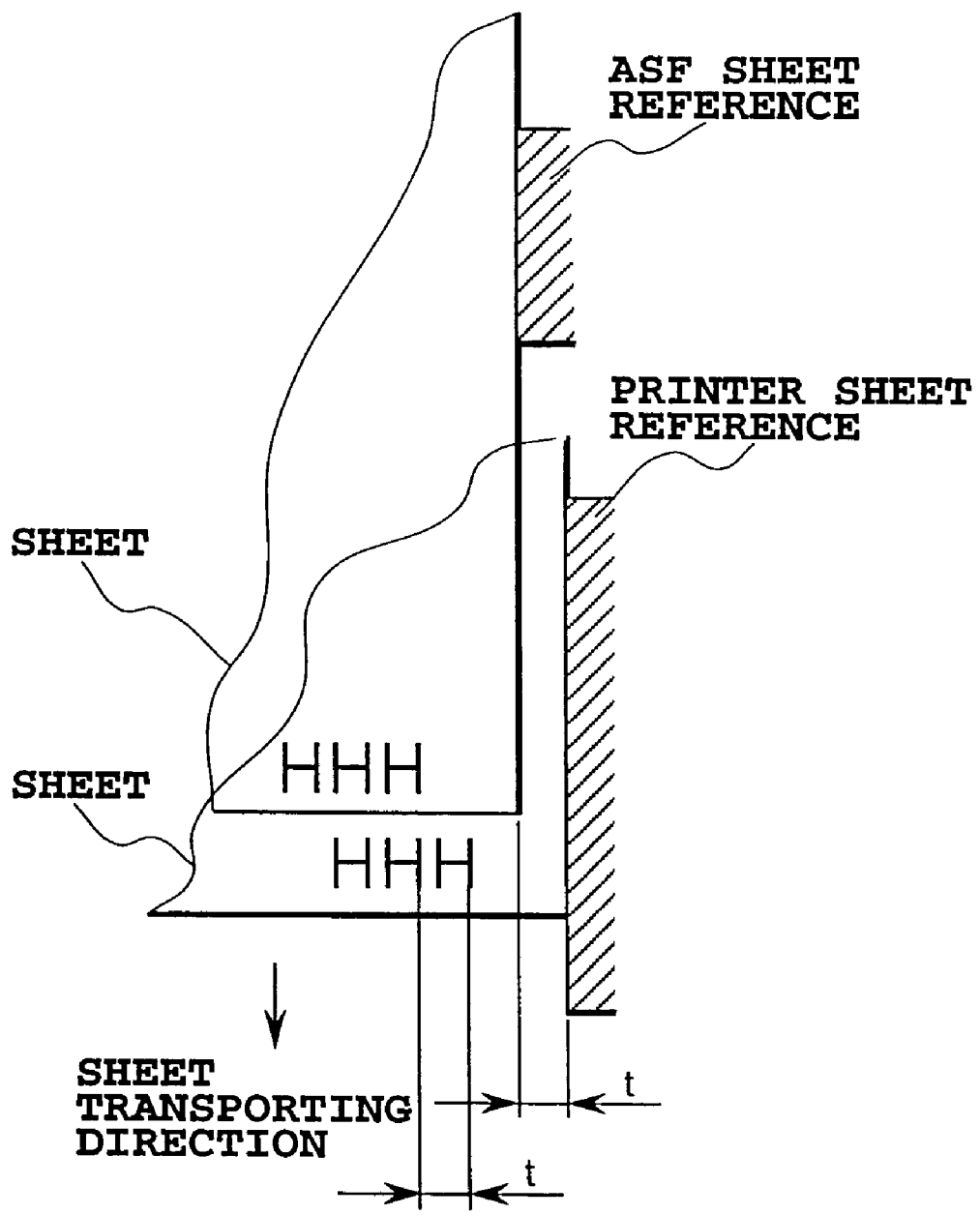
FIG. 7 is a diagrammatic plan view of a sheet reference position in the first embodiment of the present invention.

On the other hand, there are some printers 101 which has a reference guide at the same position as the reference guide 116a in the width direction of the sheet, and a relatively long length of the former reference guide is provided to make positioning of the sheet stable, it is difficult to set the paper path with avoiding all of the reference guides. Therefore, in this case, the sheet reference on the side of the main body of the printer and the sheet reference on the side of the ASF are set at preliminarily offset positions. Namely, as shown in FIG. 7, inside of the sheet reference on the side of the printer, namely the position shifting in a distance t toward the side of the printing position by the head, the sheet reference is set on the ASF side so as not to cause inference between the sheet fed from the ASF and the sheet reference on the printer side. Shifting amount t of the sheet reference is greater than or equal to the tolerance in positioning of the width direction of the sheet between the printer and the ASF, and is determined in consideration of the case where skewing of the sheet occurs. In the shown embodiment, the offset amount t is approximately 0.6 mm.

In this case, the sheet reference should offset between that upon performing printing by the sole unit of the printer and that upon performing printing in the condition installed in the ASF. If similar printing by the head is performed upon performing both printing without taking the offset into account, in both of these, a distance up to the printing position from the side edge portion of the sheet can be different. Therefore, in the shown embodiment, the printing position is shifted for the amount t corresponding to the offset amount of the sheet reference position between that in the sole unit of the printer and that in the condition installed in the ASF. In the shown embodiment, since the printer 101 and the ASF 1 are electrically connected by the connectors, the printer 101 can electrically detect installed condition and released condition of the ASF 1. By this result of detection, judgment for offset of the printing position can be made. Other than the method for detecting electrical connection, it can be performed by means of an ASF detection switch or so on. By offsetting the sheet reference between that in the sole unit of the printer and that in the condition installed in the ASF, with avoiding interference of the reference guides, the printing position onto the sheet can be made the same. Accordingly, in printing both in the sole unit of the printer and in the condition installed in the ASF, a problem, such as difference of the printing positions on a pre-printed paper, which can be caused due to difference of the printing position, can be successfully avoided. Here, the sheet reference shifting amount t and the shifting amount of the printing position are not required to be completely the same amount, but can be difference values within an allowable range.

(Concerning ASF Feeder Tray)

Next, explanation will be given for the ASF feeder tray supporting the stacked sheets.

Figure 8:
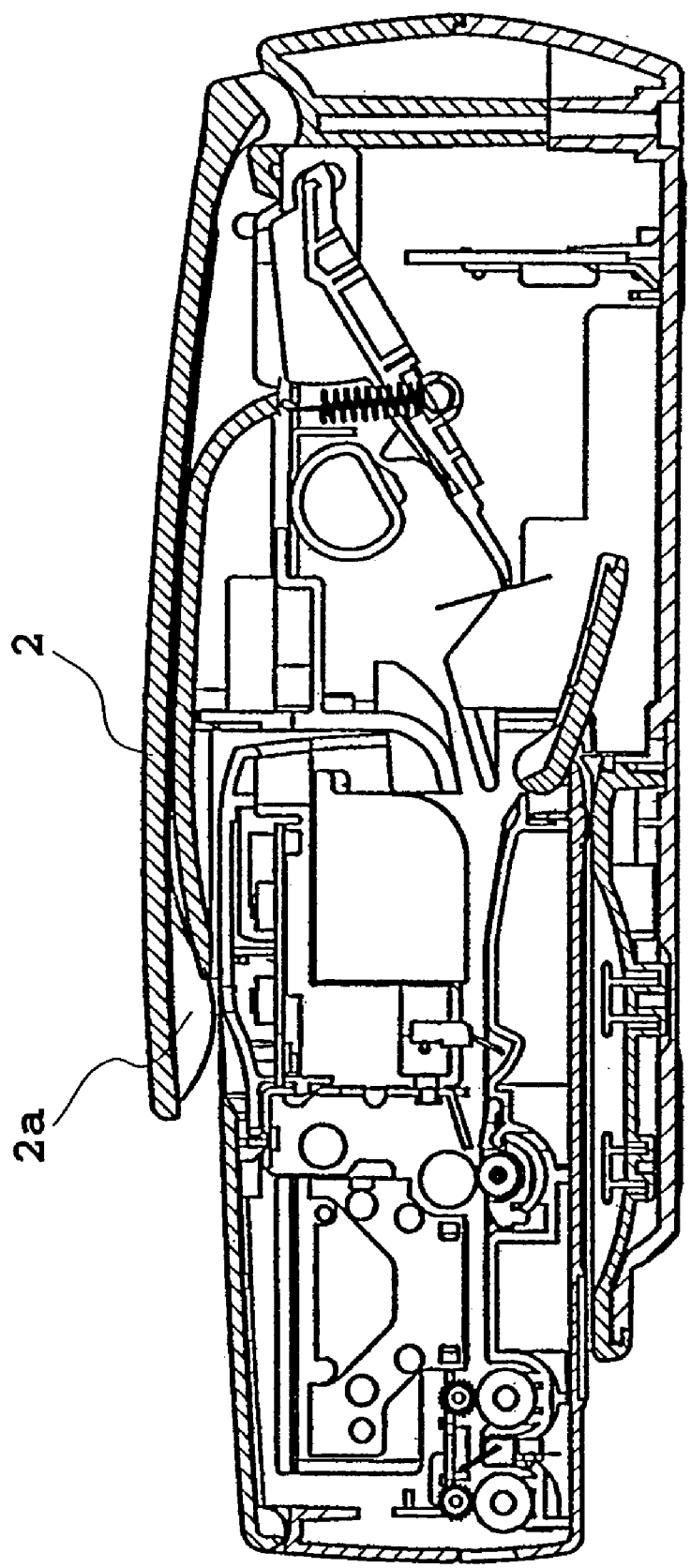
FIG. 8 is a section of the first embodiment of the printing apparatus and the automatic feeding apparatus according to the present invention, illustrated in the assembled condition.
Figure 10:
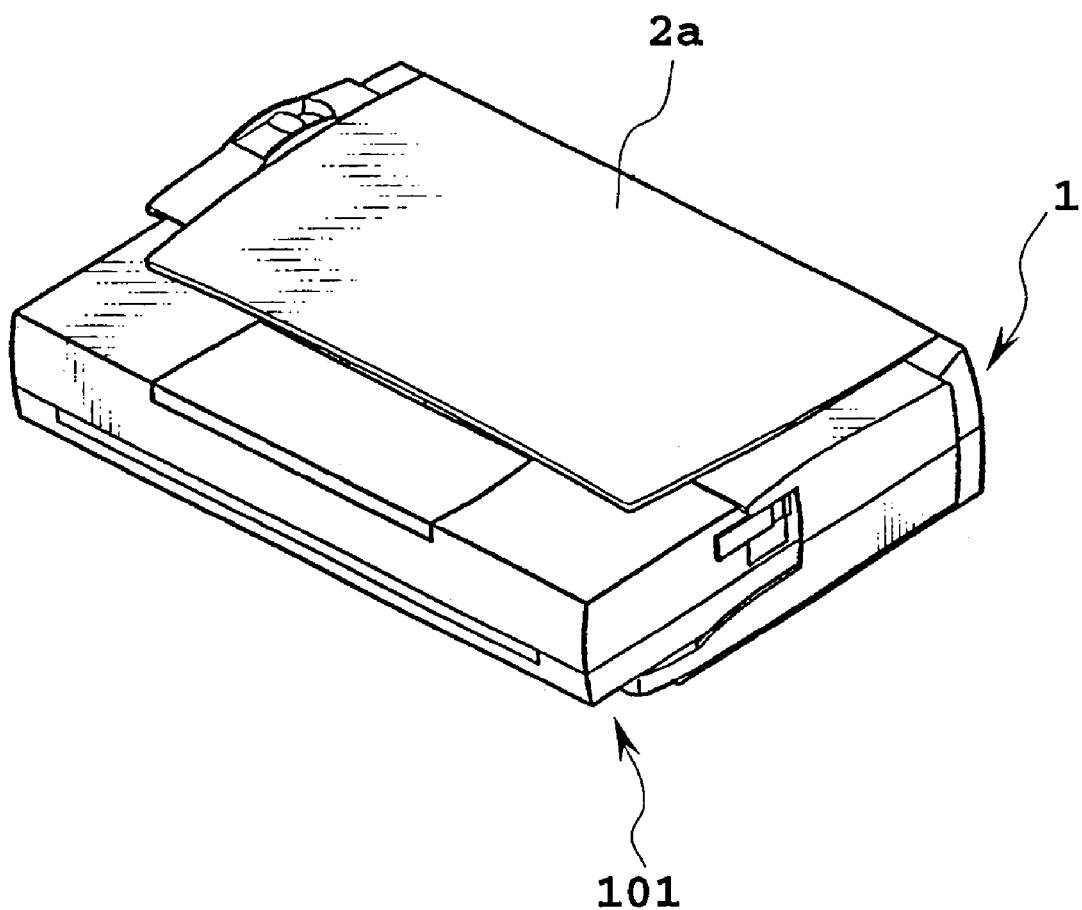
FIG. 10 is a perspective view of the first embodiment of the printing apparatus and the automatic feeding apparatus according to the present invention.

As shown in FIGS. 1 to 4, the ASF feeder tray 2, at one end of which, is supported on the ASF upper case 47, and is pivotable about the support portion. FIG. 8 shows a condition where the ASF feeder tray 2 is closed. The ASF feeder tray 2 is opened with a predetermined angle when the sheets are stacked, and is closed while the sheets are not stacked. This means that the shown embodiment of the ASF 1 is not only for using the portable type printer 101 as desktop type but also for enabling hand carrying in the condition where the printer 101 is installed in the ASF 1 for quite compact in the assembled condition. In order to realize such use condition, when the ASF feeder tray 2 is in closed condition, it becomes necessary that the ASF feeder tray 2 is closed along the outer contour of the ASF 1 in the printer installed condition. Therefore, the ASF feeder tray 2 is in thin plate form. On the other hand, the shown embodiment of the ASF feeder tray 2 is in a form covering the operating portion of the printer 101, as shown in FIG. 10. Therefore, when the ASF feeder tray 2 is hand carried in the condition where the ASF feeder tray 2 is closed with maintaining the printer 101 installed in the ASF 1, unwanted access to the operating portion for cause unintentional operation of the printer can be avoided. On the other hand, when the ASF feeder tray 2 is closed, by engaging the arbitrary portion with the ASF upper case 47, the ASF feeder tray 2 may not be opened unwantedly during hand carrying.

Figure 9:
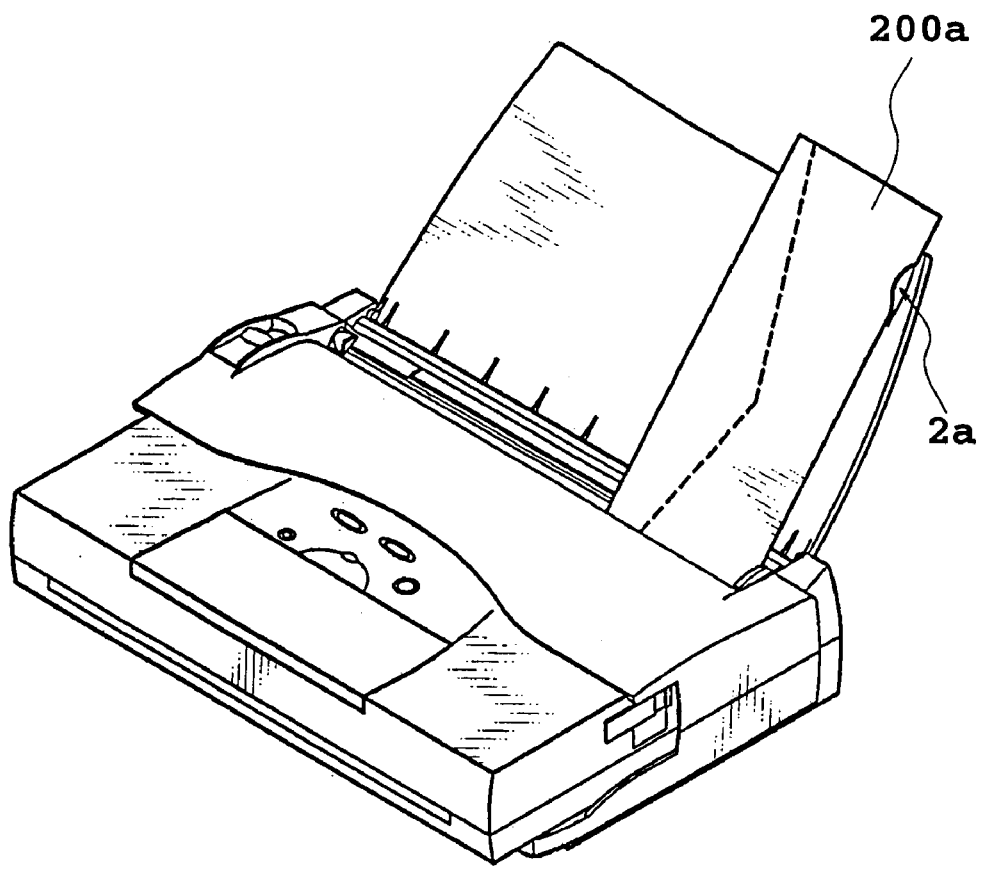
FIG. 9 is a perspective view of the first embodiment of the printing apparatus and the automatic feeding apparatus according to the present invention.

On the other hand, as shown in FIG. 9, when an envelope 200a is fed in a longitudinal direction by the ASF 1, a tab of the envelope 200a is normally placed on left side. In the shown embodiment of the ASF 1 and so on, due to the envelope tab may be expanded in accordance with humidity, the tab side (left side) of the envelope 200a is given greater resistance (hereinafter also referred to as "resistance of the tab") when the envelope 200a is fed. By this, the envelope 200a may be subject to a force to cause pivoting in clockwise direction. In the shown embodiment, in order to prevent pivotal motion of the envelope 200a in clockwise direction, an ASF feeder tray side guide portion 2a (hereinafter also referred to as "side guide portion") is provided on the upstream side portion of the ASF feeder tray 2 in the sheet feeding direction. When the envelope 200a is set in the ASF 1 longitudinally, the right side of the rear end of the envelope 200a is positioned along the side guide 2a to prevent further pivotal movement in the clockwise direction. In case of longitudinal paper feeding of the envelope 200a, resistance of the tab is received at a timing for feeding the envelope 200a. In the shown embodiment, when the envelope 200a moves over the ridge sheet 37, resistance of the tab is exerted. Also, when the tip end of the envelope 200a is lifted up along the tilted surface of the ridge 36 immediately after moving over the ridge sheet 37, resistance of the tab is exerted. After these timing, influence of resistance of the tab becomes small to cause no pivotal motion in the clockwise direction even when the side guide 2a is not provided. In such reason, in the shown embodiment, the side guide 2a is provided in a part of the portion of the ASF feeder tray 2. Namely, the side guide 2a is opposite to the vicinity of the rear end of the envelope 200a to prevent pivotal motion of the envelope 200a in the clockwise direction, and the side guide 2a is not provided over the entire range in the longitudinal direction of the envelope 200a. Such partly provided side guide 2a is received in a stepped portion formed between the ASF upper case 47 and the printer 101 when the ASF feeder tray 2 is closed. Thus, when the ASF feeder tray 2 is closed, the side guide 2a does not cause interference with other portion. Therefore, the ASF feeder tray 2 can be received in a form along the outer contour of the ASF 1 to acquire porting ability.

On the other hand, the height of the side guide portion 2a may be effective as long as it has a height greater than or equal to a total thickness of the envelopes when the envelopes are stacked. A stepped portion having the height greater than or equal to the total thickness of the stacked envelopes is required to be provided between the ASF upper case 47 and the printer 101.

The shown embodiment of the ASF feeder tray 2 is effective for preventing pivotal motion of the envelope in clockwise direction in longitudinal feeding of the envelope. Also, when pivoting force in clockwise direction is caused in some reason for other sheet having a length equivalent to that of the envelope, such pivotal motion in clockwise direction can be prevented.

On the other hand, the side guide 2a is formed integrally with the ASF feeder tray 2 to permit lowering of the cost therefor.

It is also possible that, instead of receiving the side guide 2a within the stepped portion when the ASF feeder tray 2 is closed, the side guide 2a may be received in a recessed portion (dented portion) preliminarily formed in the printer 101 or the ASF 1.

(Installation and Releasing Mechanism of ASF and Printer)

Figure 11:
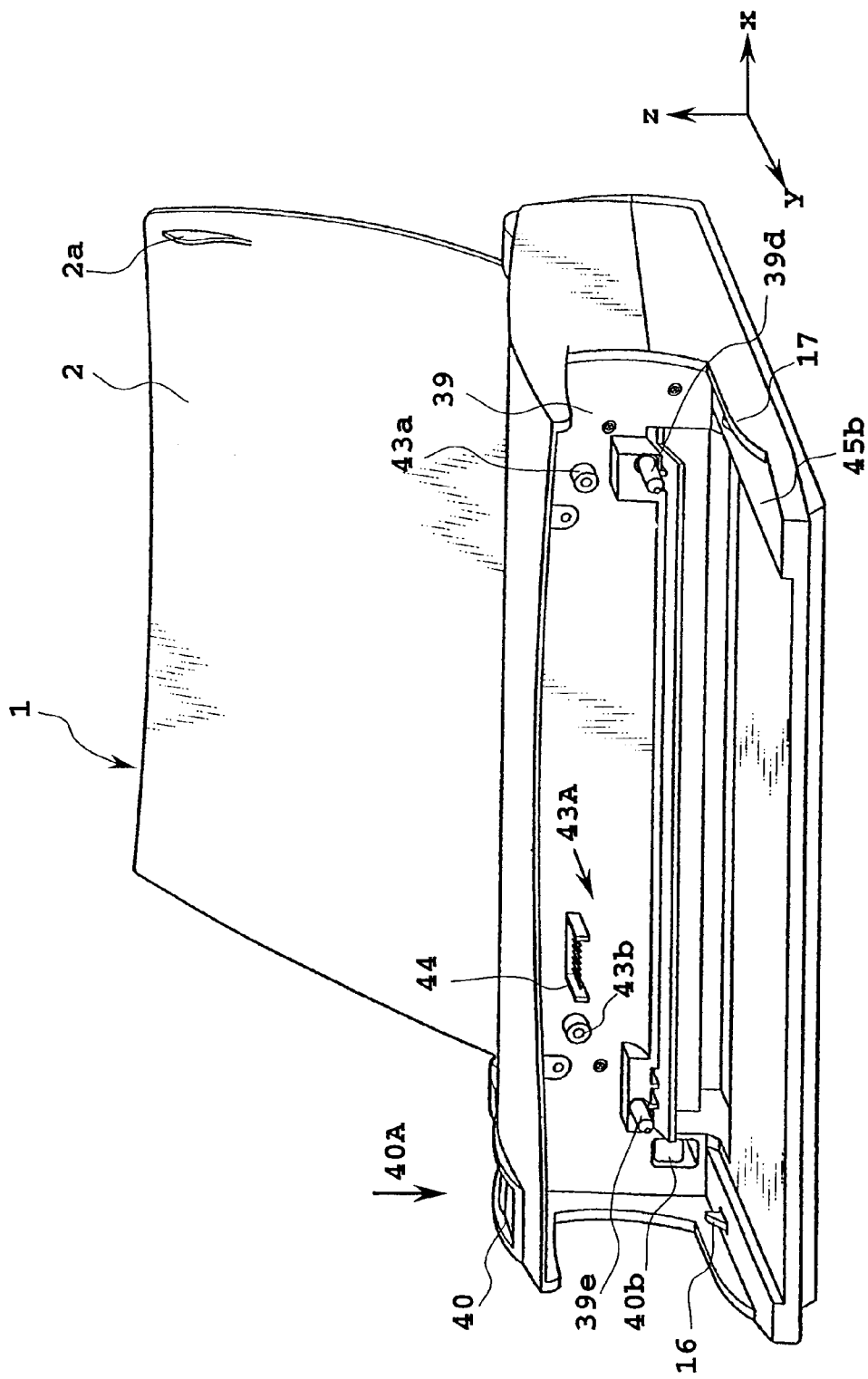
FIG. 11 is a perspective view showing arrangement of parts associated with installation and releasing in the automatic feeding apparatus in the first embodiment of the present invention.
Figure 12:
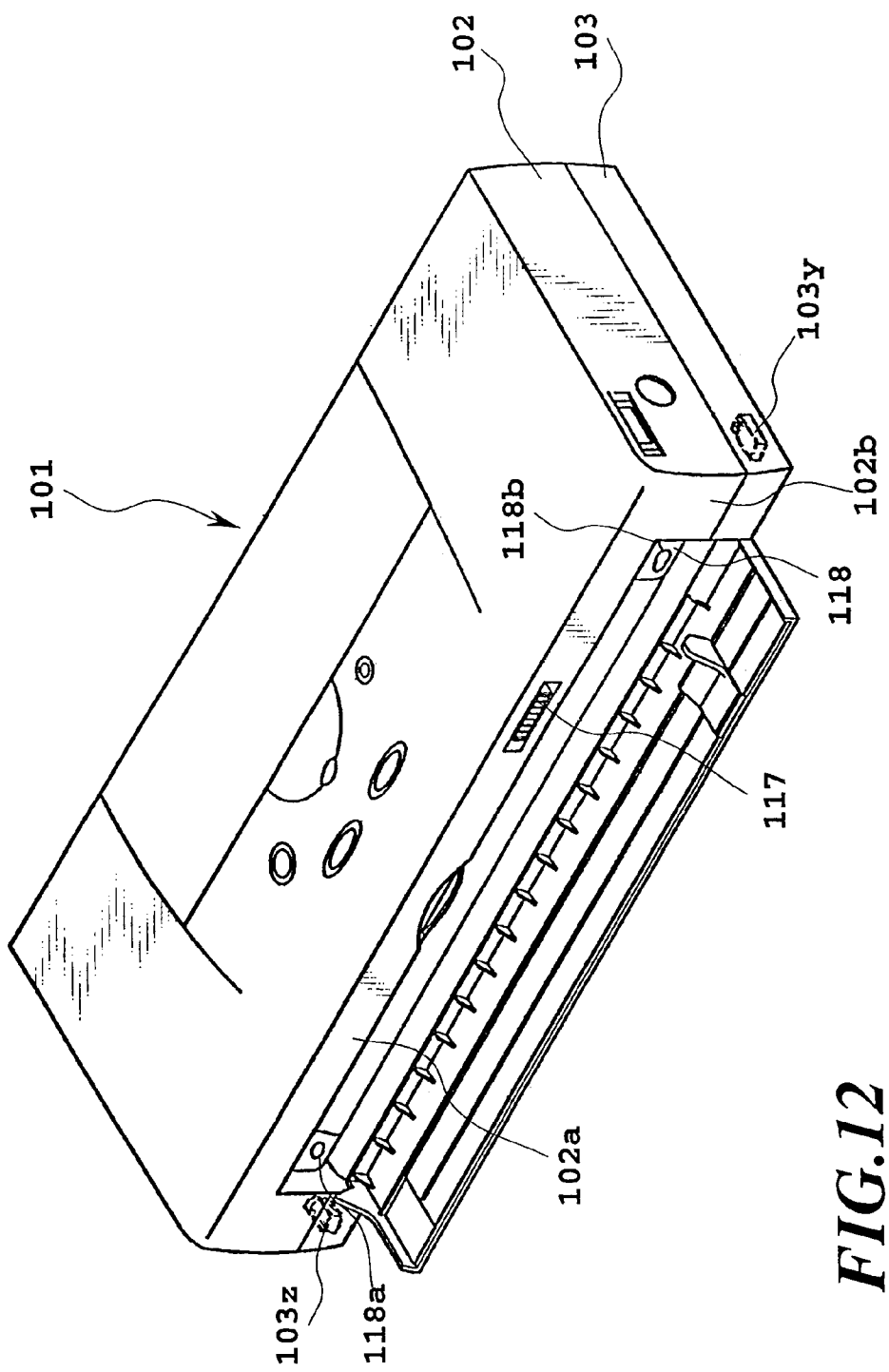
FIG. 12 is a perspective view showing arrangement of parts associated with installation and releasing in the printing apparatus in the first embodiment of the present invention.

FIG. 11 is a perspective view showing arrangement of parts associated with printer installation and releasing mechanism in the ASF 1. Also, FIG. 12 is a perspective view showing arrangement of parts associated with printer installation and releasing mechanism in the printer 101.

In FIG. 11, a positioning base 39 is a member for performing positioning of paper paths between the ASF 1 and the printer 101 and for positioning for connection between the ASF connector 44 of the ASF 1 and the connector 117 of the printer 101. Namely, in the positioning base 39, two positioning bosses 39d and 39e are provided. When the printer 101 is installed in the ASF 1, in advance of connection between the ASF connector 44 and the connector 117, the positioning boss 39d is engaged with a positioning hole 118a provided in a substrate holder 118 of the printer 101, and the positioning boss 39e is engaged with a positioning elongated hole 118b. Accordingly, connection between the connectors 44 and 117 is performed after positioning to prevent phase shift therebetween and damaging of the connectors 44 and 117 due to phase shift. By engagement between the bosses 39d, 39e and the holes 118a, 118b, positioning between the ASF 1 and the printer 101 in x and z directions is performed. Therefore, positioning of paper path between the printer 101 and the ASF 1 can be done simultaneously.

In the ASF 1, in order to position the printer 101 in y direction after installation, a hook (left side) 16 and a hook (right side) 17 are provided. On the other hand, in both sides of the base 103 of the printer 101, hook engaging holes 103y, 103z engaging with respective hooks 16 and 17 are provided. When the printer 101 is installed in the ASF 1, the hook (left side) 16 and the hook (right side) 17 provided in the ASF 1 are engaged with the hook engaging holes 103y and 103z provided in the printer 101 to perform positioning of the printer 101 in y direction.

Removal of the printer 101 from the ASF 1 is achieved when the user pushes the push lever 40 in the direction of arrow 40A. Namely, when the push lever 40 is pushed in the direction of arrow 40A, the hook (left side) 16 and the hook (right side) 17 set forth later are retracted in the direction of arrow 40A to release engagement from the hook engaging holes 103y and 103z of the printer 101. Then, by means of pop-ups 43a and 43b provided in the ASF 1, a portion 102a of the printer 101 is pushed in the direction of arrow 43A(y) to release connection between the connectors 44 and 117. The pop-ups 43a and 43b are biased in the direction of arrow 43A(y) by a not shown elastic member and are slidable in y-direction. Biasing force of the pop-ups 43a and 43b acts as reaction force upon installation of the printer 101 into the ASF 1. Accordingly, if the biasing force of the pop-ups 43a and 43b is excessive, the printer 101 may not be pushed into the ASF 1 so that installation of the printer 101 becomes impossible. Therefore, the biasing force to be exerted on the pop-ups 43a and 43b is set appropriately (in the extent that the ASF 1 may not be moved by the biasing force upon installation of the printer 101 into the ASF 1).

If a force required for disconnection of the connectors 44 and 117 becomes greater than the biasing force to the pop-ups 43a and 43b, it becomes impossible to release connection between the connectors 44 and 117 only by the pop-ups 43a and 43b. Therefore, in the shown construction, by pushing the push lever 40 in the direction of arrow 40A, a portion 40b of the push lever 40 projects in the direction of arrow y. Accordingly, by projecting the portion 40b of the push lever 40 to push a portion 102b of the printer 101 in the direction of arrow y, the connectors 44 and 117 are disconnected. Accordingly, the user may easily withdraw the printer 101 from the ASF 1 in the direction of arrow y in the condition where engagement of the printer 101 and the ASF 1 in y direction and connection between the connectors 44 and 117 are released.

FIGS. 13 to 18 are sections for explaining greater detail of the installation and releasing mechanism of the ASF 1 and the printer 101, set forth above.

Figure 13:
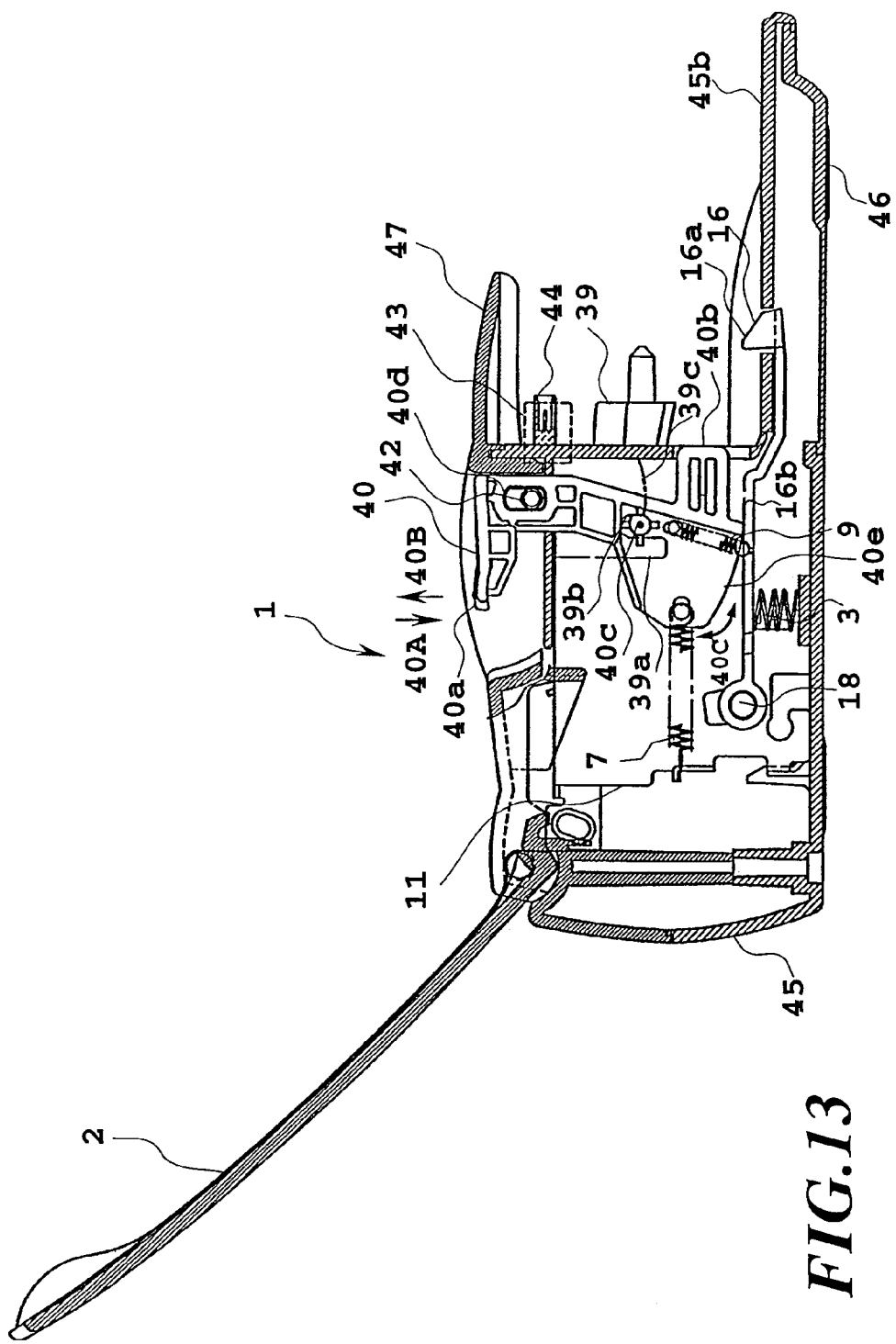
FIG. 13 is a section of first embodiment of the automatic feeding apparatus according to the present invention.

FIG. 13 is a section showing arrangement of components associated with installation and releasing of the printer 101 to and from the ASF 1. In FIG. 13, the push lever 40 is mounted on a lever shaft 42 fixed to the positioning base 39 for movement in the direction of arrows 40A and 40B and for pivoting in a direction of arrow 40C. On the other hand, between the hook lever 40 and the chassis 11, a push lever spring 7 is stretched. On the push lever 40, a boss 40c is provided as pivoting stopper. On the other hand, on the positioning base 39, sliding surfaces 39a, 39b and 39c for guiding the bosses 40c are provided. In FIG. 13, the sliding surfaces 39a, 39b and 39c are shown by two dotted lines for the purpose of illustration and facilitating understanding of the construction. With the shown construction, pivotal motion of the push lever 40 about the lever shaft 42 is restricted by abutting the boss 40c of the push lever 40 onto the guide surface 39b.

The hook (left side) 16 is fixed to the hook shaft 18 which is rotatably mounted on the ASF chassis 11. Not shown hook (right side) 17 is also fixed on the hook shaft 18, similarly. The hook (left side) 16 and the hook (right side) 17 are cooperated. The hook (left side) 16 and the push lever 40 are biased toward each other by a connecting spring 9. The sliding surface 40e of the push lever 40 and the portion 16b of the hook (left side) 16 are constantly held in contact. On the other hand, between the hook (left side) 16 and the ASF base 45, a hook spring 3 is disposed in compressed. By the biasing force of the hook spring 3, a claw portion 16a of the hook (left side) 16 is projected from the surface of the printer sliding portion 45b of the base 45.

(Installation Operation of Printer)

Figure 14:
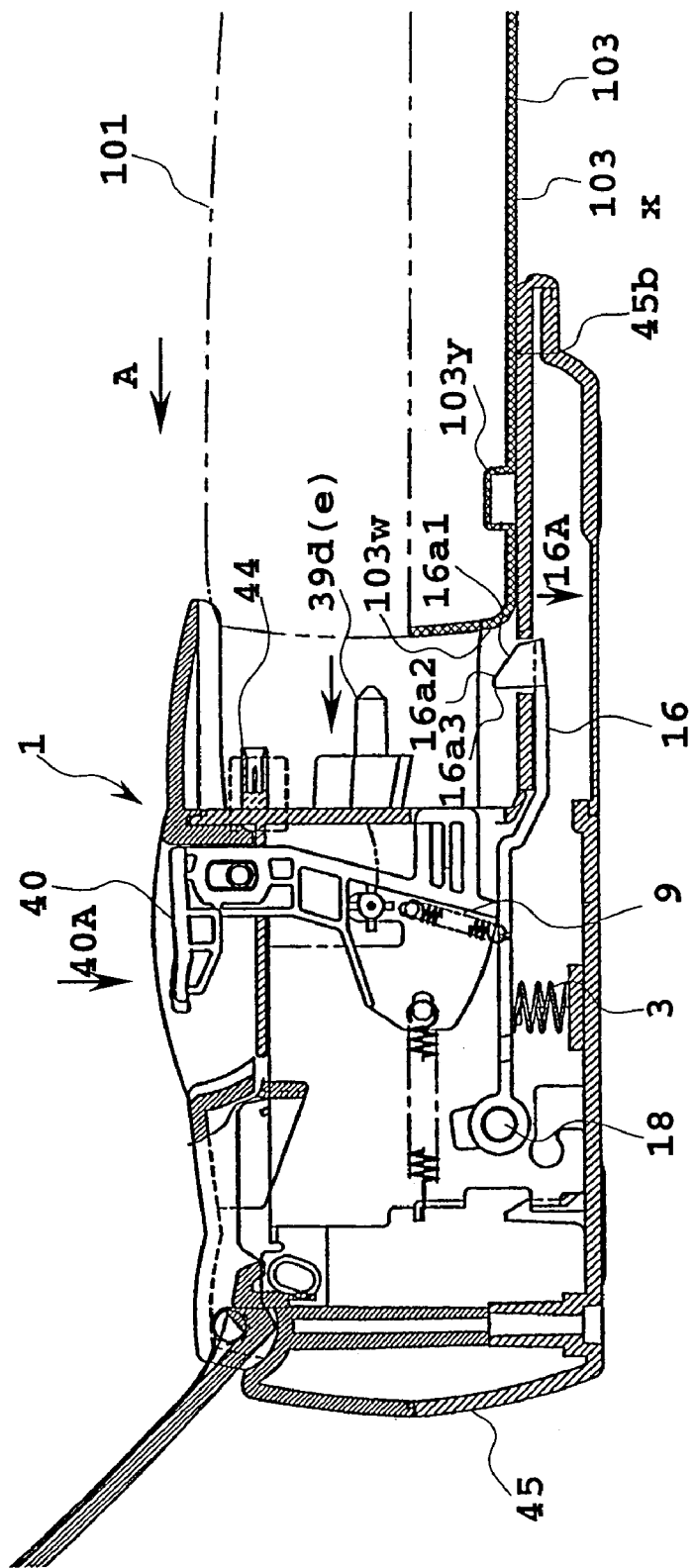
FIG. 14 is a section showing the first embodiment of the printing apparatus and the automatic feeding apparatus according to the present invention, illustrated in a condition at mid-way of assembling.

FIG. 14 shows a condition where the printer 101 is mounted on the printer sliding portion 45b in order to install the printer 101 into the ASF 1. In FIG. 14, in order to clearly explain the mechanism, the printer 101 is illustrated in two-dotted line and the base 103 of the printer 101 is shown by section.

The printer 101 is moved in the direction of arrow A along the printer sliding portion 45b of the ASF base 45. From the condition shown in FIG. 14, when the printer 101 is further pushed in the direction of arrow A, the tilted surface 16a1 of the claw portion of the hook (left side) 16 contacts with a bottom surface 103w of the base of the printer 101.

By further pushing the printer 101, the hook (left side) 16 is pivoted about the hook shaft 18 downwardly in the direction of arrow 16A, so that the flat surface 16a2 of the claw portion of the hook (left side) 16 contact onto the bottom surface 103w of the base. At the same time, the push lever 40 linked with the hook (left side) 16 by the connecting spring 9 is pivoted downwardly in the direction of arrow 40A. At the pushed position of the printer 101, the positioning bosses 39d and 39e are placed in engaged condition with the positioning hole 18a and the positioning elongated hole 18b (see FIG. 12), so that positioning between the ASF connector 44 and the connector 117 on the printer side is established before connection.

Figure 16:
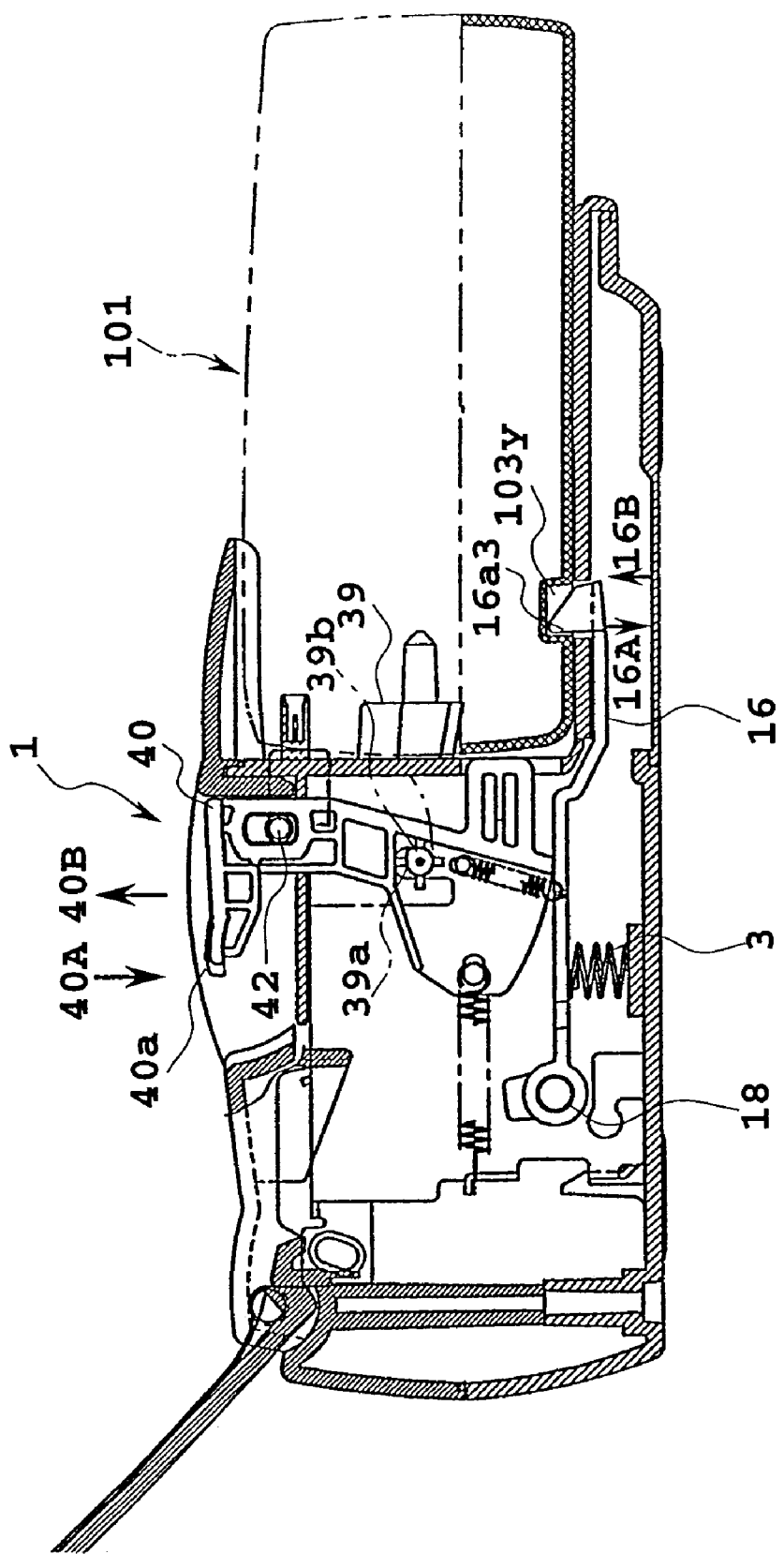
FIG. 16 is a section showing the first embodiment of the printing apparatus and the automatic feeding apparatus according to the present invention, illustrated in a condition as assembling.

By further pushing the printer 101 in the direction of arrow A, the ASF connector 44 and the connector 117 are connected. Then, if the claw portion 16a of the hook (left side) 16 reaches the position opposing to the hook engaging hole 103y of the printer 101, the hook (left side) 16 is lifted upwardly in the direction of arrow 16B by the biasing force of the hook spring 3, as shown in FIG. 16. Then, a fixing surface 16a3 of the claw portion of the hook (left side) 16 abuts onto the wall of the hook fixing hole 103y of the printer 101 to be placed in engaging condition. Simultaneously, the push lever 40 is cooperated to be lifted up in the direction of arrow 40B. By this, the user can confirm installation (fixing) of the printer 101 into the ASF 1.

On the other hand, since the hook (left side) 16 and the hook (right side) 17 are fixed on the hook shaft 18, unless these hooks 16 and 17 are engaged with the corresponding hook fixing holes 103y and 103z of the printer 101, the push lever 40 will never be lifted up in the direction of arrow 40B. Accordingly, when one of the hooks 16 and 17 is not engaged with the fixing hole 103y or 103z of the printer 101, for example, installation failure that the printer 101 is installed with respect to the ASF 1 obliquely, by checking the height position of the push lever 40, installation failure can be successfully prevented by the user. In the shown construction, the engaging positions between the hooks 16 and 17 and the printer 1 are set at the same height position as the rotation center of the hooks 16 and 17 or slightly higher than the position of the rotation center. By this, when attempt is made to forcedly withdraw the printer 101 from the ASF 1, the hooks 16 and 17 are stopped at the position where force balance is established. Namely, the hooks 16 and 17 are stopped at the same height as the rotation center of the hooks 16 and 17. Therefore, the printer 101 will never withdrawn from the ASF 1.

(Operation for Withdrawing Printer)

Next, explanation will be given for the case here the printer 101 is withdrawn from the ASF 1.

Figure 17:
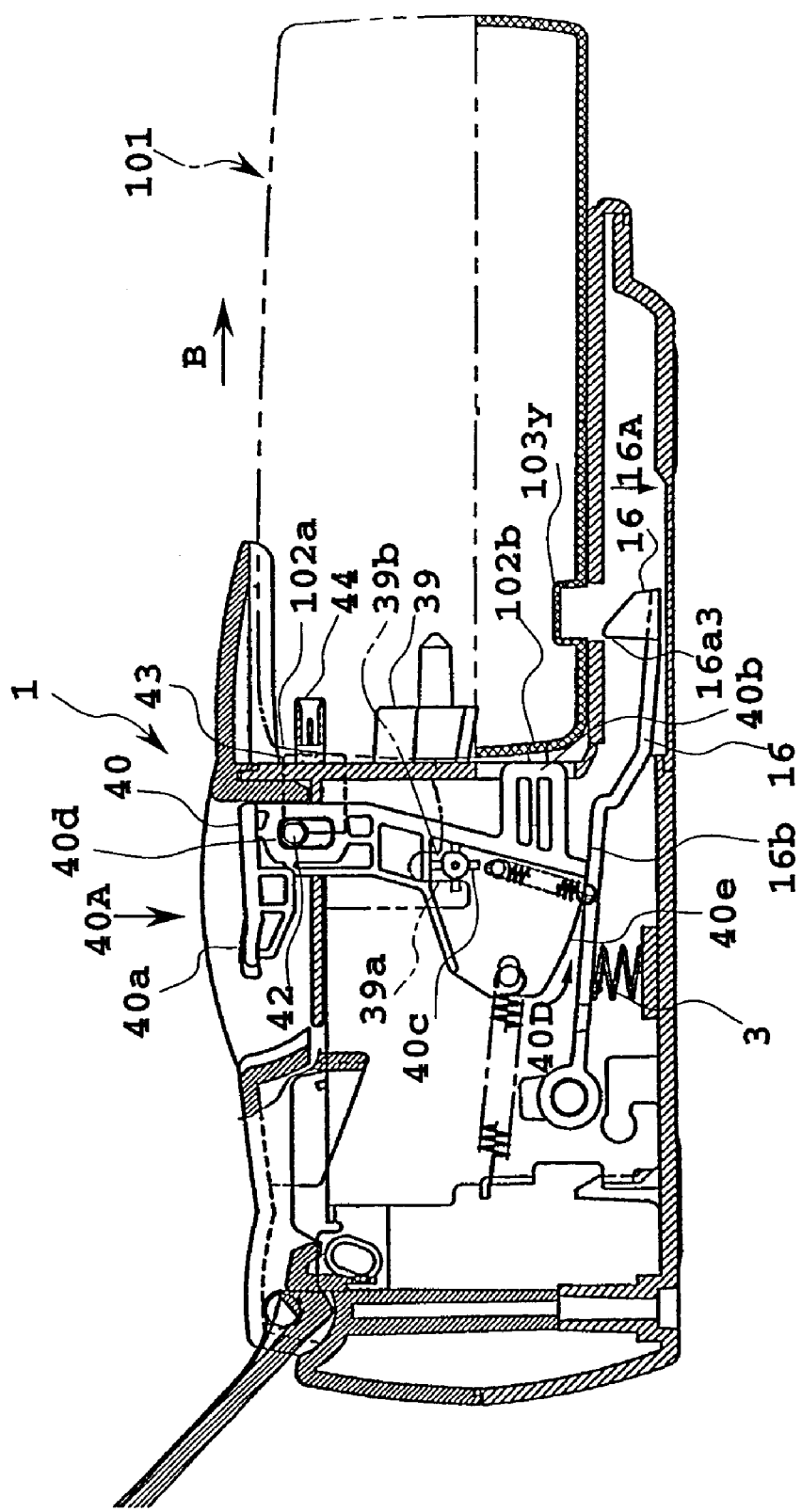
FIG. 17 is a section showing the first embodiment of the printing apparatus and the automatic feeding apparatus according to the present invention, illustrated in a condition at initiation of separation.

When the user want to remove the printer 101 from the ASF 1, at first, the push portion 40a of the push lever 40 is pushed by the finger in the direction of arrow 40A. At this time, the boss 40c of the push lever 40 is disposed between the guide surfaces 39a and 39b provided in the positioning base 39. Therefore, the push lever 40 cannot be pivoted about the lever shaft 42 until the boss portion 40c is downwardly released from the guide surface 39b, so that push lever 40 is lowered in the direction of arrow 40A. On the other hand, since the push lever 40 and the hook (left side) 16 are linked, the hook (left side) 16 is pivoted in the direction of arrow 16A about the hook shaft 18 simultaneously with lowering of the push lever 40. By this, as shown in FIG. 17, engagement between the hook engaging hole 103y of the printer 101 and the fixing surface 16a3 of claw portion of the hook (left side) 16 is released. On the other hand, pop-up contacting portion 102a of the printer 101 is pushed in the direction of arrow B by the pop-up 43 (43a and 43b) shown by broken line in FIG. 17. At the same time, connection between the ASF connector 44 and the connector 117 is released. In this condition, when the user release the pushing to the push lever 40 in the direction of arrow A, the condition is placed to shown in FIG. 15. This condition is that connection between the connectors 44 and 117 is released and the hooks 16 and 17 and the printer 101 are disengaged. At this condition, the user may easily withdraw the printer 101 from the ASF 1.

Here, it is possible that the pushing force of the pop-up 43 is grown to exceed a force required for disconnection between the connectors 44 and 117. In such condition, even when engagement between the hooks 16 and 17 and the printer 101 is released, the printer 101 cannot be moved to place the condition shown in FIG. 15. Therefore, the user may not withdraw the printer 101 from the ASF 1. Therefore, in the shown construction, an ejecting function by the user is added.

Namely, in the condition shown in FIG. 17, the hook (left side) 16 is placed in a position where engagement with the hook engaging hole 103y is released. Thus, since the boss 40c of the push lever 40 is released downwardly from the guide surface 39b of the positioning base 39. Therefore, restriction of movement in the direction of the arrow 40A by the guide surface 39b is released on the other hand, the push lever 40 is in a position where the upper end surface of the hole portion 40d is pushed onto the lever shaft 42 so that pushing down of the hooks 16 and 17 is restricted. The sliding surface 40e of the push lever 40 for the hook is formed into an arc-shaped configuration centered as the lever shaft 42. Therefore, even if the push lever 40 is pivoted, the position of the hook (left side) 16 is held unchanged.

Figure 18:
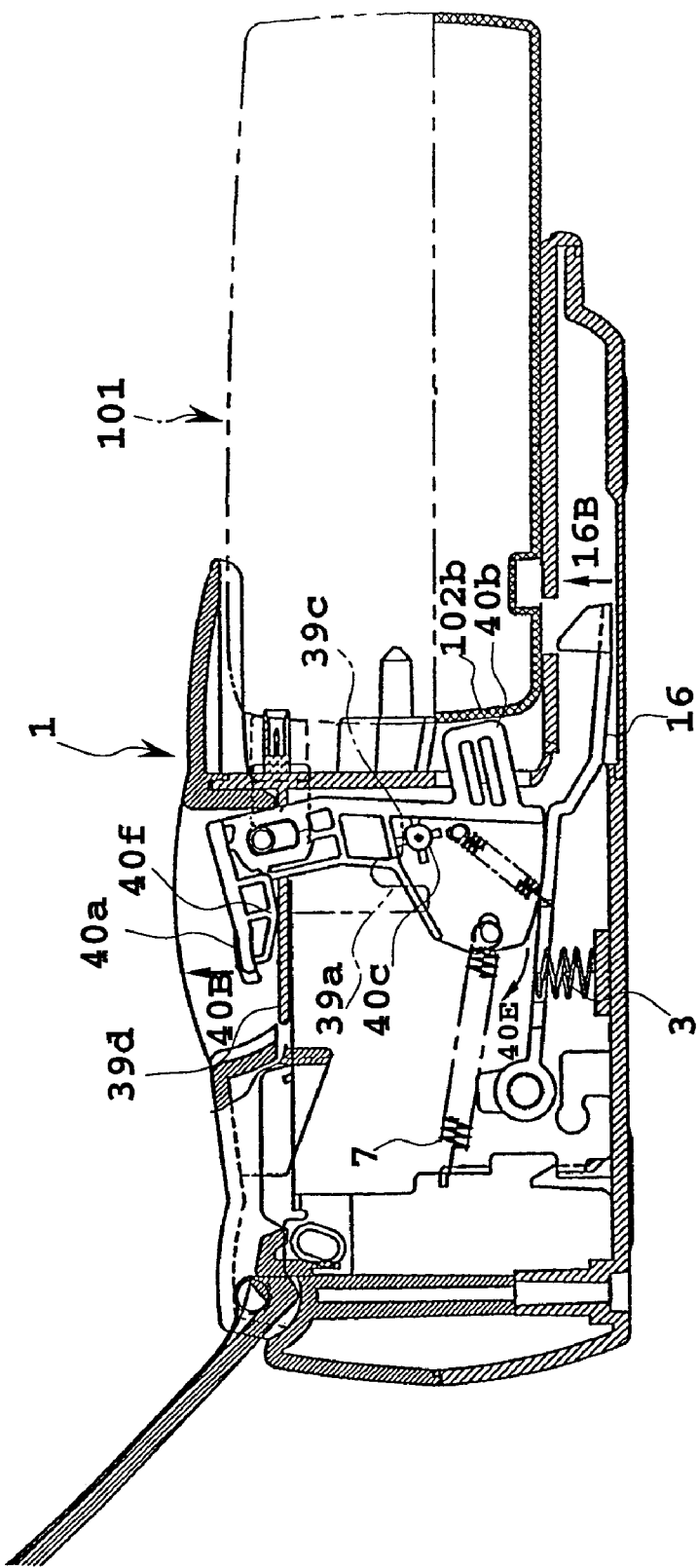
FIG. 18 is a section showing the first embodiment of the printing apparatus and the automatic feeding apparatus according to the present invention, illustrated in a condition at mid-way of separation.

In the condition shown in FIG. 17, when the user further pushes the pushing portion 40a of the push lever 40 in the direction of arrow 40A, the push lever 40 is pivoted in the direction of arrow 40D (see FIG. 17) about the lever shaft 42. Then, with maintaining the hooks 16 and 17 and the printer 101 in disengaged condition, the pushing portion 40b of the push lever 40 abuts onto the contact portion 102b of the printer 101 so that the printer is pushed in the direction of arrow B. The push lever 40 is restricted pivotal motion by abutting the stopper portion 40f onto the stopper portion 39f of the positioning base 39, as shown in FIG. 18. Here, a pushing amount of the printer 101 by the push lever 40 set to an amount for releasing engagement between the hooks 16 and 17 and the printer 101 and releasing connection between the connectors 44 and 117.

Figure 15:
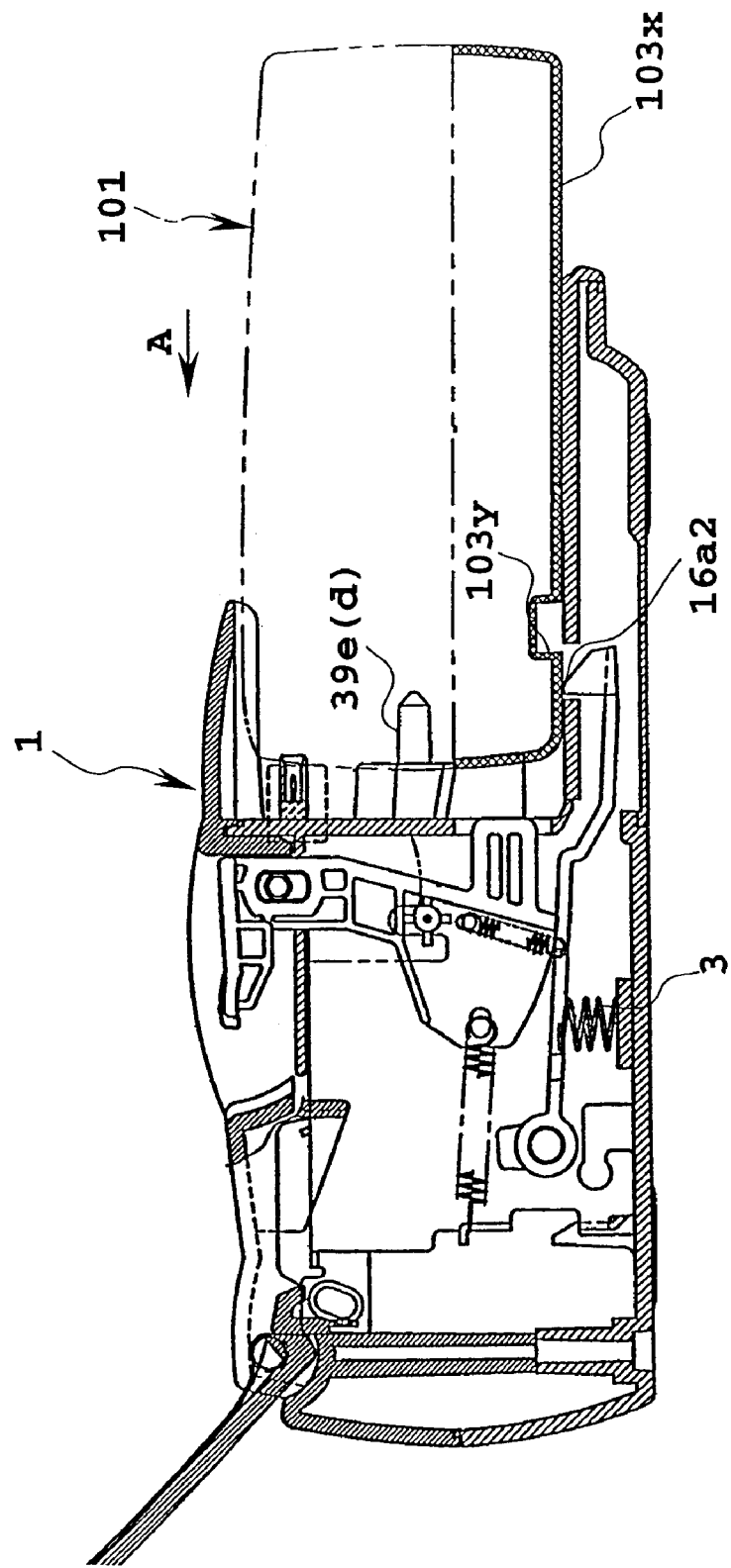
FIG. 15 is a section showing the first embodiment of the printing apparatus and the automatic feeding apparatus according to the present invention, illustrated in a condition at mid-way of assembling.

After pushing the printer 101, the user releases a pushing force to the push portion 40a of the push lever 40. When the pushing force is released, the hook (left side) 16 is lifted up in the direction of arrow 16B by the hook spring 3. At the same time, the push lever 40 is also pushed upwardly by the hook (left side) 16, so that the boss 40c of the push lever 40 is abutted onto the guide surface 39c of the positioning base 39. Then, by a tension force of the push lever spring 7, the push lever 40 is pivoted in the direction of arrow 40E. And, by abutting the boss 40c of the push lever 40 onto the guide surface 39a of the positioning base 39, pivotal motion of the push lever 40 is restricted. Then, by a spring force of the hook spring 3, the push lever is lifted upwardly in the direction of arrow 40B. Finally, as shown in FIG. 15, connection between the connectors 44 and 117 is released.

Also, the hooks 16, 17 and the printer 101 are released from engagement. Then, the user may easily withdraw the printer 101 from the ASF 1.

In the construction as set forth above, the push lever 40 is pushed in substantially vertical direction and the printer 101 is withdrawn in substantially horizontal direction. By pushing the push lever 40 in substantially vertical direction, a force in vertical direction acts on the ASF 1. Therefore, even when the printer 101 is pushed out in substantially horizontal direction, the ASF 1 will never be displaced in horizontal direction. On the other hand, since the printer 101 is pushed out in substantially horizontal direction, it will never moves back toward installing direction by its own weight so that failure in withdrawal is not caused.

(Arrangement Relationship of Installation and Releasing of ASF and Printer and so on)

Figure 19:
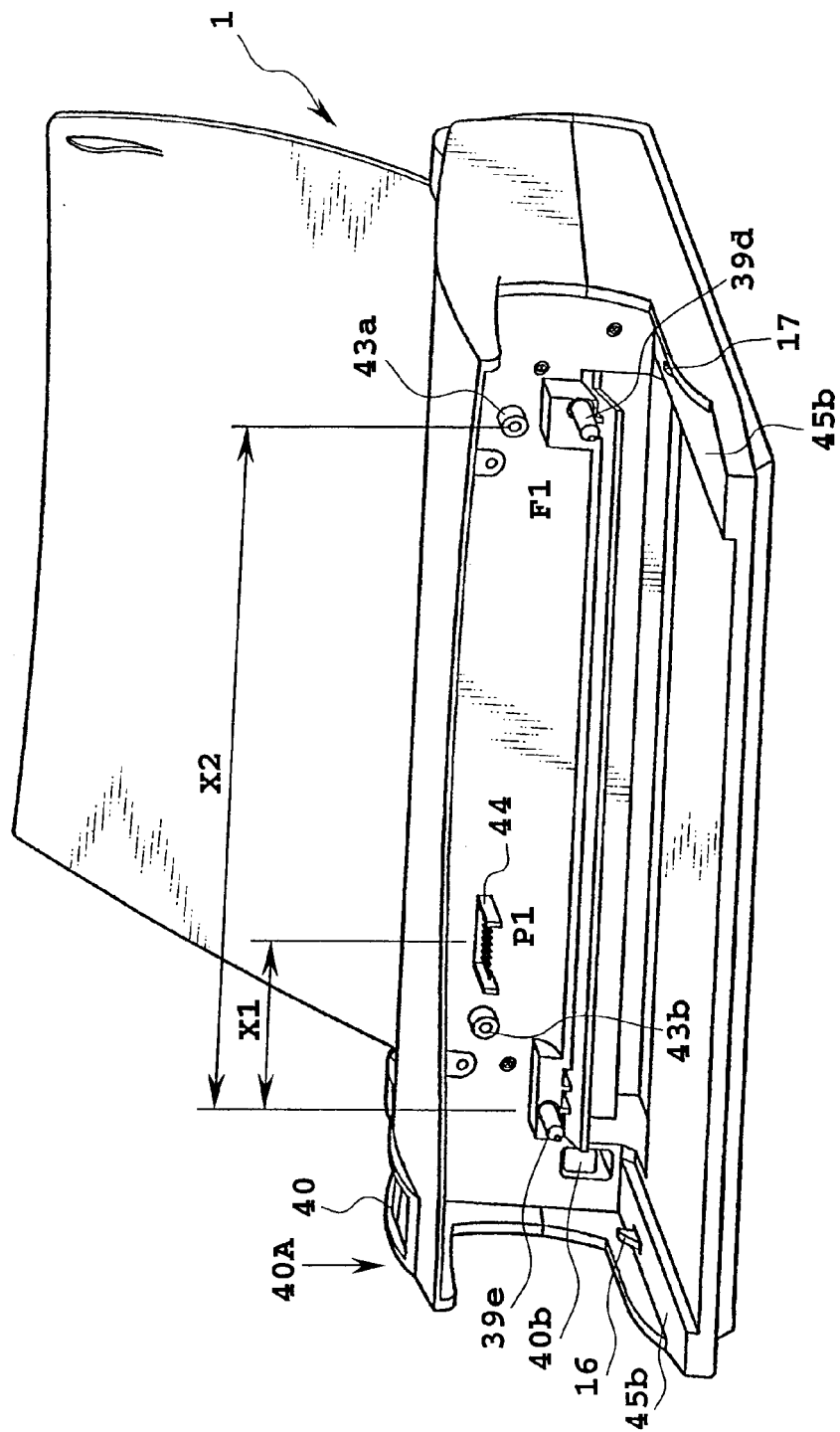
FIG. 19 is a perspective view for explaining arrangement and force relationship of the parts associated with installation and releasing in the automatic feeding apparatus in the first embodiment of the present invention.

FIG. 19 is an explanatory illustration showing arrangement relationship of the push lever 40, the pop-ups 43a, 43b, the positioning boss 39d, 39e, the hook (left side) 16, the hook (right side) 17. On the other hand, FIGS. 20 to 23 are simplified top plan view of the printer 101.

The positioning bosses 39d and 39e of the printer 101 and the hooks 16 and 17 are provided in the vicinity of both end portions in the width direction of the printer 101. The ASF connector 44 is arranged between the positioning bosses 39e and 39d, and is positioned relatively near to the boss 39e. The push lever 40 and the pop-up 43b are arranged at a position away from the ASF connector 44 as viewed from the positioning boss 39d. In such construction, when the printer 101 is withdrawn from the ASF 101, the push lever 40 is pushed in the direction of arrow 40A. Therefore, the hooks 16 and 17 are released from the engaging holes 103y and 103z of the printer 101, and the pushing portion 40b of the push lever 40 is abutted onto the printer 101, so that the printer 101 is pushed out. By this, releasing of connection between the connectors 44 and 117, and releasing of engagement between the hooks 16 and 17 and the hook engaging holes 103y and 103z can be achieved.

The pop-ups 43a and 43b are auxiliary member for reducing pushing force to be exerted on the push lever 40 by the user, and are biased in a direction for pushing out the printer 101 by a not shown elastic member. In this construction, upon pushing out of the printer 101 the printer 101 is pushed out with sliding on the printer sliding portion 45b with taking the positioning bosses 39d and 39e as pivots. The positioning hole 118a engaging with the positioning boss 39d is provided with the printer 101, and is formed into a circular hole. The positioning hole 118b engaging with the positioning boss 39e is provided with the printer 101, and is formed into an elongated hole.

Figure 20:
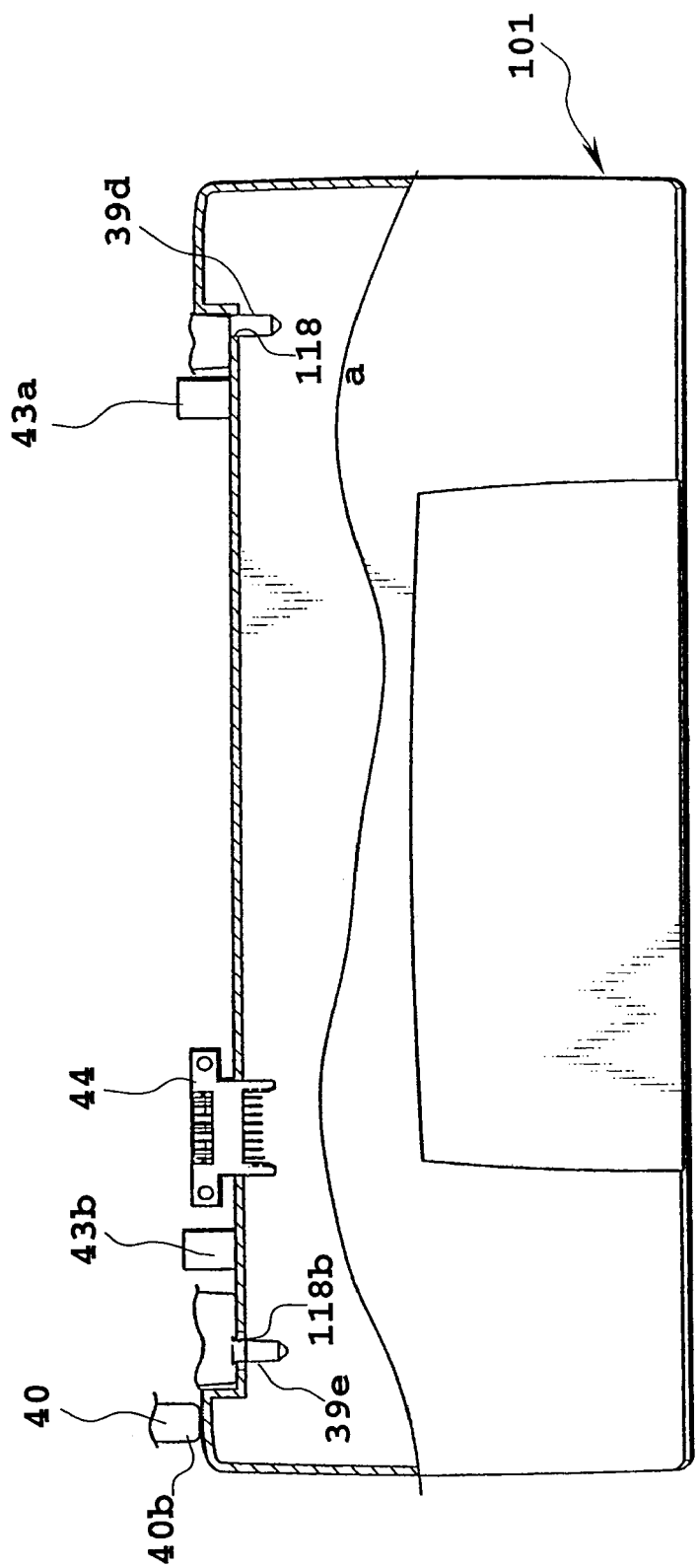
FIG. 20 is a section of the major part for explaining an installation and releasing mechanism in the printing apparatus and the automatic feeding apparatus in the first embodiment of the present invention.
Figure 21:
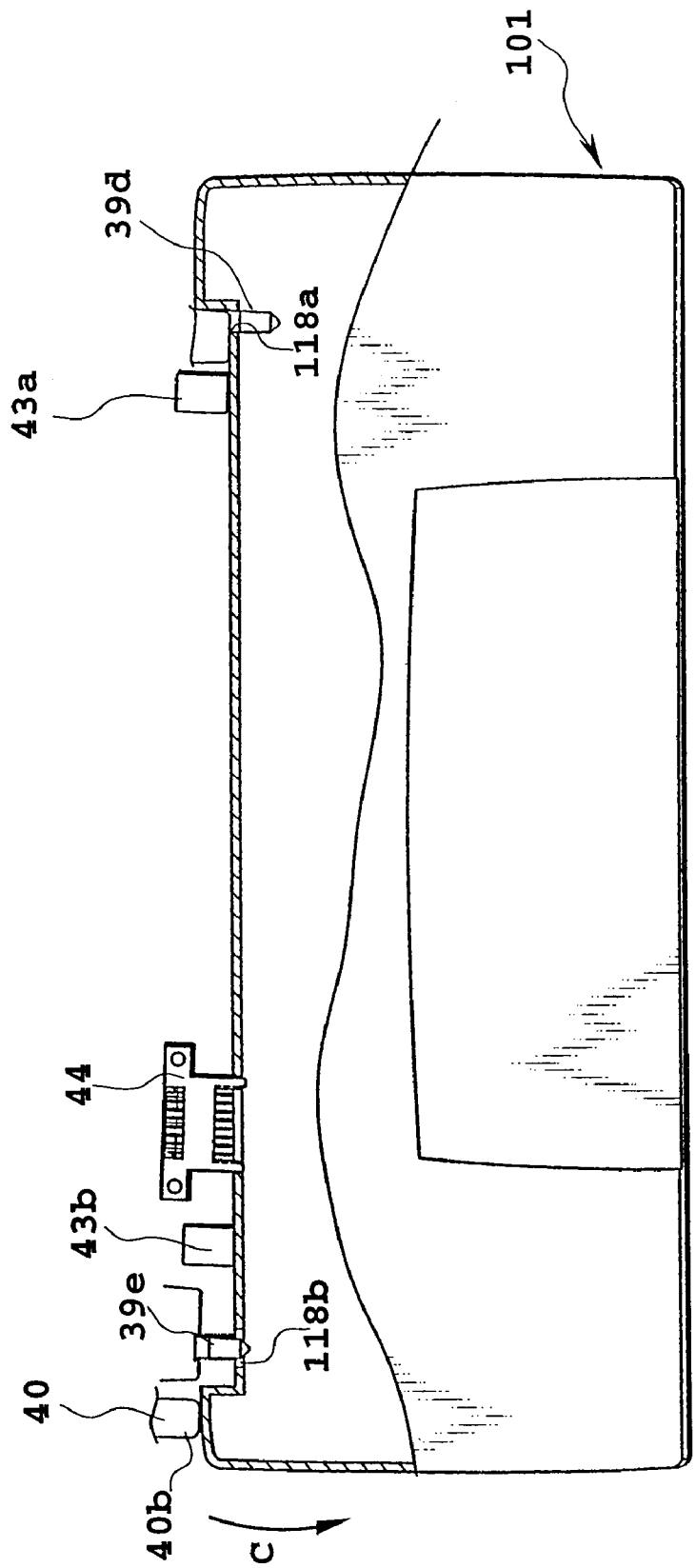
FIG. 21 is a section of the major part for explaining an installation and releasing mechanism in the printing apparatus and the automatic feeding apparatus in the first embodiment of the present invention.

Here, in a condition shown in FIG. 20, when the printer 101 is to be withdrawn from the ASF 1 with taking the positioning boss 39d as a pivot, a positional relationship between the printer 101 and the ASF 1 is shown in FIG. 21. However, in the condition shown in FIG. 21, biting is caused between the positioning boss 39d and the positioning hole 118a, so that it is made to be impossible to move the printer 101 only by the pushing force from the pop-up 43a. On the other hand, when the user attempts to forcedly withdraw the printer 101 from the ASF 1, the positioning boss 39d is deformed and broken.

Then, in the shown construction, before pushing out the printer 101 by the push lever 40 and the pop-up 43b, the engaging position between the positioning boss 39d and the positioning hole 118a serving as a pivot of the printer 101, is shifted in the disconnecting direction of the connectors 44 and 117 by the pushing force from the pop-up 43a. By this, biting between the positioning boss and the positioning hole can be successfully prevented.

Namely, in the arrangement relationship shown in FIG. 19, by a pushing force from the pop-up 43a, a necessary force F1 for pushing out the printer 101 with taking the positioning boss 39a as the pivot is expresses as follow:

$$F1>(X1/X2)\times P1+P2$$

wherein F1 is a pushing out force to be exerted on the printer 101 by the pop-up 43a, P1 is a force required for disconnection of the connectors, P2 is a friction force between the printer 101 and the printer sliding surface 45b, X1 is a distance from the positioning boss 39e as the pivot to the connector 44, and X2 is a distance from the positioning boss 39e as the pivot to the pop-up 43a.

As can be clear from the foregoing expression, at greater distance between the pop-up 43a and the ASF connector 44, namely, at smaller value of (X1/X2), the pushing out force F1 from the pop-up 43a can be set smaller. The pushing out force F1 from the pop-up 43a acts as a reaction force upon installation of the printer 101 into the ASF 1. In general, considering that the force required for withdrawal of connector is 1 to 2 kgf, the value of (X1/X2) of less than or equal to 0.5 is proper.

Furthermore, the height of the claw portion 17a of the hook (right side) 17 is set to be lower than the height of the claw portion of the hook (left side) 16. Accordingly, a timing where the hook (left side) 16 is released from the hook engaging hole 103y of the printer 101, is earlier than a timing where the hook (right side) 17 is released from the hook engaging hole 103z.

Figure 22:
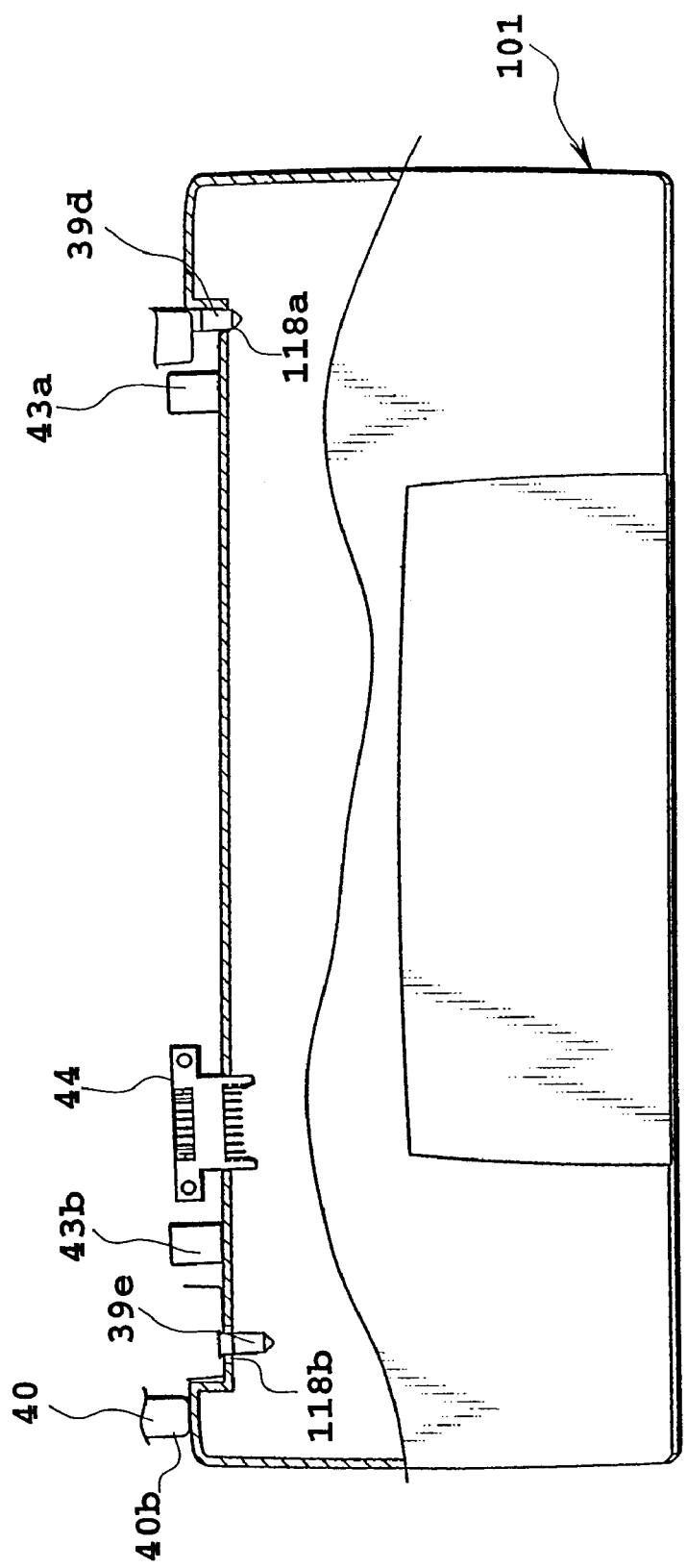
FIG. 22 is a section of the major part for explaining an installation and releasing mechanism in the printing apparatus and the automatic feeding apparatus in the first embodiment of the present invention.
Figure 23:
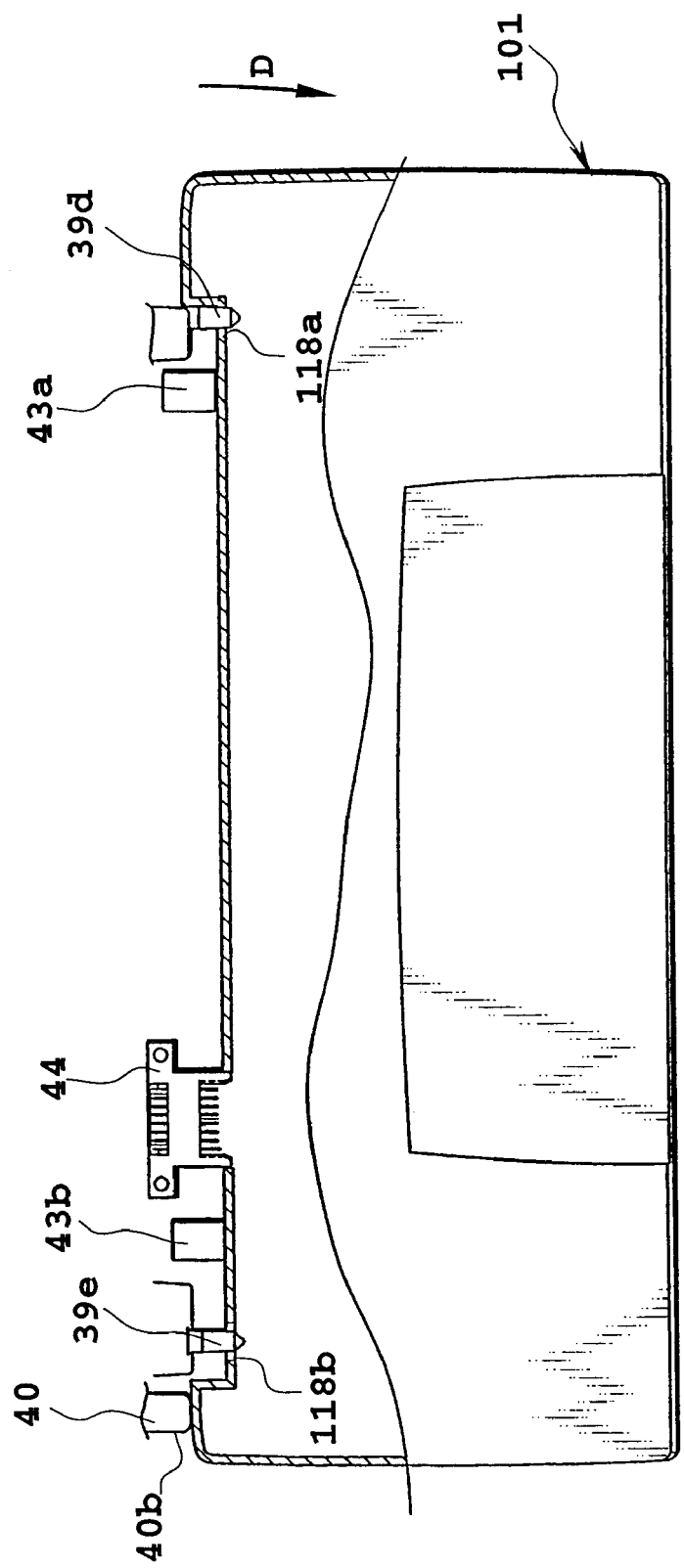
FIG. 23 is a section of the major part for explaining an installation and releasing mechanism in the printing apparatus and the automatic feeding apparatus in the first embodiment of the present invention.

By this, the printer 101 is pivoted with taking the positioning boss 39e as the pivot by the pushing force of the pop-up 43a as shown in FIG. 22, at a moment where engagement between the hook (right side) 17 and the hook engaging hole 103z is released, so that movement of the positioning boss 39d and the positioning hole 118a away from each other in disconnecting direction of the connectors 44 and 117. Thereafter, after releasing engagement between the hook (left side) 16 and the hook engaging hole 103y of the printer 101, the printer 101 is pushed out by the push lever 40 and the pop-up 43b, as shown in FIG. 23. As a result, in a condition where biting between the positioning bosses 39a and 39b and the positioning holes 118a and 118b is not occurred, the printer 101 can be removed from the ASF 1.

Here, assuming that the push lever 40 and the pop-up 43b are arranged between the positioning boss 39d and the ASF connector 44, if a connection holding force between the connectors 44 and 117 is large, the connector 44 may serve as pivot of the printer 101. Therefore, biting can be caused between the positioning boss 39d and the positioning hole 118a in circular hole engagement, so that concern for deformation and breakage of the bitten boss 39d is raised. Thus, the push lever 40 and the pop-up 43b are required to be arranged at a position away from the ASF connector 44 as viewed from the positioning boss 39d as the pivot of the printer 101.

(Control Portion)

Figure 24:
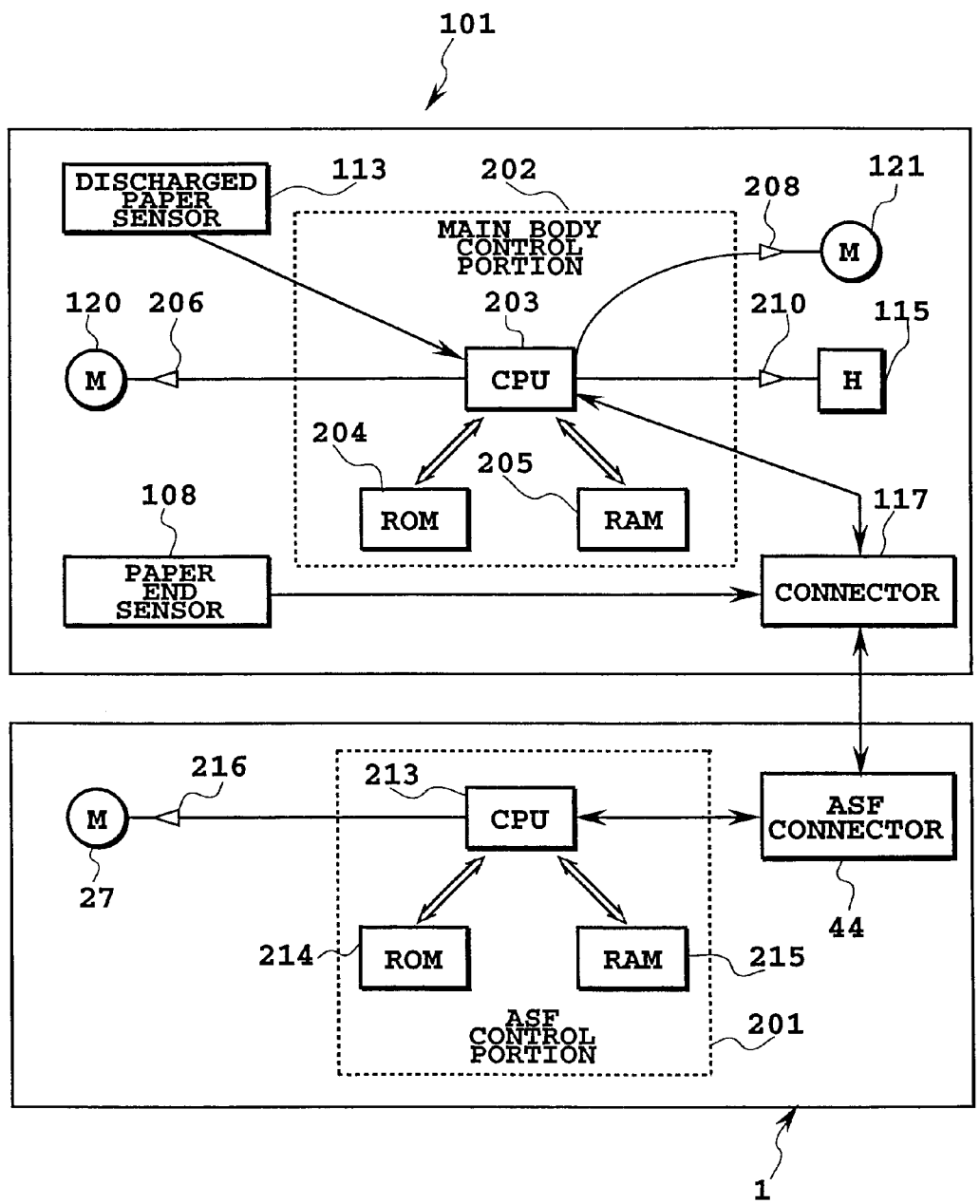
FIG. 24 is a block diagram of the first embodiment of the printing apparatus and the automatic feeding apparatus according to the present invention.

FIG. 24 is a block diagram of a main body control portion 202 of the printer 101 and a control portion 201 of an external ASF 1.

The main body control portion 202 for controlling the printer 101 is arranged on a main body substrate 123 shown in FIG. 4, and has a microcomputer, in which CPU 203, ROM 204 and RAM 205 are connected by a bus. When the printer 101 performs printing, the main body control portion 202 performs the following function according to a main body control program stored in ROM 204. At first, when a carriage motor 121 for moving a not shown carriage is driven via a motor driver 208, printing is performed for one line on the sheet by driving a printing head 115 mounted on the not shown carriage. The printing head 115 is driven via a head driver 210. Thereafter, a paper feeder motor 120 is driven via a motor driver 260 by the main body control portion 202, so that the sheet is fed for a predetermined amount. Subsequently, the carriage motor 121 and the printing head 115 are driven to perform printing for one line. Then, by repeating printing and sheet feeding, printing for the sheet is completed.

The reference numeral 117 denotes the connector which serves for externally outputting an instruction signal from CPU 203 of the main body control portion, and serves for inputting an external response signal to CPU 203. Therefore, the connector 117 serves as a communication port for bidirectional communication. The connector 117 can also perform power supply to external unit. The reference numeral 108 denotes a paper end sensor incorporated within a printer main body. The paper end sensor has an optical switch or a mechanical switch. When the sheet 200 is inserted into the printer main body, an output voltage of the paper end sensor 108 transits from "LOW" condition to "HIGH" condition. On the other hand, the reference numeral 113 denotes a discharge paper sensor having a similar function to the paper end sensor 108. When a residual sheet is present within the main body of the printer after image printing, the output voltage of the discharge paper sensor 113 becomes "HIGH" condition. The output voltages of the paper end sensor 108 and the discharged paper sensor 113 can be monitored by CPU 203, and the output voltage of the paper end sensor 108 can perform direct external output via the connector 117.

The ASF control portion 201 controlling the external ASF 1 has a microcomputer, in which CPU 213, ROM 214 and RAM 215 are connected by a bus. CPU 213 drives a paper feeder motor 27 via a motor driver 216 on the basis of an ASF control program stored in ROM 214. The reference numeral 44 denotes the ASF connector which receives a signal from external unit, such as the printer 101 and outputs signal from CPU 213 of the ASF control portion 201. Thus, the ASF connector 44 serves as a communication port permitting bidirectional communication.

(Communication Port Portion)

Figure 35:
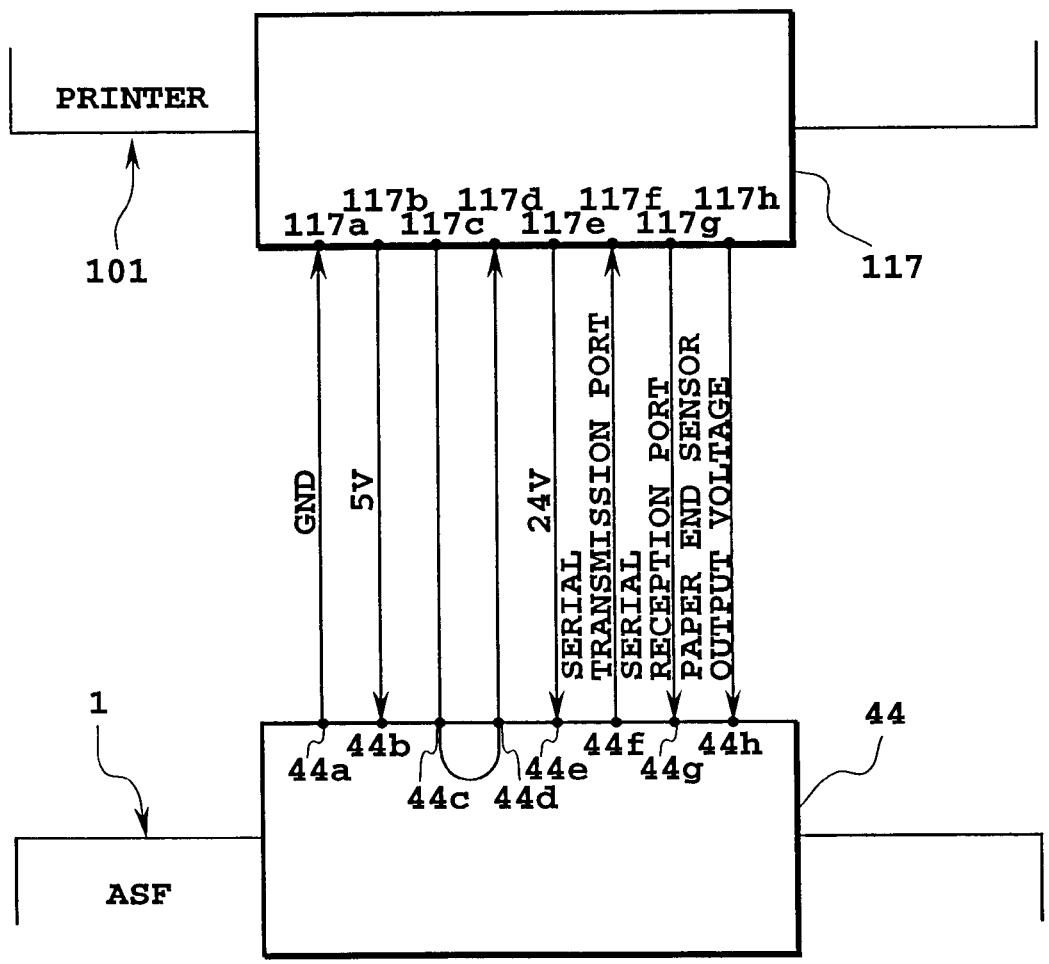
FIG. 35 is a diagrammatic illustration of a connecting portion between the printing apparatus and the automatic feeding apparatus in the second embodiment of the present invention.

FIG. 35 diagrammatically shows a detailed construction of the connector 117 and the ASF connector 44.

The connector 117 and the ASF connector 44 respective has eight ports 117a to 117h and 44a to 44h. When the ASF 1 is relatively installed within the printer 101, ports having the corresponding Arabic characters are electrically connected. Ports 44a and 117a form a GND line, ports 44b and 117b form a 5V power source line for a signal, ports 44e and 117e form a 24V power source line for driving the paper feeder motor 27. On the other hand, the port 44f is a transmission port for transmitting a signal to the port 117f, the port 44g is a reception port for receiving a signal from the port 117g, the port 44h is a port receiving the output voltage of the paper end sensor 108 from the port 117h. It should be noted that since the ports 44c and 44d are shorted, it becomes possible to recognize whether unit is externally connected or not utilizing the ports 117c and 117d on the side of the printer 101.

(ASF Separating and Transporting Mechanism Portion)

FIG. 25 is section for showing a condition where the external ASF 1 is relatively installed within the printer 101.

The reference numeral 19 denotes the paper feeder roller for feeding the sheet 200. On the paper feeder roller 19, the paper feeding rubber 23 is fitted. When the paper feeder roller 19 is rotated, the sheet 200 is transported by a friction force of the paper feeding rubber 23. The reference numeral 26 denotes the pressure plate, on which the sheets 200 is stacked. Both ends on the upstream side in the sheet transporting direction of the pressure plate 26 are pivoted on the ASF chassis 11. The pressure plate 26 is biased in a direction of the paper feeding rubber 23 by the pressure plate spring 13. In the initial state, a cam portion 19*c* provided on both ends of the paper feeder roller 19 and the cam portion 26*a* provided on both ends of the pressure plate 26 are contacted, so that the paper feeding roller 23 and the pressure plate 26 are separated away from each other for permit smooth setting of the sheets 200. The ridge 36 has an abutting surface 36*a* positioned on an extension of a sheet transporting direction. The sheet 200 is set with abutting the tip end onto the abutting surface 36*a*. On the abutting surface 36*a*, a ridge sheet 37 as sheet separating member is provided. The ridge sheet 37 is a sheet formed of an elastic body, such as a plastic film and has a function for separating the sheets 200 one by one using elastic force caused upon deflection.

A distance between the abutting surface 36*a* and the paper end sensor 108 is set to be greater than a transporting amount of the sheet 200 when the paper feeder roller 19 is made one revolution, and set to be smaller than a transporting amount of the sheet 200 when the paper feeder roller 19 is made two revolutions.

(Printer Transporting Mechanism and Printing Mechanism)

Next, explanation will be given for a transporting mechanism portion and a printing mechanism portion of the printer 101 in FIG. 25.

The reference numeral 109 denotes an LF roller for transporting the sheet 200. The LF roller 109 forms a coat layer of a material having high friction coefficient, such as urethane resin, on the surface of a metal pipe. The LF roller 109 is rotatingly driven by a paper feeder motor 120 shown in FIG. 25 and transport the sheet 200 by gripping the sheet 200 in cooperation with the pinch roller 110. The reference numeral 115 denotes the printing head for printing an image on the sheet 200 transported by the LF roller 109, which printing head 115 is mounted on the not shown carriage reciprocally movable in the longitudinal direction of the LF roller 109. The printing head 115 is reciprocally movable in a paper width direction (a direction from surface to back in the sheet surface of the drawing in FIG. 25), together with the carriage driven by the carriage motor 121 in FIG. 25.

The spur 111 and the paper discharging roller 112 are located on the downstream side of the LF roller 109 and the printing head 115 in the sheet transporting direction. The spur 111 and the paper discharging roller 112 form roller pairs of two sets for transporting the sheet 200 completed image printing. The paper discharging roller 112 is coupled with the LF roller 109 via a not shown drive transmission member. The paper discharging roller 112 transports the sheet 200 in the same direction as the transporting direction by the LF roller 109, with taking the LF roller 109 as a driving source. In the sheet transporting direction, on the paper path of the upstream side from the LF roller 109, the paper end sensor 108 is provided. On the other hand, between two sets of the paper discharging rollers 112, 112, the discharged paper sensor 113 is provided. These sensors 108 and 109 transit the output voltage from "LOW" condition to "HIGH" condition in response to the sheet 200 moving thereacross.

(ASF Driving Mechanism Portion)

Figure 26:
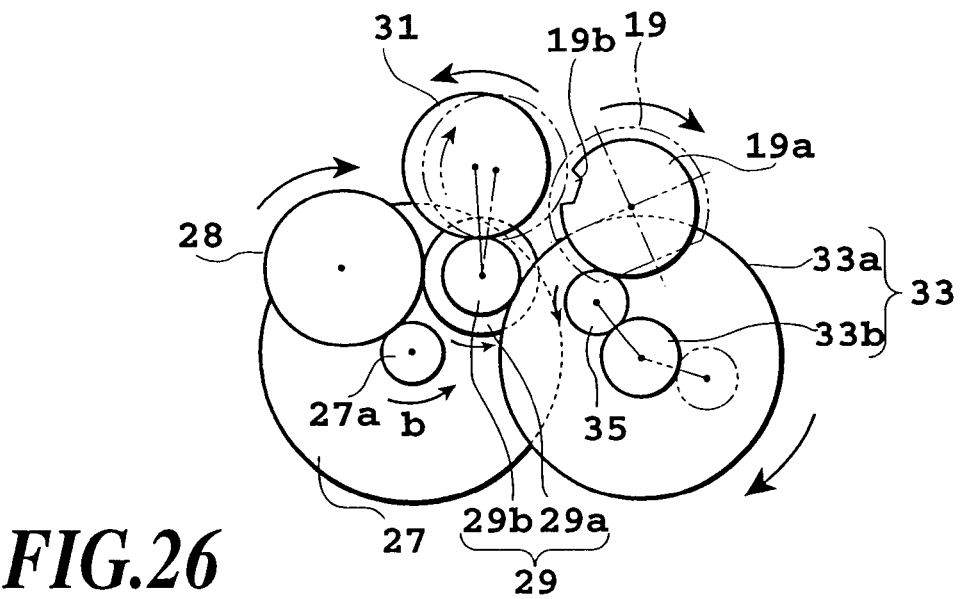
FIG. 26 is a diagrammatic illustration for explaining operation of a drive mechanism portion of the first embodiment of the automatic feeding apparatus according to the present invention.
Figure 27:
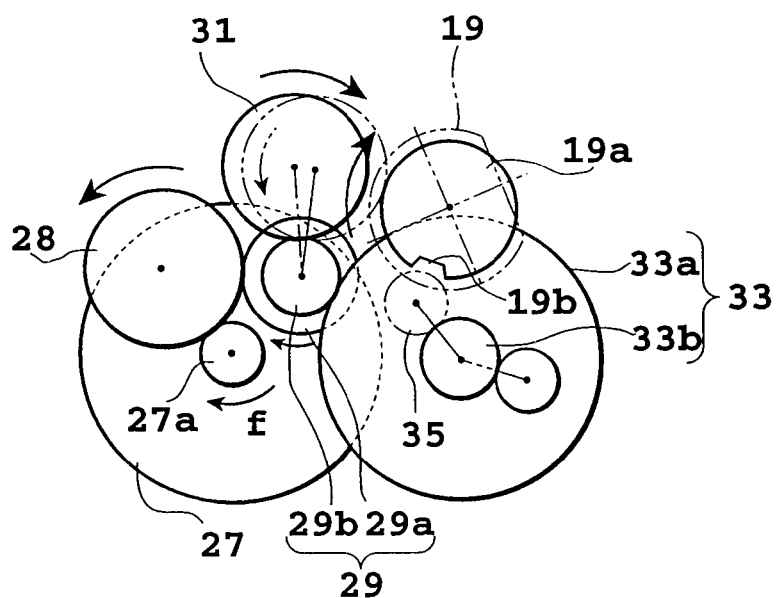
FIG. 27 is a diagrammatic illustration for explaining operation of a drive mechanism portion of the first embodiment of the automatic feeding apparatus according to the present invention.

A driving mechanism of the external ASF 1 is shown in FIGS. 26 and 27. The paper feeder motor 27 is a stepping motor which can be driven for revolution in forward and reverse directions. The reference numeral 28 denotes an idler gear which is meshed with a motor gear 27*a* of the paper feeder motor 27. The reference numeral 29 denotes an ASF double gear having two stage gears 29*a* and 29*b* having different large and small diameters. The large diameter gear 29*a* is meshed with the idler gear 28. The reference numeral 31 denotes a forward planetary gear, and is meshed with a small diameter gear 29*b* of the ASF double gear 29 to move around the ASF double gear 29. The reference numeral 33 denotes a reverse sun gear having two stage gears 33*a* and 33*b* having different large and small diameters. The large diameter gear 33*a* of the reverse sun gear 33 is meshed with the small gear 29*b* of the ASF double gear 28. The reference numeral 35 denotes a reverse planetary gear which is meshed with the small gear 33*b* of the reverse sun gear 33 to move around the reverse sun gear 33. The reference numeral 19*a* denotes a paper feeder roller gear provided on an axial end of the paper feeder roller 19 and has a teeth-less recessed portion 19*b*. The paper feeder gear 19*a* is located on a trace of orbital motion of the forward planetary gear 31 and the reverse planetary gear 35 and arranged for meshing with these gears 31 and 35.

In FIG. 26, when the paper feeder motor 27 is driven to rotate (reverse drive) in the direction of arrow b, respective gears rotate in the directions of the arrows, respectively. Namely, the reverse planetary gear 35 causes orbital motion in the clockwise direction toward the position illustrated by solid line from the position illustrated by two-dotted line in FIG. 26, around the small diameter gear 33 of the reverse sun gear 33, via the idle gear 28 and the ASF double gear 29, to mesh with the paper feeder roller gear 19*a*. By this, the paper feeder roller 19 is driven to rotate in the direction of the arrow in the clockwise direction (the direction for feeding the sheet 200 stacked on the pressure plate 26 to the printer 101). The paper feeder roller gear 19*a* meshing and rotating with the reverse planetary gear 35 is released from meshing engagement with the reverse planetary gear 35 when the teeth-less recessed portion 19*b* is rotated to the position opposing to the reverse planetary gear 35. Therefore, the paper feeder roller gear 19*a* is prevented from further rotation even when the paper feeder motor 27 is driven in the reverse direction. At this time, the forward planetary gear 31 causes orbital motion in counterclockwise direction toward the position illustrated by solid line from the position illustrated by two-dotted line in FIG. 26, to stop by abutting onto a not shown stopper. Therefore, it does not influence for rotation of the paper feeder roller 19.

Next, in FIG. 27, when the paper feeder motor 27 is driven to rotate (forward drive) in the direction of arrow f, respective gears are rotated in the direction of arrows in FIG. 27. Namely, the forward planetary gear 31 causes orbital motion from the position illustrated by two-dotted line in FIG. 27 to the position illustrated by the solid line in the clockwise direction around the small diameter gear 29*b* of the ASF double gear 29, via the idle gear 28 and the ASF double gear 29, to mesh with the paper feeder gear 19*a*. By this, the paper feeder roller 19 is rotated in clockwise direction as the direction of arrow (the direction for feeding the sheet 200 on the pressure plate 26 to the printer 101). The paper feeder roller 19*a* meshing and rotating with the forward planetary gear 31 is released from meshing with the forward planetary gear 31 when the teeth-less recessed portion 19*b* is rotated to the position opposing to the forward planetary gear 31.

Therefore, the paper feeder roller 19a is prevented from further rotation even when the paper feeder motor 27 is driven in forward direction. At this time, the reverse planetary gear 33 causes orbital motion from the position shown by two-dotted line in FIG. 27 to the position shown by the solid line in the counterclockwise direction to stop by abutting onto a not shown stopper. Therefore, it does not influence for rotation of the paper feeder roller 19.

Furthermore, when the teeth-less recessed portion 19b of the paper feeder roller gear 19a opposes to the forward planetary gear 31, the cam portion 19c of the paper feeder roller 19 meshes with the cam portion 26a of the pressure plate 26, to be the same phase as the initial state. Thus, the pressure plate 26 is placed away from the paper feeder rubber 23. Accordingly, when the paper feeder motor 27 is driven for continuous rotation in the forward direction, the pressure plate 26 is held in a condition away from the paper feeder rubber 23 by meshing of the paper feeder roller cam portion 19c and the pressure plate cam portion 26a, to stop rotation of the paper feeder roller 19 at the phase the same as the initial state. Subsequently, both of the forward planetary gear 33 and the reverse planetary gear 35 idle at the positions shown by the solid lines in FIG. 27, to be stable in the condition not transmitting rotation to the paper feeder roller 19.

(Paper Feeding Operation and Printing Operation (Printer Side))

Next, explanation will be given for operation for feeding, transporting and discharging after printing of the sheet 200 by the printer 101 and the ASF 1.

Figure 28:
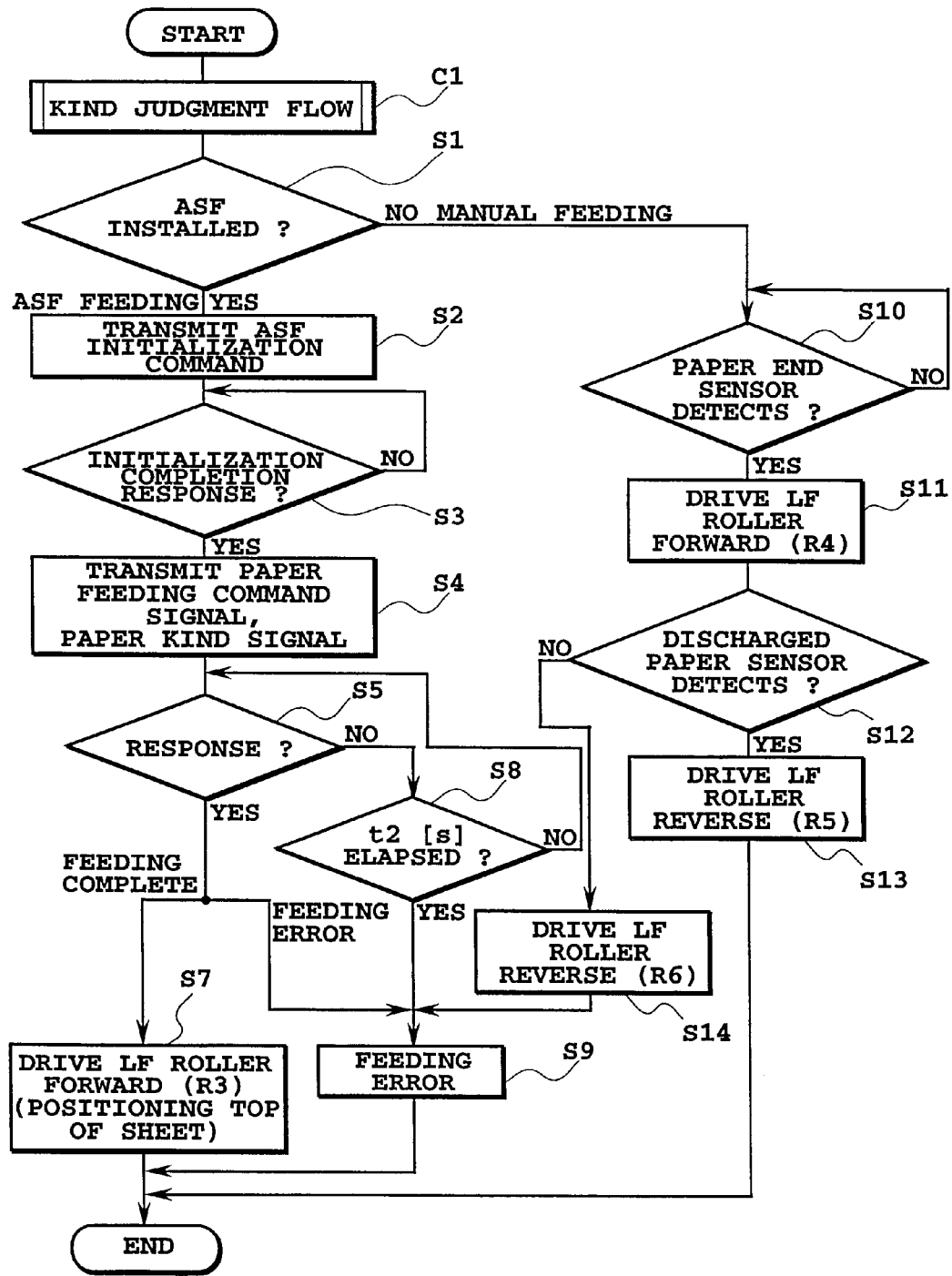
FIG. 28 is a flowchart for explaining feeding operation in the first embodiment of the printing apparatus according to the present invention.

The printer 101 is responsive to receive a printing instruction from the external information unit, such as computer. Namely, the printer 101 performs paper feeding operation, at first, and then performs printing operation. FIG. 28 is a flowchart for explaining the paper feeding operation of the printer 101.

At first, the main body control portion 202 of the printer 101 executes a sub-routine C1. The sub-routine C1 is to perform judgment of kind of the unit externally connected to the printer 101 via the ports 117f and 117g shown in FIG. 35. A detail of the shown sub-routine C1 will be explained with reference to FIG. 32.

Next, a process is advanced to step S1. When a result of judgment by the sub-routine C1 indicates installation of the ASF 1 to the printer 101, the process is advanced to step S2 since the paper feeding mode becomes ASF feeding mode. At step S2, the main body control portion 202 transmits an initialization command signal to the ASF 1. Then, process is advanced to step S3. At step S3, a response signal indicative of completion of initialization from the ASF 1 is waited. In response to the response signal, the process is advanced to step S4. At step S4, the main body control portion 202 transmits a paper feeding command signal and a paper kind signal indicative of a kind of the sheet (plain paper, coated paper, postcard, glossy film and the like). Then, the process is advanced to step S5.

At step S5, while the response signal is not received from the ASF 1, the process is advanced to step S8. At step S8, if a predetermined time limit t2 is not yet expired, the process is returned to step S5. On the other hand, when the time limit t2 from initiation of paper feeding is expired, the process is advanced to step S9. At step S9, paper feeding operation is terminated with outputting a paper feeding error indicative alarm by the main body control portion 202.

At step S5, when the response signal is received from the ASF 1 and the received response signal is a signal indicative of completion of paper feeding, the process is advanced to step S7. Step is S7 a step for performing so-called positioning top of the sheet 200. At this step S7, the main body control portion 202 drives the paper feeder motor 120 to rotate the LF roller 108 for a predetermined amount R3 in the sheet transporting direction (forward direction) upon printing. Therefore, paper feeding operation is terminated. The predetermined amount R3 is set so that the tip end portion of the sheet 200 does not reach to a sheet detectable range of the discharged paper sensor 113, but the tip end portion of the sheet 200 is placed underneath the printing head 115. Accordingly, when the printer 101 initiates printing on the sheet 200, it becomes unnecessary to backwardly feed the sheet 200 toward the upstream side in the sheet transporting direction. Thus, the rear end of the sheet 200 will never collide onto the component within the ASF 1, so that holding or mis-feed of the sheet 200 is prevented.

On the other hand, at step S5, when the response signal from the ASF 1 is present and the response signal indicative paper feeding error, the process is advanced to step S9. Then, the main body control portion 202 terminates paper feeding operation with issuing a paper feeding error alarm.

At step S1, when the result of judgment by the sub-routine C1 is that the ASF 1 is not installed to the printer 101, the process is advanced to step S10 since paper feeding mode becomes a manual feeding mode. At step S10, detection of the sheet 200 by the paper end sensor 108 is waited. When the user does not yet insert the sheet 200, the paper end sensor 108 does not detect the sheet 200 and the output voltage thereof is maintained at "LOW" condition". When the user inserts the sheet 200 into the printer 101 and the sheet 200 abuts to LF roller 109, the output voltage of the paper end sensor 108 becomes "HIGH" level, so that the sheet 200 is detected. Then, process is advanced to step S11. At step S11, the main body control portion 202 drives the paper feeder motor 120 via the paper feeder motor driver 206 so as to driven the LF roller 109 for a predetermined amount R4 in the forward direction (rotating direction for transporting the sheet 200 in the sheet transporting direction upon printing). The predetermined amount R4 is set so that the tip end of the sheet 200 falls within the sheet detectable region of the discharged paper sensor 113.

Next, the process is advanced to step S12. If the discharged paper sensor 113 detects the sheet 200, judgment is made that paper feeding is successful. Then, process is advanced to step S13. At step S13, the main body control portion 202 drives the paper feeder motor 120 via the paper feeder motor driver 206, so that the LF roller 109 is rotated for a predetermined amount R5 in the reverse direction (rotating direction for transporting the sheet 200 in the direction opposite to the sheet transporting direction upon printing). The predetermined amount R5 is set for returning the sheet 200 transmitted into the sheet detectable range of the discharged paper sensor 113 to the printing start position, and is set for the tip end of the sheet 200 will never come out from the position between the LF roller 109 and the pinch roller 110.

On the other hand, at step S12, if the discharged paper sensor 113 does not detect the sheet 200, for example, if the sheet 200 is not property gripped between the LF roller 109 and the pinch roller 110 because abutment force to the LF roller is insufficient, or if the tip end of the sheet 200 does not reach the sheet detectable range of the discharged paper sensor 113 even after transportation for the predetermined amount R4 because oblique abutment of the sheet 200 onto the LF roller 108 is caused, the main body control portion 202 makes judgment that manual paper feeding is in failure.

Then, the process is advanced to step S14. At step S14, the main body control portion 202 drives the paper feeder motor 120 via the paper feeder motor driver 206, so that the LF roller 109 is driven for a predetermined amount R6 in the reverse direction. The predetermined amount R6 is set for pulling back the sheet 200 transported to the sheet detectable range of the discharged paper sensor 113, so that the tip end of the sheet 200 is withdrawn from the position between the LF roller 109 and the pinch roller 110.

Upon manual paper feeding, by making judgment whether the discharged paper sensor 113 detects the sheet 200 or not, proper paper feeding can be confirmed. Furthermore, upon failure of paper feeding, the sheet 200 is fed back to the position where the sheet 200 is not gripped by the LF roller 109, so that sheet 200 can be easily removed to permit manual paper feeding again.

Upon manual paper feeding, different from ASF feeding, component, on which the paper collides, is not present. Therefore, folding or mis-feeding of the sheet will never be caused when the sheet is transported backwardly.

As set forth above, after the printer 101 completes the paper feeding operation through the control flow shown in FIG. 28, printing operation is performed. The main body control portion 202 drives the carriage motor 121 via the motor driver 208, so that the not shown carriage linked to the carriage motor 121 is moved. In conjunction therewith, the printing head 115 mounted on the carriage is driven by the head driver 210 to perform printing for one line on the sheet 200. Subsequently, the main body control portion 202 drives the paper feeder motor 120 via the motor driver 206 for feeding the sheet 200 in amount corresponding to width of the printed one line. Then, one line is printed by driving the carriage motor 121 and the printing head 115. By repeating these operation, printing on the sheet 200 is completed. Once, printing for one sheet 200 is completed, the main body control portion 202 drives the LF roller 109 in forward direction by driving the paper feeder motor 120. By this, the paper discharging roller 112 is rotated for discharging the sheet 200 out of the printer 101.

(Paper Feeding Operation (ASF Side))

Figure 29:
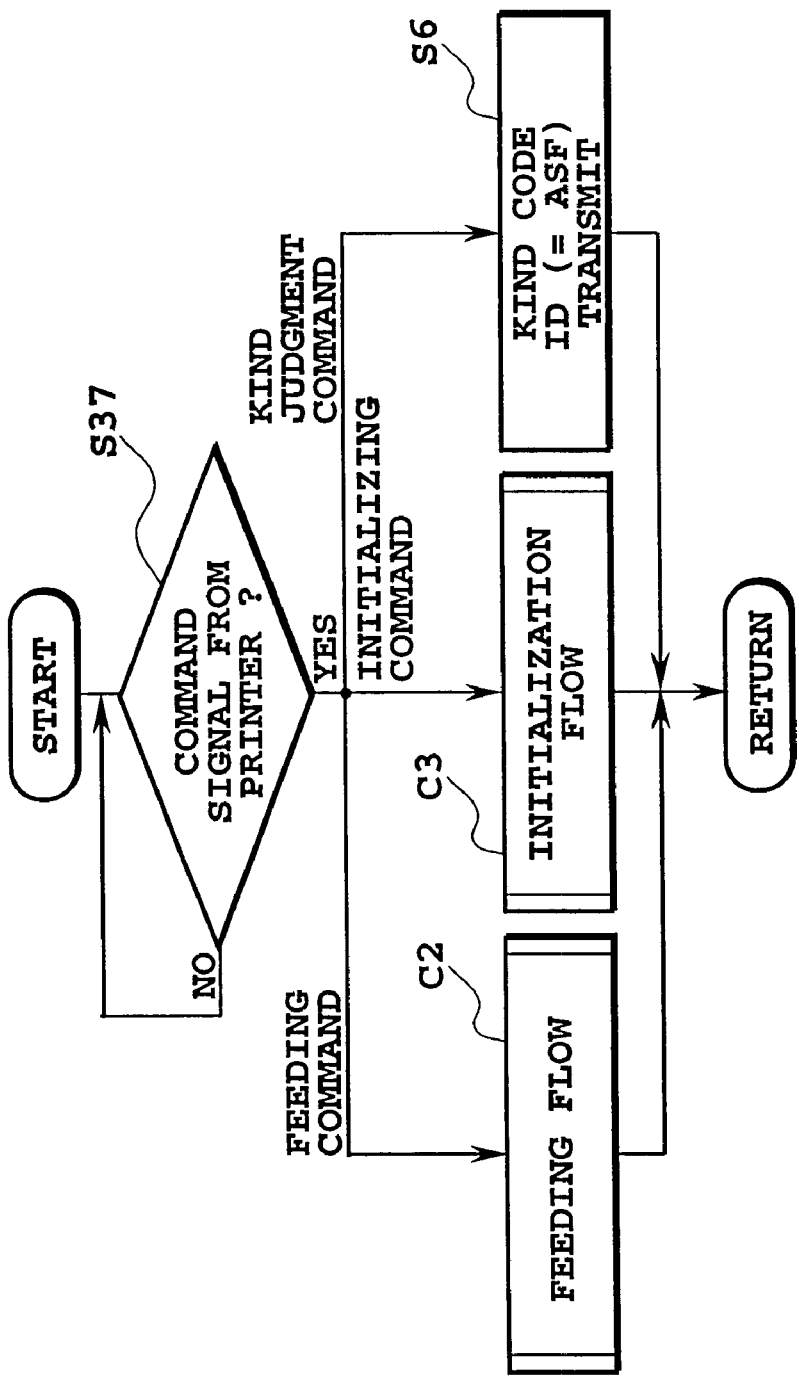
FIG. 29 is a flowchart for explaining a main control of the first embodiment of the automatic feeding apparatus according to the present invention.

FIG. 29 is a flowchart of main control in the ASF 1.

The control portion 201 of the ASF 1 is normally in waiting condition in the condition connected to the printer 101. At step S37, the command signal from the printer 101 is waited. When the control portion 201 receives the command signal from the printer 101 through a serial receiving port 44g of FIG. 35, the process is advanced to the following sub-routine or step depending upon content of the command signal.

Namely, when the command signal from the printer 101 indicates "paper feeding instruction", the process is advanced to a sub-routine C2 controlling ASF paper feeding operation. When the command signal from the printer 101 indicates "initializing instruction", the process is advanced to a sub-routine C3 controlling initializing operation. When each of the sub-routine is completed, the process is returned to step S37 and again placed into stand-by state. On the other hand, when the command signal from the printer 101 indicates "kind judgment instruction", the process is advanced to step S6, so that the code ID indicative of the kind of the ASF 1 is transmitted to the printer 101 via the serial transmission port 44f. Again, the process is returned to step S37 and placed into stand-by state.

Among two sub-routines C2 and C3 set forth above, explanation will be given for the sub-routine C2 controlling the ASF paper feeding operation, at first. The sub-routine C3 controlling initializing operation will be explained in detail, later.

Figure 30:
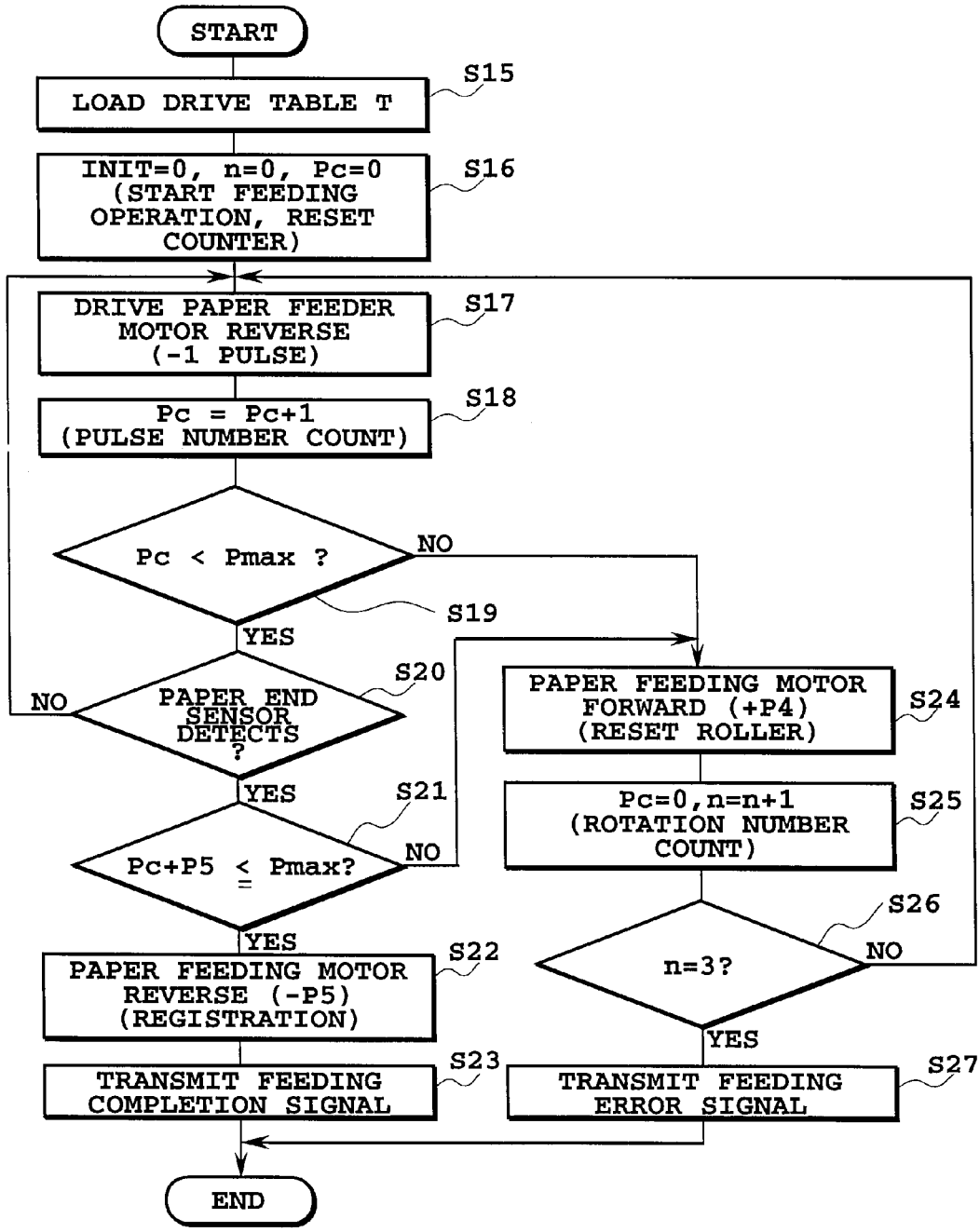
FIG. 30 is a flowchart for explaining feeding operation in the first embodiment of the automatic feeding apparatus according to the present invention.

FIG. 30 is an explanatory illustration of the sub-routine C2 performing paper feeding control operation in the ASF 1.

The ASF control portion 201 loads an optimal drive table T of the paper feeder motor 27 corresponding to kind of paper, to CPU213 from ROM 214. The optimal drive table T is selected on the basis of paper kind information received with the paper feeding instruction signal from the printer 101. The drive table T contains information indicative of a driving speed of the paper feeding motor 27 which is the pulse motor, and number P5 of registration pulse for rotating the paper feeder roller 19. The number P5 of registration pulse is set to an optimal amount depending upon the kind of the paper. A plurality of kinds of drive tables T are provided depending upon characteristics of the expected sheet.

After loading the drive table T, the ASF control portion 201 sets initial values of respective parameters defined by "INIT", "n", "Pc" to "0", at step S16. Each parameter is stored in RAM 215, in which "INIT" is a flag indicating whether the phase of the rotating direction of the paper feeding roller 19 is in the initial position or not, "n" is a rotation number counter indicative of how many times the paper feeder roller 19 is rotated from initiation of paper feeding flow C2, and "Pc" is a pulse number counter indicative of how many pulses to drive the paper feeding motor 27 in reverse direction.

Next, the process is advanced to step S17. At step S17, the ASF control portion 201 drives the paper feeding motor 27 via the motor driver 216 in the reverse direction for one pulse. Next, process is advanced to step S18 to count up the value of the pulse number counter "Pc" by one. Thereafter, the process is advanced to step S19. At step S19, the ASF control portion 201 compares the value of the pulse number counter "Pc" and an allowable pulse number Pmax. The allowable pulse number Pmax is number of the drive pulse for the paper feeder roller 19. Namely, by the paper feeding motor 27 is driven on the basis of the allowable pulse number Pmax, the teeth-less recessed portion 19b of the paper roller gear 19a is placed in opposition to the reverse planetary gear 35 as set forth above, after initiation of reverse rotation of the paper feeding motor 27. Immediately after initiation of paper feeding, a relationship of Pc<Pmax is established. Then, the process is advanced to step S20. At step S20, the ASF control portion 201 makes judgment of the output voltage of the paper end sensor 108 within the printer 101 via the port 44h of FIG. 35. Immediately after initiation of the paper feeding operation, the sheet 200 does not reach inside of the printer 101. Thus, the output voltage of the paper end sensor 108 is held at "LOW" state. Therefore, the process is returned to step S17.

By repeating the foregoing steps S17 to S20, the reverse planetary gear 35 of FIG. 26 causes orbital motion from the position of the two-dotted line to the position of the solid line, so that the reverse planetary gear 35 meshed with the paper feeder roller gear 19a. Then, the paper feeder roller 19 starts rotation. By the paper feeder roller 19 starts rotation from the initial position, the cam portion 19c of the paper feeder roller 19 is released from meshing with the cam portion 26a of the pressure plate 26. Therefore, the pressure plate 26 is raised by the pressure plate spring 13 so that the sheets 200 stacked on the pressure plate 26 are pressed to the paper feeding rubber 23. In this time, tip end portion of the sheet, which is set with abutting the tip end onto the abutting surface 36a of the ridge 36, is also raised to contact with the vicinity of the center portion of the ridge sheet 37.

By further repeating the foregoing steps S17 to S20, the paper feeder roller 19 is rotated by continuous rotation in the reverse direction, so that the feeding of the sheet 200 is started by friction force of the paper feeding rubber 23. Then, only one sheet 200 is separated from the sheets stacked therebelow by a reaction force which is generated by deflecting the ridge sheet 37 of the elastic body. The ridge sheet 37 is deflected by the tip end portion of the sheet 200.

Then, by continuing reverse driving of the paper feeder motor 27 to destroy the relationship of Pc<Pmax, the process is branched at step S19 and advanced to step S24. At step S24, the ASF control portion 201 drives the paper feeder motor 27 in the forward direction for a predetermined pulse number P4. The predetermined pulse number P4 is sufficient pulse number for rotating the paper feeder roller 19 to the initial position by the forward planetary gear 31. Namely, by executing the step S24, the paper feeder roller 19 rotates just one turn from the initial position. Therefore, the teeth-lee recessed portion 19b of the paper feeder roller gear 19a is placed in opposition to the forward planetary gear 31 to release meshing therebetween, so that the paper feeder roller 19 is stopped. Next, the processing is advanced to step S25 to reset the pulse number counter Pc to "0" and the rotation number counter n is counted up by one. Then, the process is advanced to step S26. At this time, since n=1, the process is returned to step S17 to initiate reverse driving of the paper feeder motor 27.

The ASF control portion 201 repeatedly executes steps S17 to S20, again. Then, the paper feeder roller 19 initiates rotation for the second turn to transport the sheet 200. When the tip end portion of the sheet 200 reaches the paper end sensor 108 within the printer 101, the output voltage of the paper end sensor 108 turns into "HIGH" level, so that the process is advanced from step S20 to step S21. At step S21, the ASF control portion 201 compares a value (Pc+P5) with the allowable pulse number Pmax. The value (Pc+P5) is derived by adding the number P5 of pulses for registration in the loaded drive table T to the value of the pulse number count Pc. If a relationship Pc+P5≦Pmax is established, even when the paper feeder motor 27 is further driven for revolution in the magnitude of P5 pulses in the reverse direction, transmission of the driving force will never be interrupted in the mid-way revolution of the paper feeder motor 27 in the reverse direction. Therefore, when PC+P5≦Pmax is established, the process is advanced to step S22 to drive the paper feeder motor 27 in the reverse direction.

When Pc+P5>Pmax is established, assuming that the paper feeder motor 27 is further driven in the reverse direction for the pulses of P5, the teeth-less recessed portion 19b of the paper feeder roller gear 19a is placed in opposition to the reverse planetary gear 35, so that interruption of driving force to the paper feeder roller 19 is caused. Therefore, in case of Pc+P5>Pmax, the process is advanced to step S24. At step S24, the paper feeder motor 27 is again driven for revolution in the forward direction for number of pulses of P4. Therefore, the paper feeder roller 19 is returned to the initial position. Then, at step 25, Pc is set to "0" and n is set to n+1, and thereafter, the process is advanced to step S26. Normally, while rotating for the second turn of the paper feeder roller 19, the sheet 200 is detected by the paper end sensor 108, so that the process is returned to step S17 at this timing (n=2). At this timing, the output voltage of the paper end sensor 108 has already been "HIGH" state, and the pulse number counter Pc is in a state at immediately after the counter Pc is reset. Therefore, the process is advanced from step S17 to S18, S19, S20 and S21. At this time, since Pc+P5≦Pmax is satisfied, the process is advanced to step S22.

Step S22 is the step for establishing registration. The ASF control portion 201 drives the paper feeder motor 27 in the magnitude corresponding to the pulse number P5 in the loaded drive table T, to drive the paper feeder roller 19 for rotation. At this time, the tip end of the sheet 200 is further fed within the printer 101 from the position detected by the paper end sensor 108. Therefore, the tip end of the sheet 200 stops abutting onto the nip portion defined between the resting LF roller 109 and the pinch roller 110. However, the rear portion of the sheet 200 is pushed forward by the paper feeder roller 19. Therefore, the tip end of the sheet 200 is placed in parallel to the nip portion defined by the LF roller 109 and the pinch roller 110.

Next, the process is advanced to step S23. Then, the ASF control portion 201 completes operation with transmitting a signal indicative of completion of paper feeding to the printer 101 via the serial transmission port 44 of FIG. 35.

When the sheet 200 is not stacked on the pressure plate 26, the output voltage of the paper end sensor 108 will never become "HIGH" state even when the paper feeding roller 19 is driven to rotate. In this case, the ASF control portion 201 repeats a loop consisted of steps S17, S18, S19, S20 and then S17 for a certain number of times, and then repeats operation of S19, S24, S25, S26 and then S17 twice. In the third times of the later-mentioned operation of steps S19, S24, S25, S26 and then S17, the rotation number counter n=3 is established at step S26, then, the process is advanced to step S27. At step S27, operation is completed with transmitting a paper feeding error signal to the printer 101.

(Other operation (Printer Side, ASF side))

Figure 31:
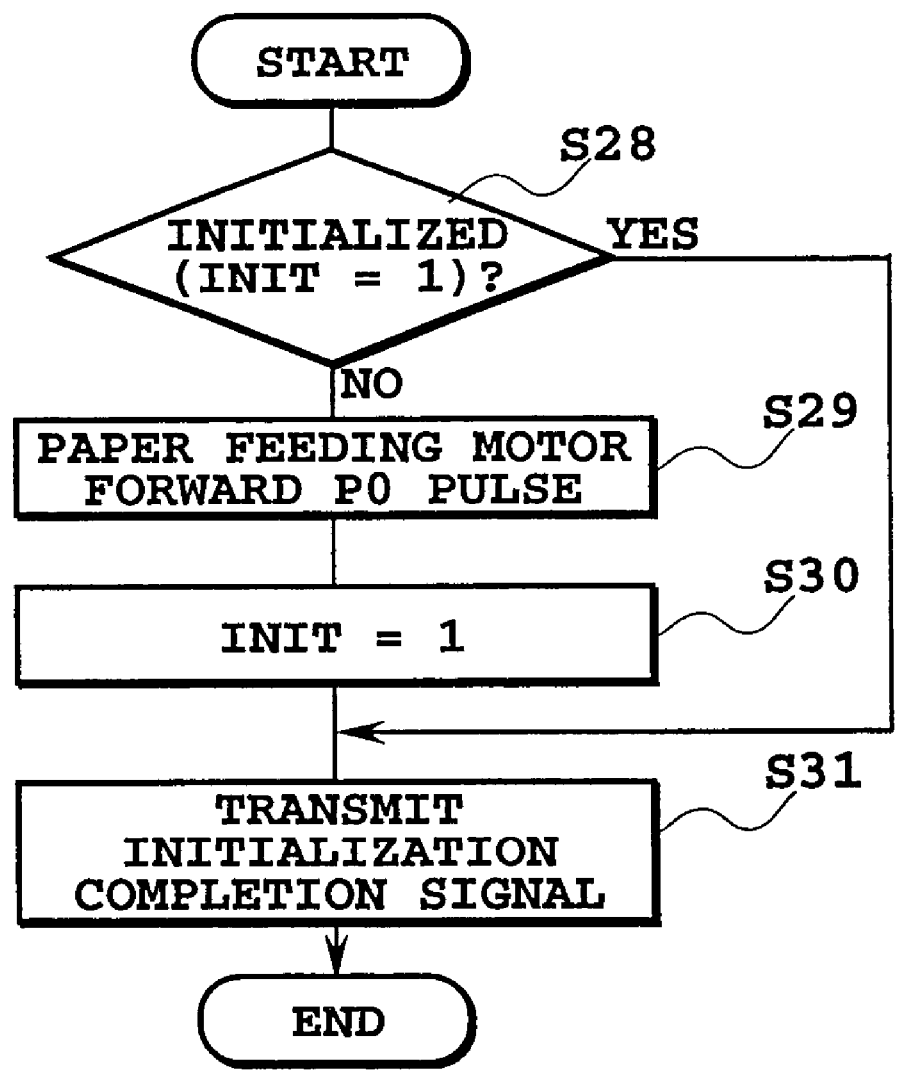
FIG. 31 is a flowchart for explaining initializing operation in the first embodiment of the automatic feeding apparatus according to the present invention.

FIG. 31 is an explanatory illustration of a sub-routine C3 controlling initializing operation of the ASF 1.

The ASF control portion 201 is responsive to the initialization command signal from the printer 101, and advance the process to step S28. At step S28, the value of the flag "INIT" is checked. The flag "INIT" indicative whether the phase of the paper feeder roller 19 in rotating direction is in the initial position or not. If INIT=1, it represents that the paper feeder roller 19 is already in the initial position. Therefore, in such case, the process is advanced to step S31. At step S31, an initialization completion signal is transmitted to the printer 101, and then operation is terminated. On the other hand, if INIT=0, the process is advanced to step S29 to drive the paper feeder roller motor 27 in the forward direction for a magnitude corresponding to a predetermined pulse number P0. The predetermined pulse number P0 is set in a value to sufficiently rotate the teeth-less recessed portion 19b of the paper feeder roller gear 19a in opposition to the forward planetary gear 31, namely to rotate the paper feeder roller 19 to the initial position, from any angular position of the paper feeder motor 27. Accordingly, by executing step S29, the paper feeder roller 19 is rotated to return to the initial position. Then, the pressure plate 26 and the paper feeding rubber 23 are placed away from each other to permit smooth setting of the sheet 200. Subsequently, the process is advanced to step S30 to set the flag INIT=1 for indicating that the paper feeder roller 19 is in the initial position. Thereafter, at step S31, the initialization completion signal is transmitted to the printer 101 and then the operation is terminated.

Figure 32:
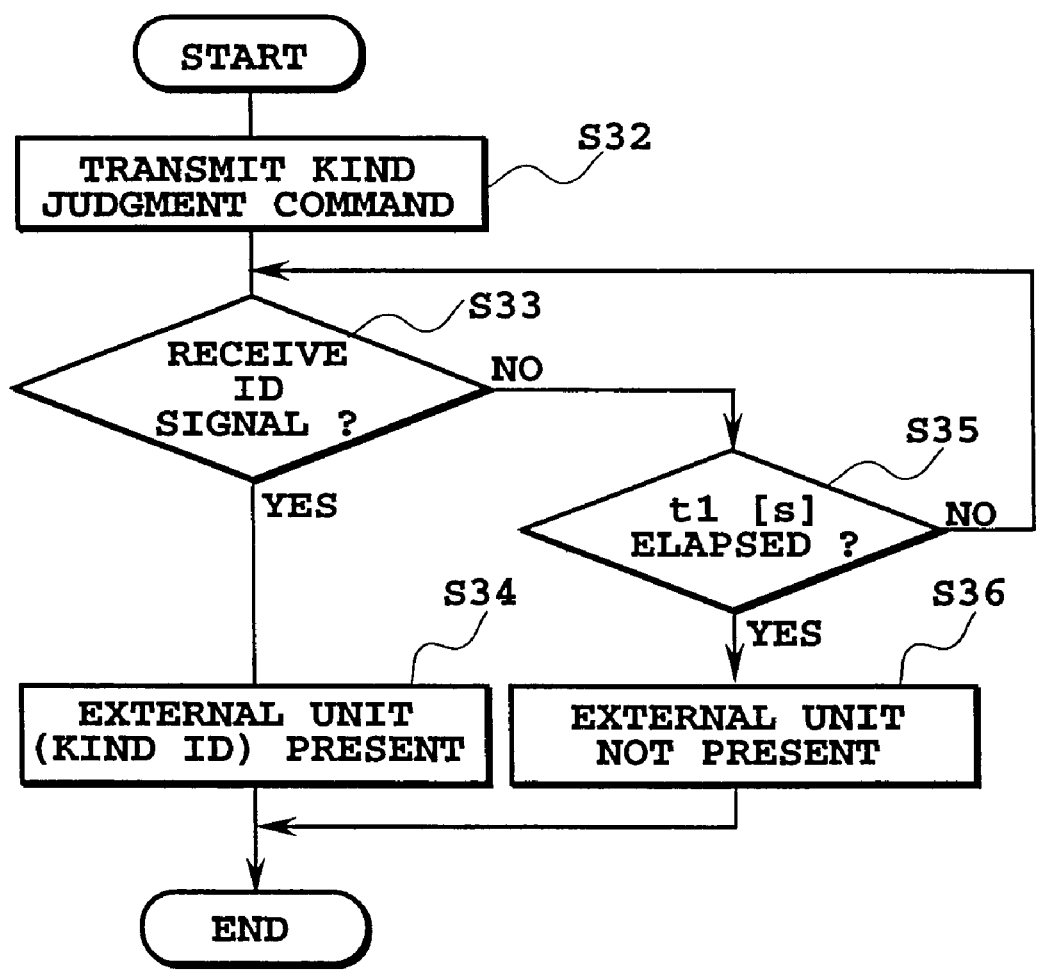
FIG. 32 is a flowchart for explaining a machine kind judgment operation in the first embodiment of the printing apparatus according to the present invention.

FIG. 32 is an explanatory illustration of the sub-routine C1 for performing judgment of the kind to be installed on the outside of the printer 101 via the ports 117f and 117g show in FIG. 35.

The main body control portion 202 transmits the kind judgment command signal to the external unit through the port 177g, at first at step S32. Then, the process is advanced to step S33. If the response signal from the external unit is not received through the port 117f, the process is advanced to step S35. Then, if a time limit t1 is not expired, the process is returned to step S33. If the time limit t1 is expired as checked at step S35, the process is advanced to step S36 to terminate operation under judgment that the external unit is not installed. On the other hand, at step S33, when the response signal from the external unit is received, the process is advanced to step S34. At step S34, the main body control portion 202 terminates operation after reading a code ID from the received response signal. The code ID indicative of the kind of the installed unit.

Other Embodiment

Figure 33:
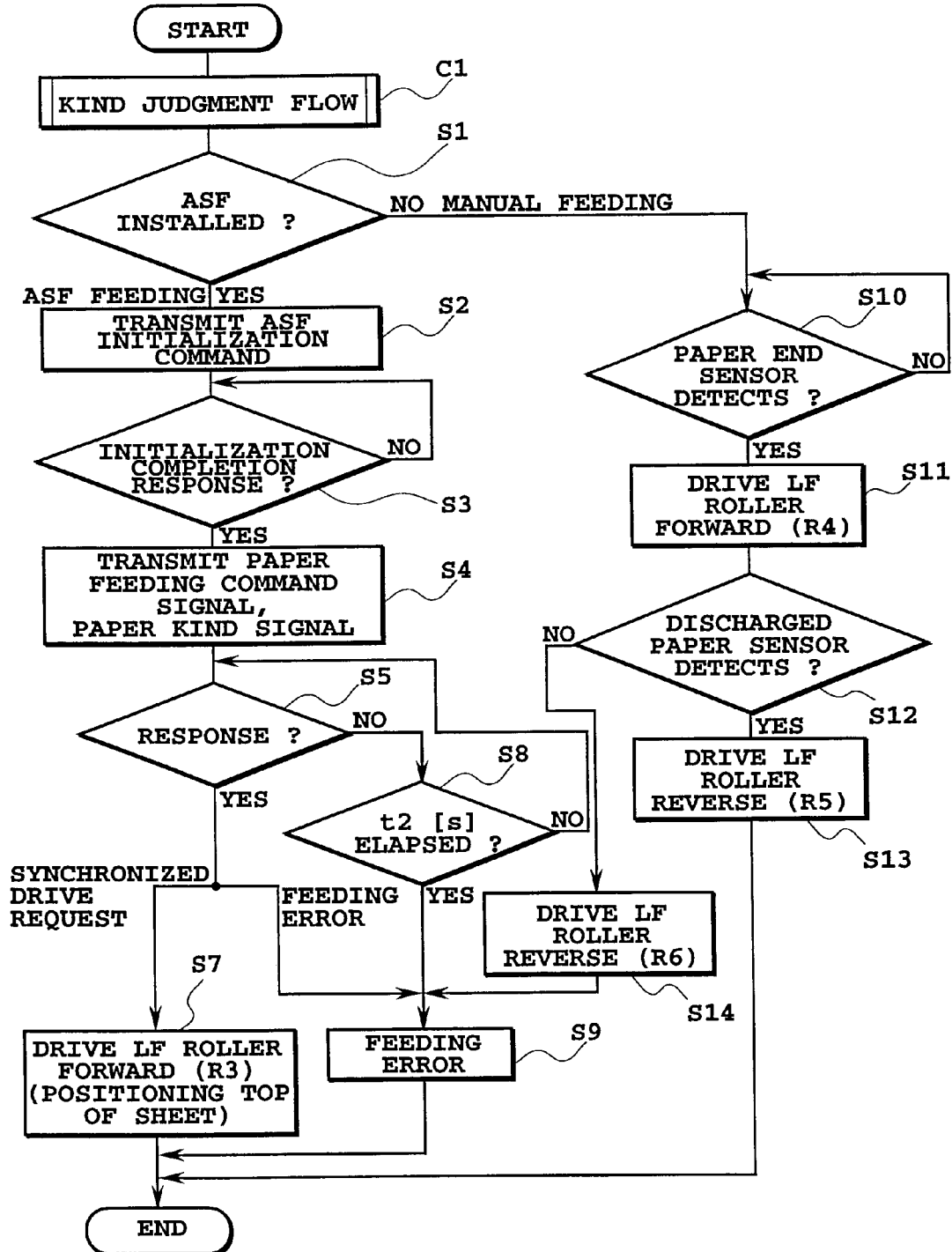
FIG. 33 is a flowchart for explaining feeding operation in the second embodiment of the printing apparatus according to the present invention.
Figure 34:
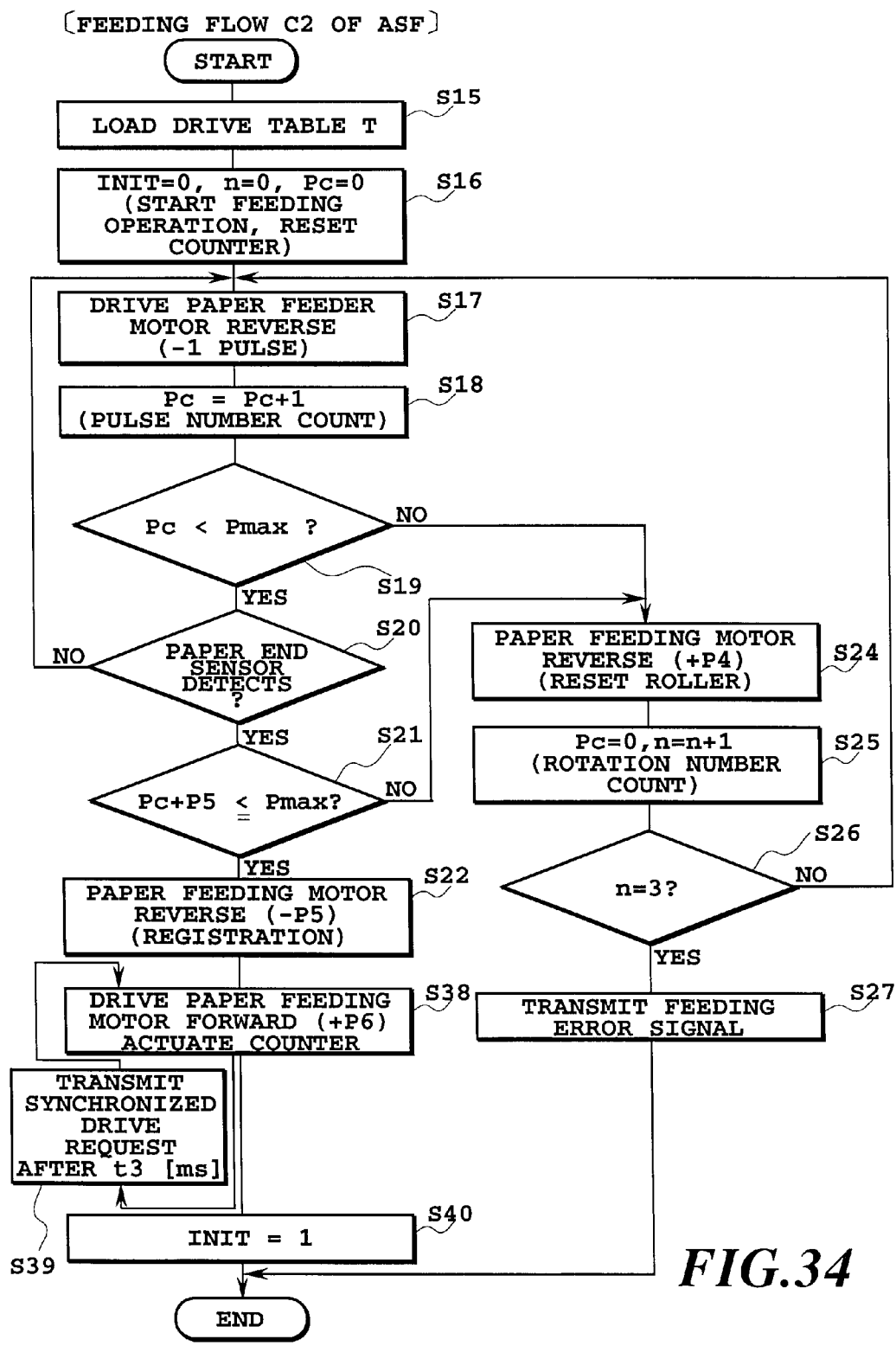
FIG. 34 is a flowchart for explaining feeding operation in the second embodiment of the automatic feeding apparatus according to the present invention.

FIGS. 33 and 34 are explanatory illustration of the second embodiment of flowcharts of control program in the printer 101 and the external ASF 1 which can be detachably installed in the printer 101. It should be noted that like portions performing the same function, having the same shape as the first embodiment, or performing the same function will be identified by like reference numerals to neglect detailed description. In the first embodiment set forth above, after driving the paper feeder motor 27 in a magnitude corresponding to P5 pulse by the ASF control portion 201 at step S22 as shown in FIG. 30, the paper feeding completion signal is transmitted to the printer 101 at step S23. However, in this case, since the paper feeder roller 19 is not returned to the initial position, the paper feeder roller 19 may be placed in pressure contact with the sheet 200, If positioning operation for positioning top of the sheet or printing operation on the side of the printer main body is performed only with the LF roller 109, a back tension due to the paper feeder roller 19 is caused to degrade precision in transportation of the sheet 200.

The second embodiment is intended to resolve such problem.

Namely, as shown in FIG. 34, the ASF control portion 201 advances the process step to step S38 after performing registration operation at step S22. The paper feeder motor 27 is driven for revolution in the forward direction in a magnitude corresponding to the predetermined pulse number P6. The pulse number P6 is the pulse number for rotating the paper feeder roller 19 up to the initial position. On the other hand, at the same time of forward driving initiation of the paper feeder motor 27, a counter for measuring the elapsed time from forward driving initiation of the paper feeder motor 27 is actuated. When the elapsed time reaches a predetermined time t3, the process is advanced to step S39 to transmit a synchronous driving request signal is transmitted to the printer 101. The predetermined time t3 is set at a period to be slightly longer than a period from initiation of revolution of the paper feeder motor 27 to starting rotation of the paper feeder roller 19 by meshing the forward planetary gear 31 with the paper feeder roller gear 19a. Furthermore, a speed for driving the paper feeder motor 27 at step S36 is set, so that the peripheral speed of-the paper feeding rubber 23 mounted on the paper feeder roller 19 is slightly higher than a peripheral speed thereof when the LF roller 109 of the printer 101 is rotated at step S7.

At a timing where the process at step S38 is completed, the paper feeder roller 19 rotates to the same phase as the initial position. Then, the process is advanced to step S40. At step S40, the ASF control portion 201 terminates operation, after indicating the phase of the paper feeder roller 19 in the rotating direction is in the initial condition with setting the INIT flag at "1". On the other hand, when the main body control portion 202 of the printer receives the synchronized driving request signal transmitted by the ASF control portion 201 at step S39, the main body control portion 202 advances the process from step S5 of FIG. 33 to step S7 to start rotation of the LF roller 109.

Figure 36:
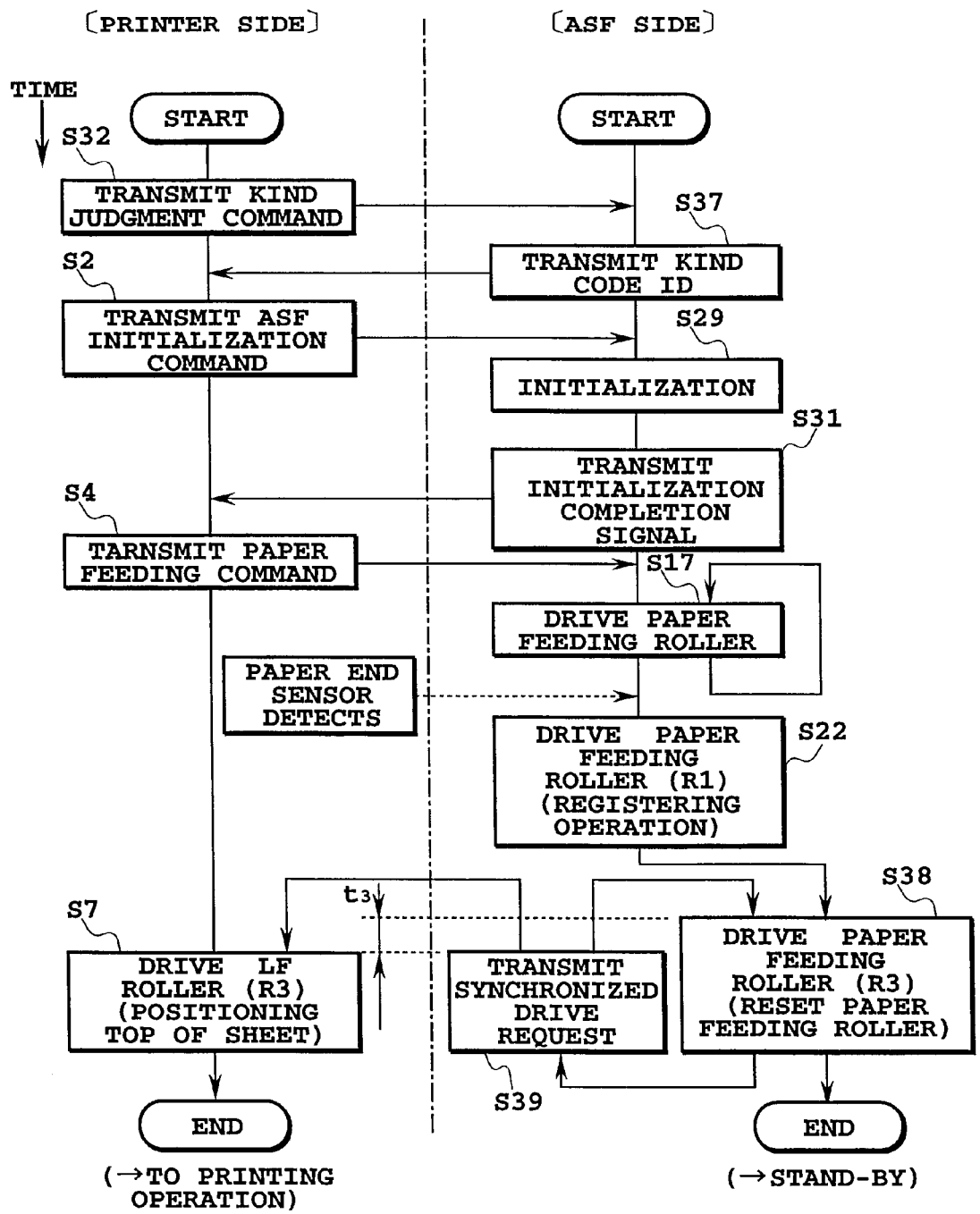
FIG. 36 is a flowchart for briefly explaining a communicating relationship between the printing apparatus and the automatic feeding apparatus in the second embodiment of the present invention.
Figure 37:
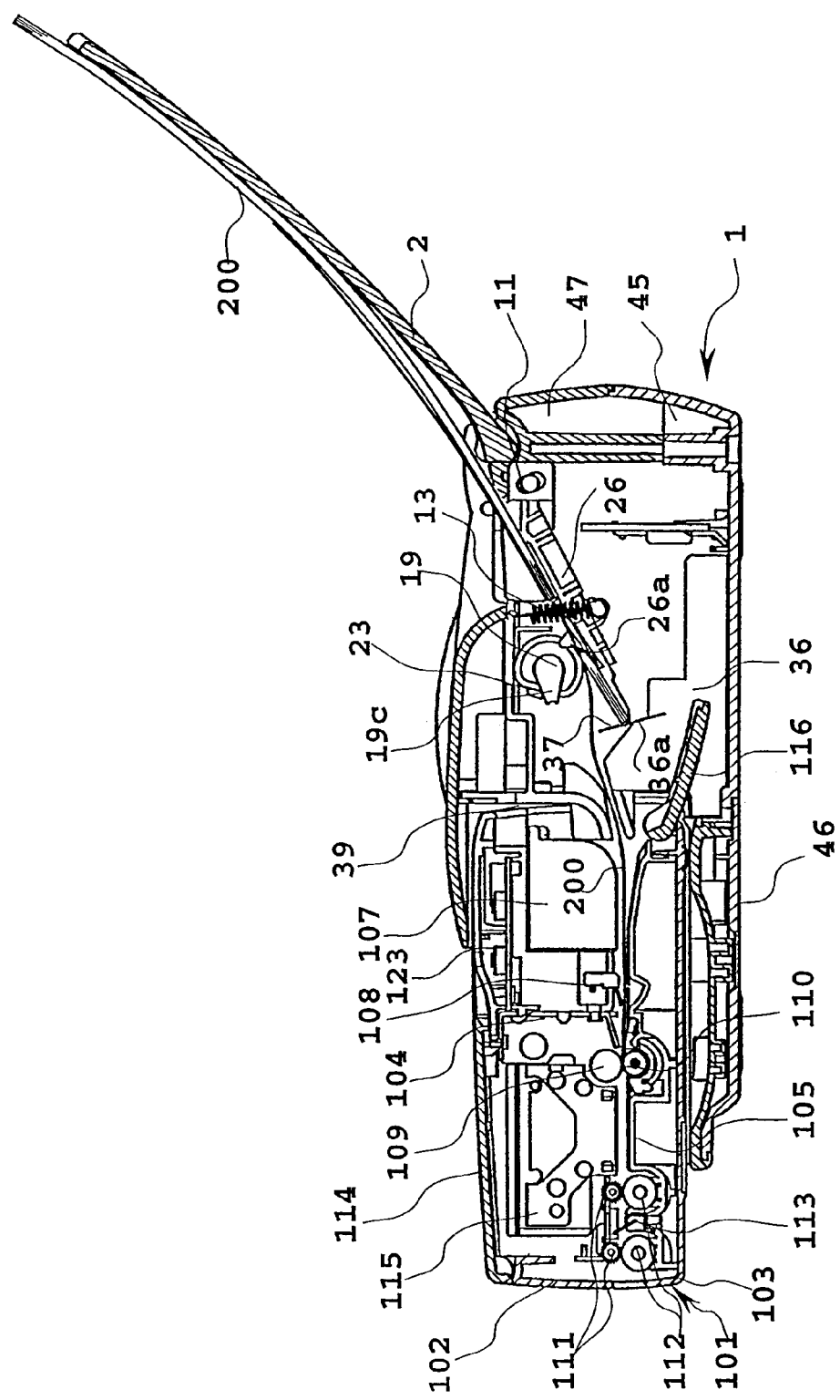
FIG. 37 is a section for explaining operation of the second embodiment of the printing apparatus and the automatic feeding apparatus according to the present invention.

FIG. 36 is a flowchart summarizing associated operation of the printer 101 and the ASF 1 in the shown embodiment.

Upon initiation of paper feeding operation by the printer 101, at first, the kind judgment command signal is transmitted to ASF 1 side (S32). The ASF 1 transmits a signal ID indicative of the own kind code to the printer 101 side (S37). Next, the printer 101 transmits the initialization command signal of the ASF 1 to the ASF 1 side (S2). The ASF 1 performs initialization operation by rotating the paper feeder roller 19 if not in the initial state (S29), and transmits the initialization completion signal to the printer 101 side (S31). Next, the printer 101 transmits the paper feeding command signal to the ASF 1 side (S4). The ASF 1 loads the optimal drive table T on the basis of the paper kind information transmitted together with the paper feeding command signal (S15, not shown in FIG. 36), and thereafter drives the paper feeder motor 27 on the basis of the paper feeding operation control flow C2. By this, the paper feeder roller 19 is driven to rotate (S17). The output voltage of the paper end sensor 108 provided on the printer 101 side becomes "HIGH" state when the sensor 108 detect the sheet 200. Then, the ASF 1 drives the paper feeder roller 19 for rotational amount RI on the basis of the pulse number P5 set forth above to perform registration (S22). After completion of registering operation, the ASF 1 drives the paper feeder roller 19 for further rotation in rotational amount R3 to be placed at the same position as the initial state (S38). In conjunction with this, at a timing where t3 is elapsed from initiation of driving of the paper feeder motor 27, the synchronized driving request signal is transmitted to the printer 101 side (S39).

The printer 101 received the synchronized driving request signal from the ASF 1 rotates the LF roller 109 in a rotational amount R3 to perform positioning top of the sheet (S7).

As can be clear from the explanation given hereabove, in the shown embodiment, in the condition where step S22 is completed as shown in FIG. 36, the paper feeder roller 19 starts rotation. With slight delay, the LF roller 109 starts rotation. At this time, the peripheral speed of the paper feeding rubber 23 is slightly higher than the peripheral speed of the LF roller 109. Accordingly, when the LF roller 107 starts rotation for positioning top of the sheet at step S7, since the paper feeding rubber 23 in pressure contact with the sheet 200 has started rotation at slightly earlier timing, back tension will never be caused. Furthermore, since the peripheral speed of the paper feeding rubber 23 is slightly higher than the peripheral speed of the LF roller 109, back tension due to peripheral speed difference will not be caused. Therefore, precision in transportation for positioning top of the sheet 200 is stabilized.

If t3 is too small, before transmission of the driving force of the paper feeder motor 27 to the paper feeder roller 19, the LF roller 109 may start rotation. On the other hand, if t3 is excessive, rotation magnitude of the paper feeder roller 19 in advance of initiation of rotation of the LF roller 109 becomes excessive. Therefore, deformation of the sheet 200 at the mid-way to place is caused. Further, the tip end of the sheet 200 becomes in non-parallel position to the nip defined between the LF roller 109 and the pinch roller 110. In the shown embodiment, the optimal value of t3 is about 10 ms to 100 ms.

On the other hand, when the peripheral speed of the paper feeding rubber 23 set on the paper feeder roller 19 is not so high in comparison with the peripheral speed of the LF roller

109, if slip is caused in the paper feeding rubber 23 due to kind of the sheet 200 or peripheral environment, back tension can be caused. Conversely, if the peripheral speed of the paper feeding rubber 23 is excessively high, deformation of the sheet 200 can be caused. In optimal condition, the peripheral speed of the paper feeding rubber 23 at step S38 of the shown embodiment, is higher than the peripheral speed of the LF roller 109 at step S7 in the extent about 5% to 50%.

On the other hand, in the shown embodiment, as a name of the signal corresponding to "paper feeding completion signal" in the first embodiment, explanation has been given under the name of "synchronized driving request signal" for difference of meaning of the operation. In practice, a same signal may be used as "paper feeding completion signal" and "synchronized driving request signal" without causing any significant problem. Accordingly, the paper feeding operation control flow (FIGS. 28 and 33) of the printer in the first and second embodiments are essentially the same. Namely, the printer 101 in the first embodiment can be used with installing either ASF 1 in the first embodiment and the second embodiment.

Here, content of a plurality of drive table T in the second embodiment will be explained with reference to FIG. 38.

For example, when the paper kind information, which the ASF 1 receives, indicates the plain paper, the ASF control portion 201 selects the drive table T1. In the plain paper, since a resistance force of registering operation at step S22 of FIG. 34, is small, the driving speed is set at medium speed. On the other hand, the plain paper is hardly transported obliquely during paper feeding. Therefore, it is unnecessary to take large depression amount onto the LF roller 109, small value is set as the registering pulse number P5.

On the other hand, when the paper information, which the ASF 1 receives, indicates the envelope, the ASF control portion 201 selects the drive table T3. The envelope has large resistance as being fed, particularly the resistance during registering operation at step S22 is significant. Therefore, the driving speed is set at lower speed than that for the plain paper, so that step loss of the paper feeding motor 27 upon feeding the envelope is avoided. In the result, greater torque is provided. On the other hand, in comparison with other kind of paper, the envelope has higher possibility to be oblique (cause skewing) at the mid-way of feeding. Therefore, as the pulse number P5 for registration at step S22, a medium value greater than that in the table T1 for the plain paper is set. By this, depression amount of the tip end of the envelope onto the LF roller 109 can be increased, so that the tip end of the envelope is more certainly placed on the predetermined portion.

When the paper kind information indicates a glossy paper, the ASF control portion 201 selects the drive table T4. The glossy paper has large resistance during registering operation but will not cause significant skewing. Therefore, in table T4, the driving speed upon registration is set at low speed, and the pulse number P5 for registration is set at small value equivalent to the plain paper.

On the other hand, if the paper information indicates postcard, the ASF control portion 201 selects the drive table 2. The postcard does not have large resistance during registering operation. Therefore, the driving speed upon registration is set at medium speed equivalent to the plain paper.

On the other hand, in FIG. 36, in case the LF roller 109 on the printer 101 side and the paper feeder roller 19 on the ASF 1 side are rotated simultaneously, when the sheet is difficult to deform for high rigidity, such as postcard, the following problem can be caused. Namely, the paper feeder roller 19 having high peripheral speed can push the postcard against friction force of the LF roller 109, so that the tip end of the postcard is transported greater than or equal to the rotational amount R3 of the LF roller 109. Thus, difficulty should be encountered in obtaining proper printing result. In order to avoid this, in the table T2, the pulse number P5 for registration at step S22 is set at a value as great as possible. Particularly, P5=Pmax−Pc is set. The pulse number P5 is set as a parameter determined by reverse driving pulse number of the paper feeder motor 27 required until the paper end sensor 108 detects the sheet 200. By this, whenever the paper end sensor 108 detects the sheet 200, at the execution termination timing of step S22 of FIG. 34, total of the pulse number of reverse driving of the paper feeder motor 27 becomes Pmax namely, the teeth-less recessed portion 19b of the paper feeder roller gear 19a is certainly driven to rotate to the position in opposition with the reverse planetary gear 35 for disengagement. Therefore, the phase in the rotational direction of the paper feeder roller 19 after completion of step S22 becomes a position significantly advanced from the initial position. Thus, even if the paper feeder roller 19 is rotated at step S40, the phase of the paper feeder roller 19 can be quickly returned to the initial position. Accordingly, between the postcard stacked on the pressure plate 26 and the paper feeding rubber 23 are swiftly moved away from each other, immediately after the LF roller 109 and the paper feeder roller 19 initiate synchronous driving. Thus, paper feeder roller 19 may not push the postcard against the friction force of the LF roller 109.

On the other hand, when the paper kind information, which the ASF 1 receives from the printer 101, indicates the paper kind does not correspond to the ASF 1 or the paper kind is not designated, the ASF control portion 201 selects the drive table T5. In the shown embodiment, in the drive table T5, the same values as that of the drive table T2 are stored. However, in some condition to be expected, values same as other paper kind table or values not matching with the values of the table of other paper kind can be stored to the table T5.

The printer 101 as the printing apparatus may employ various printing system, such as an ink-jet type ejecting an ink or a thermal transfer type. In case of the ink-jet type, as an energy for ejecting the ink, an electrothermal transducer generating a thermal energy for causing film boiling in the ink is provided. On the other hand, the printer 101 may be a serial type reciprocally moving the printing head 115 in a direction perpendicularly to the transporting direction of the sheet 200 as the printing medium, or a full line type having the printing head in the length corresponding to the maximum width of the sheet 200. In case of the serial type, the printing head 115 may be detachably mount on a carriage which is reciprocally movable in a direction intersecting with the transporting direction of the sheet.

On the other hand, the present invention is applicable for the printing apparatus, in which the printer 101 and the ASF 1 are mounted integrally. In this case, feeding method of the sheet 200 for the printer 101 can be selectively switched between automatic paper feeding or manual paper feeding. Furthermore, similarly to the case explained above, upon manual paper feeding, the sensor located downstream side in the paper feeding direction of the printing head is used for making judgment whether paper feeding is successful or not. Upon automatic paper feeding, the judgment whether the paper feeding is successful or not using the sensor 113 is not performed.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for printing an image using a printing head on a printing medium fed automatically and a printing medium fed manually, comprising:
    a transporting roller for transporting the printing medium in a transporting direction, with said transporting roller, said printing head and a sensor for detecting the printing medium being arranged sequentially from an upstream side to a downstream side in the transporting direction of the printing medium; and
    control means for controlling transporting of the printing medium by said transporting roller in an amount sufficient for an edge of the printing medium to reach a detecting position of said sensor when the printing medium is fed manually, to execute a feeding confirmation process for judgment of whether said sensor detects the printing medium or not and thereby whether feeding is successful or not, said control means not executing the feeding confirmation process when the printing medium is fed automatically.

2. A printing apparatus as claimed in claim 1, wherein said control means returns the printing medium to a printing start position on the upstream side relative to the transporting direction using said transporting roller when judgment is made that feeding is successful in the feeding confirmation process.

3. A printing apparatus as claimed in claim 1, wherein said control means interrupts transportation of the printing medium by said transporting roller when success of feeding is judged by detecting the printing medium by said sensor during the feeding confirmation process.

4. A printing apparatus as claimed in claim 1, wherein said control means controls withdrawal of the printing medium from said transporting roller by returning the printing medium toward the upstream side relative to the transporting direction using said transporting roller when judgment is made in the feeding confirmation process that feeding has failed.

5. A printing apparatus as claimed in claim 1, further comprising an end sensor arranged for detecting the edge of the printing medium at a predetermined upstream side position with respect to said transporting roller in the transporting direction,
    wherein when the printing medium is fed manually, said control means performs control for transporting the printing medium to the downstream side in the transporting direction with said transporting roller with reference to a detection timing of the edge of the printing medium by said end sensor for the feeding confirmation process.

6. A printing apparatus as claimed in claim 1, wherein said printing head is mounted on a carriage which can reciprocate along a direction intersecting the transporting direction of the printing medium.

7. A printing apparatus as claimed in claim 1, wherein said printing head comprises an ink-jet printing head for ejecting ink.

8. A printing apparatus as claimed in claim 7, wherein said printing head comprises an electrothermal transducer for generating thermal energy for ejecting the ink.

9. A printing apparatus connectable to an automatic feeding apparatus for feeding a printing medium, printing an image using a printing head on the printing medium fed from said automatic feeding apparatus when said printing apparatus is connected to said automatic feeding apparatus, and printing an image using said printing head on a printing medium fed manually when said printing apparatus is not connected to said automatic feeding apparatus, comprising:
    a transporting roller for transporting the printing medium in a transporting direction, with said transporting roller, said printing head and a sensor for detecting the printing medium arranged sequentially from an upstream side to a downstream side in the transporting direction of the printing medium; and
    control means for controlling transporting of the printing medium by said transporting roller in an amount sufficient for an edge of the printing medium to reach a detecting position of said sensor when the printing medium is fed manually, to execute a feeding confirmation process for judgment whether said sensor detects the printing medium or not and thereby whether feeding is successful or not, said control means not executing the feeding confirmation process when the printing medium is fed by said automatic feeding apparatus.

10. A printing apparatus as claimed in claim 9, wherein said control means returns the printing medium to a printing start position on the upstream side relative to the transporting direction using said transporting roller when judgment is made that feeding is successful in the feeding confirmation process.

11. A printing apparatus as claimed in claim 9, wherein said control means interrupts transportation of the printing medium by said transporting roller when success of feeding is judged by detecting the printing medium by said sensor during the feeding confirmation process.

12. A printing apparatus as claimed in claim 9, wherein said control means controls withdrawal of the printing medium from said transporting roller by returning the printing medium toward the upstream side relative to the transporting direction using said transporting roller when judgment is made in the feeding confirmation process that feeding has failed.

13. A printing apparatus as claimed in claim 9, further comprising an end sensor arranged for detecting the edge of the printing medium at a predetermined upstream side position with respect to said transporting roller in the transporting direction,
    wherein when the printing medium is fed manually, said control means performs control for transporting the printing medium to the downstream side in the transporting direction with said transporting roller with reference to a detection timing of the edge of the printing medium by said end sensor for the feeding confirmation process.

14. A printing apparatus as claimed in claim 9, further comprising:
    a communication port capable of bidirectional communication with said automatic feeding apparatus; and
    means for detecting connection of said automatic feeding apparatus through said communication port.

15. A printing apparatus as claimed in claim 9, further comprising:
    a communication port capable of bidirectional communication with said automatic feeding apparatus; and
    means for commanding a feeding operation by said automatic feeding apparatus through said communication port when the printing medium is to be fed by said automatic feeding apparatus.

16. A printing apparatus as claimed in claim 9, further comprising:

a communication port capable of bidirectional communication with said automatic feeding apparatus; and means for transporting the printing medium to a print start position with said transporting roller after receiving a feeding completion signal from said automatic feeding apparatus through said communication port when the printing medium is fed by said automatic feeding apparatus.

17. A printing apparatus as claimed in claim 9, wherein said printing head is mounted on a carriage which can reciprocate along a direction intersecting the transporting direction of the printing medium.

18. A printing apparatus as claimed in claim 9, wherein said printing head comprises an ink-jet printing head for ejecting ink.

19. A printing apparatus as claimed in claim 18, wherein said printing head comprises an electrothermal transducer for generating thermal energy for ejecting the ink.

20. A feeding control method of a printing apparatus in which a transporting roller for transporting a printing medium, a printing head and a sensor for detecting the printing medium are sequentially arranged from an upstream side to a downstream side in a transporting direction of the printing medium, and an image is printed on the fed printing medium, comprising:

a step of feeding the printing medium by one of automatic feeding and manual feeding; and a step of transporting the printing medium by the transporting roller in an amount sufficient for an edge of the printing medium to reach a detecting position of the sensor when the printing medium is fed manually, to execute a feeding confirmation process for judgment of whether the sensor detects the printing medium or not and thereby whether feeding is successful or not, and not executing the feeding confirmation process when the printing medium is fed automatically.

* * * * *

UNITED STATES PATENT AND TRADEMARK OFFICE
CERTIFICATE OF CORRECTION

| | | |
|---|---|---|
| PATENT NO. | : 6,567,187 B1 | Page 1 of 14 |
| APPLICATION NO. | : 09/290410 | |
| DATED | : May 20, 2003 | |
| INVENTOR(S) | : Iwasaki et al. | |

It is certified that error appears in the above-identified patent and that said Letters Patent is hereby corrected as shown below:

IN THE DRAWINGS:

Sheet 35, Figure 36, Step S4, "TARNSMIT" should read --TRANSMIT--.

COLUMN 1:

Line 21, "been" should be deleted, and "Seeking" should read --In seeking--;

Line 22, "printer, in which" should read --printer having--;

Line 23, "of the printer" should read --for--;

Line 26, "medium" should read --media--, "portion one" should read --portion after separating the sheets one--, "one" (second occurrence) should read --one,--, and "are" should be deleted;

Line 27, "separated," should be deleted;

Line 32, "opening" should read --openings--;

Line 33, "to ASFs'" should read --of ASFs--;

Line 35, "is" should read --are--;

Line 36, "medium ." should read --media.--;

Line 37, "is" should read --may be--;

Line 38, "permits" should read --permit--;

Line 41, "stably" should read --as stably--, and "in" should read --with--;

Line 42, "portion" should read --portion,--;

Line 43, "roller" should read --roller,--;

Line 44, "lack" should read --be lacking--;

UNITED STATES PATENT AND TRADEMARK OFFICE
CERTIFICATE OF CORRECTION

PATENT NO.       : 6,567,187 B1
APPLICATION NO.  : 09/290410
DATED            : May 20, 2003
INVENTOR(S)      : Iwasaki et al.

It is certified that error appears in the above-identified patent and that said Letters Patent is hereby corrected as shown below:

COLUMN 1 (Continued):

Line 45, "small to possibly cause" should read --small, possibly causing a--;

Line 47, "take a measure for" should read --overcome--;

Line 51, "case" should read --the case--, "such printer" should read --such a printer--, and "performing" should read --starting a--; and Line 59, "is" (second occurrence) should read --has--.

COLUMN 2:

Line 2, "if a control depending upon" should read --after the paper sensor determines--;

Line 3, "by the discharged paper or not in per-" should read --or not.--;

Line 4, "formed." should be deleted;

Line 6, "sensor, extra" should read --sensor, an extra--;

Line 9, "in backward" should read --in the backward--, and "in" (second occurrence) should read --of--;

Line 10, "abuts" should read --may abut--;

Line 32, "in amount" should read --in an amount--;

Line 35, "execute feeding" should read --execute a feeding--; and

Line 37, "whereby" should read --thereby--.

UNITED STATES PATENT AND TRADEMARK OFFICE
CERTIFICATE OF CORRECTION

PATENT NO. : 6,567,187 B1
APPLICATION NO. : 09/290410
DATED : May 20, 2003
INVENTOR(S) : Iwasaki et al.

It is certified that error appears in the above-identified patent and that said Letters Patent is hereby corrected as shown below:

COLUMN 3:

Line 5, "printing," should read --printing medium,--;

Line 7, "step" should read --a step--, and "by automatic" should read --by one of automatic--;

Line 9, "step" should read --a step--;

Line 10, "in amount" should read --in an amount--;

Line 13, "feeding" should read --a feeding--;

Line 14, "whereby" should read --thereby--; and

Line 34, "much" should read --a more--.

COLUMN 6:

Line 9, "so-called" should read --a so-called--;

Line 14, "down" should read --lowering--;

Line 19, "outdoor," should read --outdoors,--, and "vehicle, a" should read --vehicle, in a--;

Line 24, "simply" should read --a simple--;

Line 25, "own" should read --an--, and "needs" should read --need--;

Line 26, "relatively" should read --a relatively--, and "as" should read --or a--;

Line 27, "separated" should read --separable--;

Line 31, "has a performance" should read --perform--;

Line 34, "postcard, envelope," should read --postcards, envelopes,--;

UNITED STATES PATENT AND TRADEMARK OFFICE
CERTIFICATE OF CORRECTION

| | | |
|---|---|---|
| PATENT NO. | : 6,567,187 B1 | |
| APPLICATION NO. | : 09/290410 | |
| DATED | : May 20, 2003 | |
| INVENTOR(S) | : Iwasaki et al. | |

It is certified that error appears in the above-identified patent and that said Letters Patent is hereby corrected as shown below:

COLUMN 6 (Continued):

Line 35, "a" should be deleted;

Line 36, "of" should be deleted;

Line 45, "standalone" should read --stand-alone--;

Line 57, "carries out" should read --carries it out--; and

Line 60, "complicate" should read --complicated--.

COLUMN 7:

Line 20, "may properly" should read --may be properly--;

Line 33, "griped" should read --gripped--;

Line 36, "a" should be deleted;

Line 38, "lead" should read --led--;

Line 52, "restricts" should read --restricting--; and

Line 65, "in" should be deleted.

COLUMN 8:

Line 1, "indicate" should read --indicates--;

Line 3, "prevent" should read --prevents--;

Line 6, "establish" should read --establishes--;

Line 9, "By thus" should read --By being thus--;

Line 18, "deflect" should read --deflects--;

UNITED STATES PATENT AND TRADEMARK OFFICE
CERTIFICATE OF CORRECTION

PATENT NO.        : 6,567,187 B1
APPLICATION NO. : 09/290410
DATED             : May 20, 2003
INVENTOR(S)       : Iwasaki et al.

It is certified that error appears in the above-identified patent and that said Letters Patent is hereby corrected as shown below:

COLUMN 8 (Continued):

Line 19, "damaging" should read --damage--, and "portion, unwanted" should read --portion, and unwanted--;

Line 23, "overhand" should read --overhang--.

Line 49, "unstable" should read --unstably--; and

Line 64, "hand)." should read --hands).--.

COLUMN 9:

Line 29, "oppression" should read --an oppressive--.

COLUMN 10:

Line 2, "dart" should read --dirt--;

Line 4, "excessively" should read --an excessively--;

Line 8, "presents as" should read --can be an--;

Line 10, "In case" should read --In the case--;

Line 11, "a" should be deleted, and "the" should read --a--;

Line 12, "and minimum" should read --and occupies minimum--;

Line 30, "loosing." should read --becoming loose.--;

Line 46, "of a" should be deleted; and

Line 57, "are" should read --is--.

COLUMN 11:

UNITED STATES PATENT AND TRADEMARK OFFICE
CERTIFICATE OF CORRECTION

PATENT NO.        : 6,567,187 B1
APPLICATION NO.   : 09/290410
DATED             : May 20, 2003
INVENTOR(S)       : Iwasaki et al.

It is certified that error appears in the above-identified patent and that said Letters Patent is hereby corrected as shown below:

COLUMN 11 (Continued):

Line 16, "ment" should be deleted;

Line 43, "ating" should read --ated--;

Line 50, "Extending" should read --The extending--;

Line 57, "in" should be deleted; and

Line 65, "rapture" should read --rupture--, and "more" should read --an even--.

COLUMN 12:

Line 1, "strong" should read --resistant--, and "the" (first occurrence) should be deleted;

Line 8, "rupture" should read --while rupture--, and "the sheet" should read --the debris of the sheet--;

Line 17, "116 pivotably" should read --116 is pivotably--;

Line 18, "as sole" should read --as a sole--;

Line 19, "stabilizes feeding" should read --stabilizes the feeding--;

Line 20, "in" (first occurrence) should read --by--;

Line 21, "guide 116a" should read --guide 116a,--;

Line 22, "provided" should read --which is provided--;

Line 26, "with" should read --while--;

Line 32, "for" should read --to--;

Line 33, "positioning of" should read --position--;

UNITED STATES PATENT AND TRADEMARK OFFICE
CERTIFICATE OF CORRECTION

PATENT NO. : 6,567,187 B1
APPLICATION NO. : 09/290410
DATED : May 20, 2003
INVENTOR(S) : Iwasaki et al.

It is certified that error appears in the above-identified patent and that said Letters Patent is hereby corrected as shown below:

COLUMN 12 (Continued):

Line 36, "direction," should read --direction--; and

Line 43, "providing" should read --provided--, and "with" should read --while--.

COLUMN 13:

Line 2, "tolerance" should read --tolerances--;

Line 4, "complicate" should read --complicated--;

Line 66, "ASF" should read --main body--; and

Line 67, "made null" should read --nullified--, "make" should be deleted, and "only sheet" should read --only the sheet--.

COLUMN 14:

Line 1, "side effective" should read --side is effective--;

Line 2, "cation of" should read --cation and cost of--;

Line 3, "and cost-up" should be deleted;

Line 4, "Then, a problem to be" should read --Also, problems--;

Line 8, "sheet, blocking" should read --sheet, and blocking--, and "onto" should read --with--.

Line 10, "has" should read --have--;

Line 15, "with" should be deleted;

Line 22, "inference" should read --interference--;

UNITED STATES PATENT AND TRADEMARK OFFICE
CERTIFICATE OF CORRECTION

PATENT NO.      : 6,567,187 B1
APPLICATION NO. : 09/290410
DATED           : May 20, 2003
INVENTOR(S)     : Iwasaki et al.

It is certified that error appears in the above-identified patent and that said Letters Patent is hereby corrected as shown below:

COLUMN 14 (Continued):

Line 64, "at" should be deleted; and

Line 65, "which," should read --which--, and "and" should be deleted.

COLUMN 15:

Line 6, "for" should read --to be--;

Line 22, "unwantedly" should read --unintentionally--;

Line 26, "due to" should read --because--;

Line 48, "timing," should read --timings,--;

Line 51, "In" should read --For--; and

Line 64, "porting ability." should read --portability.--.

COLUMN 16:

Line 9, "in" should read --for--.

COLUMN 17:

Line 54, "compressed." should read --compression.--.

COLUMN 18:

Line 7, "contact onto" should read --contacts--;

Line 13, "hole 18a" should read --hole 118a--;

Line 14, "18b" should read --118b--;

UNITED STATES PATENT AND TRADEMARK OFFICE
CERTIFICATE OF CORRECTION

| | |
|---|---|
| PATENT NO. | : 6,567,187 B1 |
| APPLICATION NO. | : 09/290410 |
| DATED | : May 20, 2003 |
| INVENTOR(S) | : Iwasaki et al. |

It is certified that error appears in the above-identified patent and that said Letters Patent is hereby corrected as shown below:

COLUMN 18 (Continued):

Line 37, "that" should read --because--;

Line 50, "withdrawn" should read --be withdrawn--;

Line 52, "here" should read --where--; and

Line 54, "want" should read --wants--.

COLUMN 19:

Line 8, "release" should read --releases--;

Line 9, "to" should read --as--;

Line 25, "since" should be deleted;

Line 42, "with" should read --while--; and

Line 49, "lever 40 set" should read --lever 40 is set--.

COLUMN 20:

Line 12, "moves" should read --move--;

Line 21, "view" should read --views--;

Line 22, "printer 101" should read --ASF 1--;

Line 24, "printer 101." should read --ASF 1.--; and

Line 39, "member" should read --members--.

COLUMN 21:

Line 6, "expresses" should read --expressed--; and

UNITED STATES PATENT AND TRADEMARK OFFICE
CERTIFICATE OF CORRECTION

PATENT NO. : 6,567,187 B1
APPLICATION NO. : 09/290410
DATED : May 20, 2003
INVENTOR(S) : Iwasaki et al.

It is certified that error appears in the above-identified patent and that said Letters Patent is hereby corrected as shown below:

COLUMN 21 (Continued):

Line 36, "that movement" should read --that there is movement--.

COLUMN 22:

Line 8, "driver 260" should read --driver 206--;

Line 49, "respective" should read --respectively--; and

Line 50, "has" should read --have--.

COLUMN 23:

Line 6, "is" should read --are--;

Line 15, "for" should read --to--;

Line 26, "is" should read --has--;

Line 28, "is" should read --has--;

Line 36, "forms" should read --is formed by--;

Line 37, "having high" should read --having a high--;

Line 38, "pipe." should read --shaft.--;

Line 40, "FIG. 25" should read --FIG. 24--, and "transport" should read --transports--;

Line 42, "the" should read --a--;

Line 47, "from surface to back in" should read --orthogonal to--;

Line 49, "FIG. 25." should read --FIG. 24.--;

UNITED STATES PATENT AND TRADEMARK OFFICE
CERTIFICATE OF CORRECTION

PATENT NO.       : 6,567,187 B1
APPLICATION NO.  : 09/290410
DATED            : May 20, 2003
INVENTOR(S)      : Iwasaki et al.

It is certified that error appears in the above-identified patent and that said Letters Patent is hereby corrected as shown below:

COLUMN 23 (Continued):

Line 54, "completed" should be deleted;

Line 55, "image printing." should read --on which an image has been printed.--;

Line 59, "with taking" should read --using--; and

Line 65, "109" should read --113--.

COLUMN 25:

Line 22, "gear 35 idle" should read --gear 35 are idle--; and

Line 50, "waited." should read --awaited.--.

COLUMN 26:

Line 1, "Step is S7" should read --Step S7 is--;

Line 18, "indicative" should read --indicates--;

Line 26, "waited." should read --awaited.--;

Line 36, "driven" should read --drive--;

Line 55, "for" should read --so--; and

Line 60, "property" should read --properly--.

COLUMN 27:

Line 33, "operation," should read --operations,--;

Line 34, "Once," should read --Once--;

Line 44, "waited." should read --awaited.--; and

UNITED STATES PATENT AND TRADEMARK OFFICE
CERTIFICATE OF CORRECTION

PATENT NO. : 6,567,187 B1
APPLICATION NO. : 09/290410
DATED : May 20, 2003
INVENTOR(S) : Iwasaki et al.

It is certified that error appears in the above-identified patent and that said Letters Patent is hereby corrected as shown below:

COLUMN 27 (Continued):

Line 55, "sub-routine" should read --sub-routines--.

COLUMN 28:

Line 36, "by" should be deleted;

Line 54, "meshed" should read --meshes--; and

Line 56, "starts" (second occurrence) should read --starting--.

COLUMN 29:

Line 12, "is sufficient" should read --is a sufficient--; and

Line 16, "teeth-lee" should read --tooth-less--.

COLUMN 30:

Line 22, "times" should read --time--;

Line 28, "operation" should read --Operation--, and "side))" should read --Side))--;

Line 32, "advance" should read --advances--.

Line 34, "indicative" should read --indicates--;

Line 61, "show" should read --shown--; and

Line 65, "port 177g," should read --port 117g,--.

UNITED STATES PATENT AND TRADEMARK OFFICE
CERTIFICATE OF CORRECTION

PATENT NO. : 6,567,187 B1
APPLICATION NO. : 09/290410
DATED : May 20, 2003
INVENTOR(S) : Iwasaki et al.

It is certified that error appears in the above-identified patent and that said Letters Patent is hereby corrected as shown below:

COLUMN 31:

Line 8, "terminates operation" should read --terminates the operation--;

Line 9, "ID indicative" should read --ID is indicative--;

Line 13, "illustration" should read --illustrations--;

Line 28, "200," should read --200.--;

Line 47, "is trans-" should be deleted;

Line 48, "mitted" should be deleted; and

Line 55, "of-the" should read --of the--.

COLUMN 32:

Line 9, "own" should be deleted;

Line 24, "detect" should read --detects--;

Line 34, "printer 101 received" should read --printer 101 which received--;

Line 36, "positioning top" should read --positioning of the top--;

Line 51, "positioning top" should read --positioning of the top--;

Line 56, "excessive, rotation" should read --excessive, the rotation--;

Line 59, "the mid-way to place" should read --its midportion--; and

Line 60, "in non-parallel" should read --in a non-parallel--.

COLUMN 33:

Line 23, "table" should read --tables--.

UNITED STATES PATENT AND TRADEMARK OFFICE
CERTIFICATE OF CORRECTION

PATENT NO. : 6,567,187 B1
APPLICATION NO. : 09/290410
DATED : May 20, 2003
INVENTOR(S) : Iwasaki et al.

It is certified that error appears in the above-identified patent and that said Letters Patent is hereby corrected as shown below:

COLUMN 34:

Line 25, "between" should be deleted;

Line 43, "system," should read --systems,--; and

Line 53, "mount" should read --mountable--.

Signed and Sealed this

Twenty-fifth Day of December, 2007

JON W. DUDAS
*Director of the United States Patent and Trademark Office*